US010876948B2

(12) United States Patent
Kim et al.

(10) Patent No.: US 10,876,948 B2
(45) Date of Patent: Dec. 29, 2020

(54) PARTICLE SENSING DEVICE

(71) Applicant: LG INNOTEK CO., LTD., Seoul (KR)

(72) Inventors: Jae Hyun Kim, Seoul (KR); Ji Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/606,422

(22) PCT Filed: Mar. 29, 2018

(86) PCT No.: PCT/KR2018/003738
§ 371 (c)(1),
(2) Date: Oct. 18, 2019

(87) PCT Pub. No.: WO2018/194290
PCT Pub. Date: Oct. 25, 2018

(65) Prior Publication Data
US 2020/0132580 A1     Apr. 30, 2020

(30) Foreign Application Priority Data
Apr. 20, 2017  (KR) .................. 10-2017-0051014

(51) Int. Cl.
*G01N 15/02*     (2006.01)
*G01N 1/24*      (2006.01)

(52) U.S. Cl.
CPC ........... *G01N 15/0211* (2013.01); *G01N 1/24* (2013.01); *G01N 2001/245* (2013.01)

(58) Field of Classification Search
CPC .............. G01N 21/53; G01N 15/0211; G01N 15/1436; G01N 15/14; G01N 15/10;
(Continued)

(56) References Cited

U.S. PATENT DOCUMENTS 5,946,091 A * 8/1999 Yufa .................. G01N 15/0205
356/336
7,038,189 B2   5/2006 Kawai
(Continued)

FOREIGN PATENT DOCUMENTS

JP      2007-057360     3/2007
KR   10-2011-0080646    7/2011
(Continued)

OTHER PUBLICATIONS

International Search Report dated Jul. 23, 2018 issued in Application No. PCT/KR2018/003738.

*Primary Examiner* — Hoa Q Pham
(74) *Attorney, Agent, or Firm* — KED & Associates, LLP

(57) ABSTRACT

A particle sensing device according to one embodiment comprises: a light-emitting unit for emitting light; a first flow path unit arranged under the light-emitting unit so as to be vertical to an optical shaft of the light-emitting unit, and through which air including particles flows; a light-receiving unit arranged at the optical shaft under the first flow path unit, and on which light that has passed through the first flow path is incident; and a light-absorbing unit arranged at the optical shaft under the light-receiving unit and absorbing light that has passed through the light-receiving unit.

18 Claims, 60 Drawing Sheets

(58) Field of Classification Search
CPC .... G01N 15/02; G01N 2001/245; G01N 1/24; G01N 2015/149; G01N 2015/1486; G01N 2015/0046; G01N 2015/1493; G01N 2015/1081; G01N 2015/1087; G01N 35/085
USPC .............. 356/432–440, 335–343, 73, 246; 250/222.2, 573, 574; 73/865.5
See application file for complete search history.

(56) References Cited

U.S. PATENT DOCUMENTS

| | | | |
|---|---|---|---|
| 8,134,705 B2* | 3/2012 | Kaduchak | G01N 15/1404 356/337 |
| 9,235,970 B2 | 1/2016 | Williamson | |
| 9,302,276 B2 | 4/2016 | Pesetsky et al. | |
| 2007/0086007 A1* | 4/2007 | Schweighardt | G01N 21/53 356/337 |
| 2007/0097372 A1 | 5/2007 | Itagaki | |
| 2012/0081709 A1* | 4/2012 | Durack | G01N 15/14 356/436 |
| 2015/0211977 A1* | 7/2015 | Sekimoto | G01N 15/1404 356/338 |

FOREIGN PATENT DOCUMENTS

| | | |
|---|---|---|
| KR | 10-2012-0041920 | 5/2012 |
| KR | 10-2013-0127300 | 11/2013 |
| KR | 10-2017-0026108 | 3/2017 |

* cited by examiner

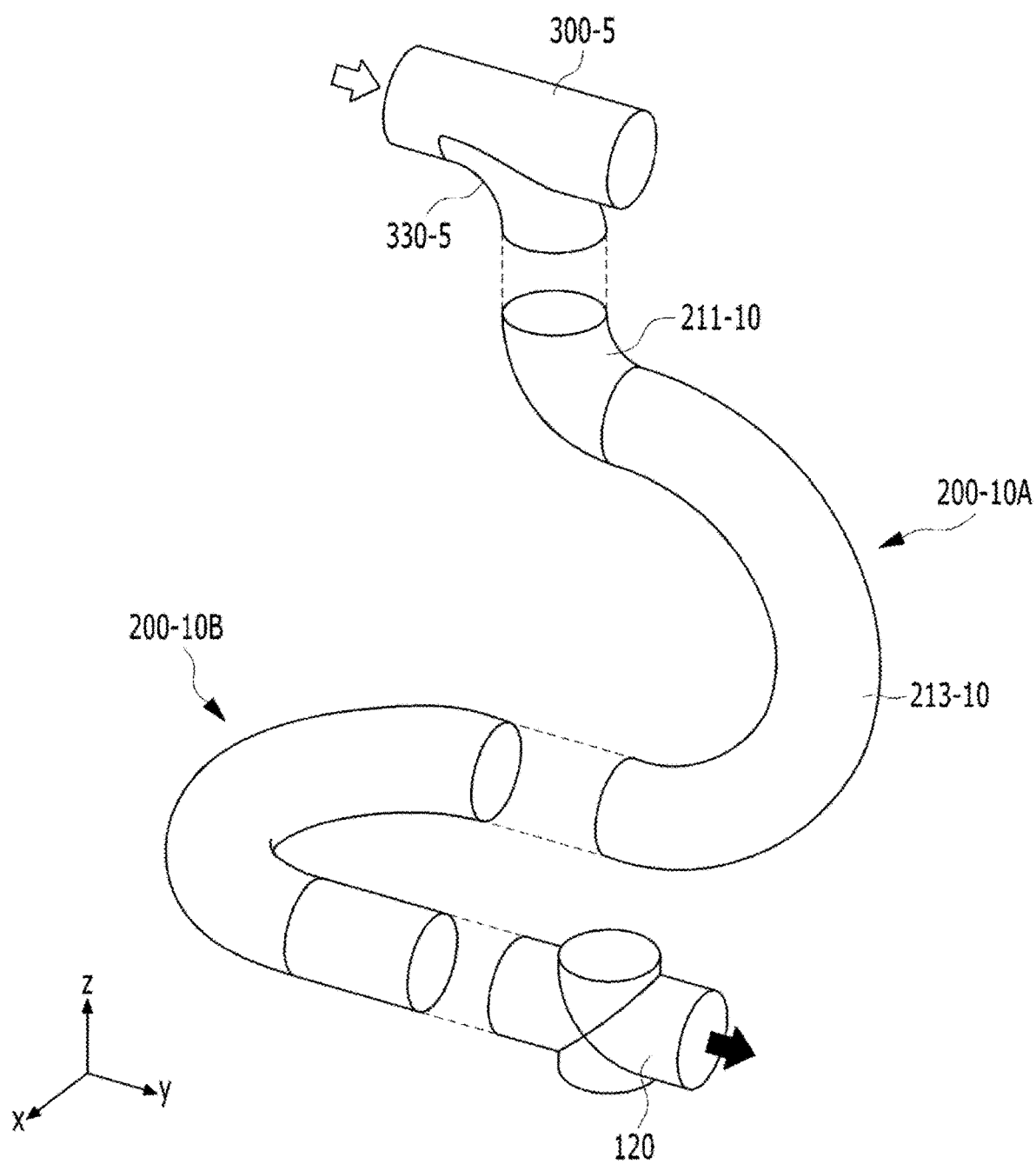

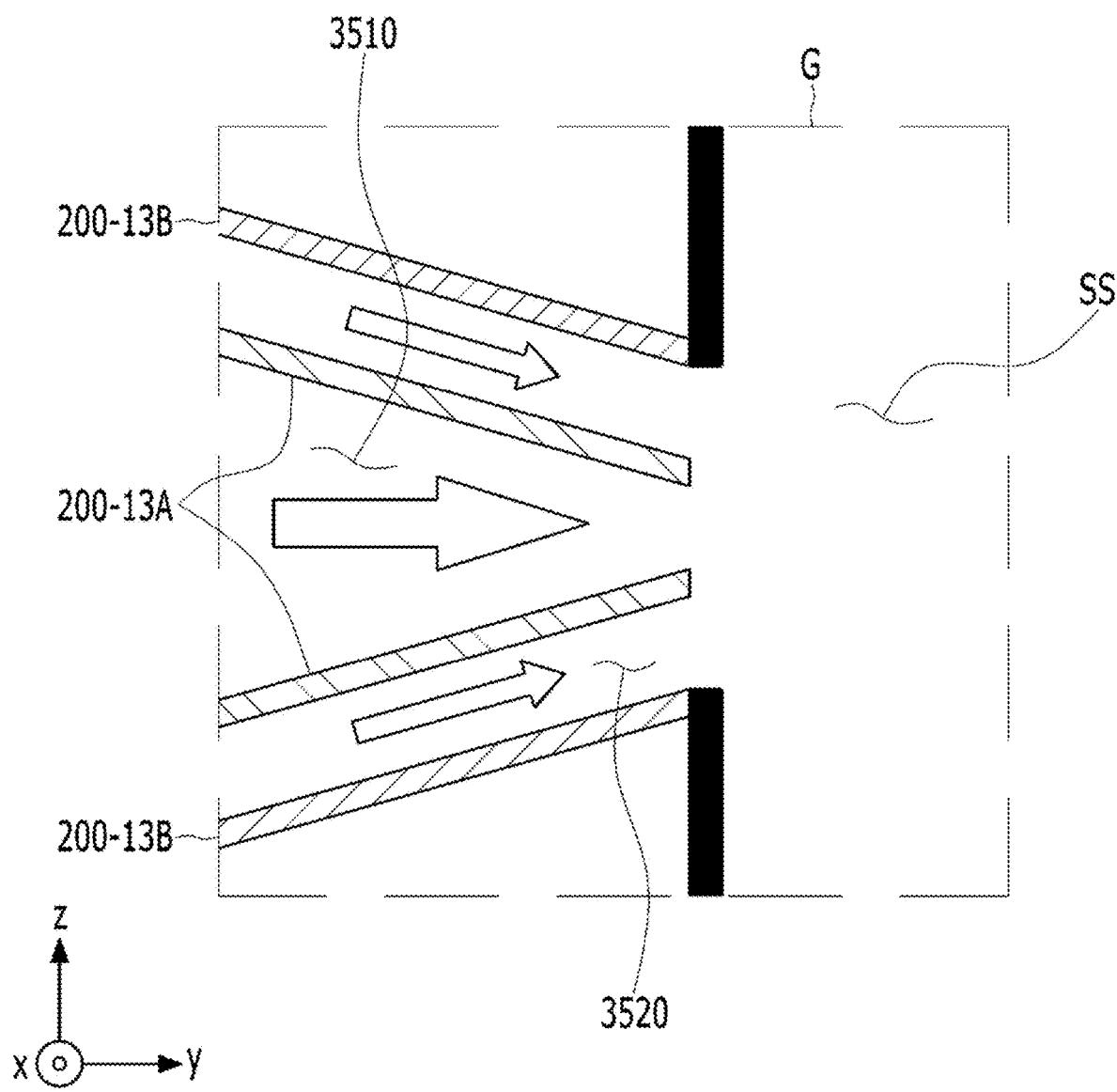

FIG. 36
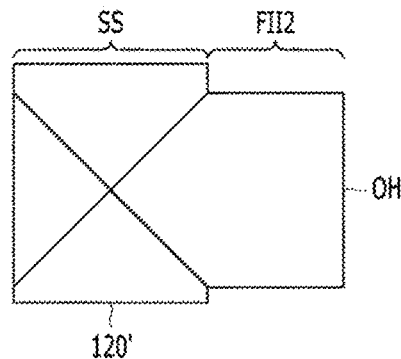
(a)
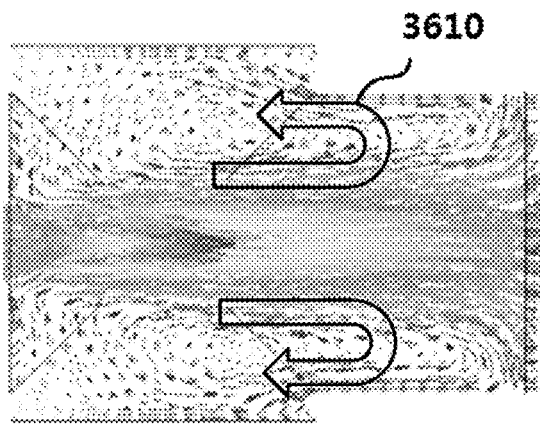
(b)
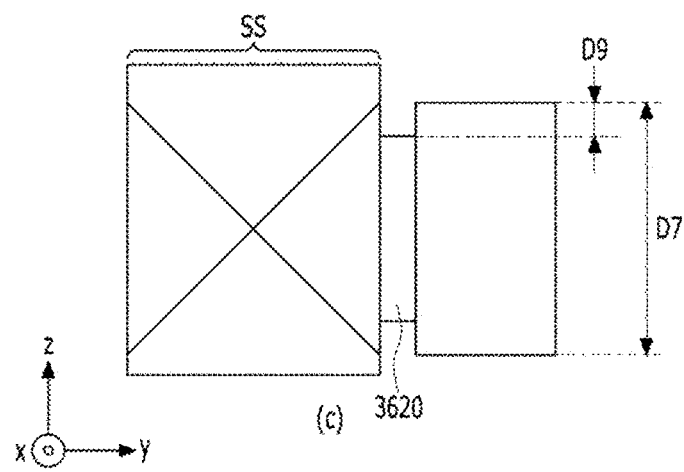
(c)

PARTICLE SENSING DEVICE

CROSS-REFERENCE TO RELATED PATENT APPLICATIONS

This application is a U.S. National Stage Application under 35 U.S.C. § 371 of PCT Application No. PCT/KR2018/003738, filed Mar. 29, 2018, which claims priority to Korean Patent Application No. 10-2017-0051014, filed Apr. 20, 2017, whose entire disclosures are hereby incorporated by reference.

TECHNICAL FIELD

Embodiments relate to a particle sensing device.

BACKGROUND ART

Generally, a conventional dust sensing device for sensing particles such as dust emits light toward dust in an optical axis direction, and senses light scattered from the dust at a lateral side of an optical axis, thereby acquiring information as to the dust. An example of such a conventional lateral dust sensing device is disclosed in U.S. Pat. No. 7,038,189 (issued on May 2, 2006).

When light scattered from dust is sensed at a lateral side of an optical axis direction, it may be difficult to sense particles having a smaller size, for example, a size of 1 µm or less, because the intensity of the sensed scattered light is weak. In addition, there may be a problem of a narrow focusing zone.

Furthermore, in the conventional lateral dust sensing device, a path, along which air containing dust passes, is formed due to flow of heat and, as such, there may be limitation of a flow channel in that, for example, a zone in which particles flow becomes larger than a focusing zone. For this reason, particles not measured may increase and, as such, particle sensing accuracy may be degraded. In addition, the overall size of the dust sensing device may be increased due to disposition of a heat source for flow of heat. For example, in the conventional lateral dust sensing device, there may be a problem in that very high dust measurement error of about 30% is exhibited.

Furthermore, in the conventional lateral dust sensing device, the intensity of light scattered from dust is not high because the scattered light is laterally sensed. For this reason, there may be a problem in that increased consumption of electric power is required in order to increase the intensity of scattered light.

In addition, in the conventional lateral dust sensing device, it may be impossible to count the number of all dust particles due to structural limitation of a flow channel through which the particles pass.

DISCLOSURE

Technical Problem

Embodiments provide a particle sensing device capable of accurately sensing information as to particles having a small size using a simple structure.

Technical Solution

In accordance with an embodiment of the present disclosure, a particle sensing device includes a light emitting unit for emitting light, a first flow channel unit disposed beneath the light emitting unit to intersect an optical axis of the light emitting unit, the first flow channel unit allowing air containing particles to flow therethrough, a second flow channel unit communicating with the first flow channel unit and discharging air introduced from an outside into the first flow channel unit, a light receiving unit disposed on the optical axis beneath the first flow channel unit, the light receiving unit receiving light emerging from the first flow channel unit, and a light dumping unit disposed on the optical axis beneath the light receiving unit, the light dumping unit dumping light emerging from the light receiving unit, wherein the second flow channel unit comprises a first curved portion bent to have a curvature while including an inlet for receiving air while defining a first diameter, an extension portion extending from the first curved portion while communicating with the first curved portion, a second curved portion bent to have a curvature while communicating with the extension portion, and a nozzle portion communicating with the second curved portion and the first flow channel unit, and wherein a diameter of the nozzle portion communicating with the second curved portion is greater than a diameter of the nozzle portion communicating with the first flow channel unit.

For example, the inlet may receive the air in a first direction, the first curved portion may provide a path for changing a flow direction of the air from the first direction to a second direction while having the curvature of the first curved portion, and the first direction may correspond to an extension direction of the first flow channel unit.

For example, the first extension portion may extend in a second direction while having the first diameter, and the second direction may correspond to a direction parallel to a direction of the optical axis.

For example, the first flow channel unit may include a second diameter, and a minimum diameter of the nozzle portion may be smaller than the second diameter.

For example, the nozzle portion may have a conical shape.

For example, a length of the nozzle portion in the first direction may correspond to 40 to 60% of a length of the second flow channel unit in the first direction.

For example, the second direction may have an acute angle of 60° with respect to the optical axis, the first curved portion and the second curved portion may have a first radius angle and a second radius angle with respect to the curvatures thereof, respectively, and a sum of the first radius angle and the second radius angle may be 60 to 180°.

For example, the second diameter may be greater than the first diameter.

For example, the particle sensing device may further include a third flow channel unit having a third diameter. The third flow channel unit may communicate with the first flow channel unit, to discharge the air.

For example, the particle sensing device may further include a first discharge extension unit communicating with the third flow channel unit and the first flow channel unit between the third flow channel unit and the first flow channel unit. A length of the first discharge extension unit in a direction of the optical axis may be smaller than the second diameter and the third diameter.

For example, the particle sensing device may further include a second discharge extension unit communicating with the third flow channel unit, to be connected to a fan. A diameter of the second discharge extension unit in the optical axis direction may increase gradually as the second discharge extension unit extends toward the fan.

For example, the particle sensing device may further include a discharge-side flow channel unit communicating with the third flow channel unit, to discharge air to the outside. The discharge-side flow channel unit may include a first discharge-side extension portion extending in a second direction, a discharge-side curved portion communicating with the first discharge-side extension portion, the discharge-side curved portion extending in the first direction while having a curvature, and a second discharge-side extension portion communicating with the discharge-side curved portion, the second discharge-side extension portion extending in the second direction.

For example, a difference between a radius of outer curvature and a radius of inner curvature in each of the first curved portion and the second curved portion may correspond to the first diameter.

In accordance with another embodiment of the present disclosure, a particle sensing device includes a light emitting unit for emitting light, a first flow channel unit disposed beneath the light emitting unit to intersect an optical axis of the light emitting unit, the first flow channel unit allowing air containing particles to flow therethrough, a second flow channel unit communicating with the first flow channel unit and discharging air introduced from an outside into the first flow channel unit, a light receiving unit disposed on the optical axis beneath the first flow channel unit, the light receiving unit receiving light emerging from the first flow channel unit, and a light dumping unit disposed on the optical axis beneath the light receiving unit, the light dumping unit dumping light emerging from the light receiving unit, wherein the second flow channel unit comprises an inlet for receiving the air, an outlet for discharging the received air, a first curved portion bent to have a curvature while communicating with the inlet and the outlet, a first extension portion extending from the first curved portion while communicating with the first curved portion, a second curved portion bent to have a curvature while communicating with the first extension portion, a second extension portion extending from the second curved portion while communicating with the second curved portion, a third curved portion bent to have a curvature while communicating with the second extension portion, and a nozzle portion communicating with the third curved portion.

For example, the particle sensing device may further include a fourth curved portion bent to have a curvature while communicating with the nozzle portion, and a third extension portion extending to communicate with the third curved portion and the first flow channel unit.

For example, the first extension portion, the second extension portion and the nozzle portion may be disposed on a first plane, and the nozzle portion and the third extension portion may be disposed on a second plane intersecting the first plane.

For example, the particle sensing device may further include a housing for accommodating the light emitting unit, the first flow channel unit, the light receiving unit and the light dumping unit therein. The housing may include at least the first plane.

For example, a vertical axis of the first plane may be parallel to the optical axis, and a horizontal axis of the first plane may intersect the optical axis.

For example, the third extension portion may form a path for changing a flow direction of the air from a first direction to a second direction opposite to the first direction on the second plane.

For example, in each of the first curved portion, the second curved portion, the third curved portion and the fourth curved portion, a central curvature thereof may correspond to 3/8 to 1 of a diameter thereof.

Advantageous Effects

The particle sensing device according to each embodiment has an enhanced particle sensing ability through an increase in intensity of sensed scattered light and, as such, may sense particles having a very small size of 1 μm or less, for example, 0.1 to 0.8 μm, preferably, 0.3 to 0.5 μm, may estimate a shape of particles, may achieve easy design of the light dumping unit, may eliminate a problem of scarred light detection degradation caused by a main beam, may count the number of particles, and may require great electric power consumption for an increase in intensity of scattered light. In addition, the overall size of the particle sensing device is reduced to be compact. Accordingly, the particle sensing device may be suitably used in fields requiring a miniature particle sensing device, for example, for vehicles.

In addition, through optimization of flow channel design, it may be possible to prevent introduction of light from the outside through the inlet and the outlet, and to minimize influence of external wind velocity variation on results of particle sensing.

DESCRIPTION OF DRAWINGS

FIG. 16A illustrates another example of the flow channel structure including the second flow channel unit disposed along two planes intersecting each other in accordance with the embodiment of the present disclosure.

FIG. 35B is an enlarged view corresponding to a portion G of FIG. 35A.

FIG. 36 is a view for explaining a phenomenon possibly occurring in the structure of the first flow channel unit shown in FIG. 34A and a barrier wall structure as a coping scheme.

BEST MODE

Hereinafter, the present disclosure will be described with reference to embodiments, for concrete description thereof, and the embodiments will be described in detail with reference to the accompanying drawings, for better understanding of the present invention. However, the embodiments of the present disclosure may be modified to various different forms, and the scope of the present disclosure should not be interpreted as being limited to embodiments described below. The embodiments of the present disclosure are provided to more fully describe the present disclosure to those having ordinary skill in the art.

In the following description of embodiments, it will be understood that, when an element is referred to as being "on" or "under" another element, it can be directly on or under another element or can be indirectly formed such that an intervening element is also present.

Furthermore, when the expression "on" or "under" is used herein, it may involve not only the upward direction, but also the downward direction, with reference to one element.

In the meantime, although relational terms such as "first", "second", "on/over/above", and "beneath/under/below" may be construed only to distinguish one element from another element without necessarily requiring or involving a certain physical or logical relation or sequence between the elements.

Hereinafter, a particle sensing device 100 (100A to 100D) according to an embodiment will be described with reference to the accompanying drawings. For convenience of description, the particle sensing device 100 (100A to 100D) will be described using a Cartesian coordinate system (x, y, and z-axes). Of course, the particle sensing device 100 (100A to 100D) may be described using other coordinate systems.

Figure 1:
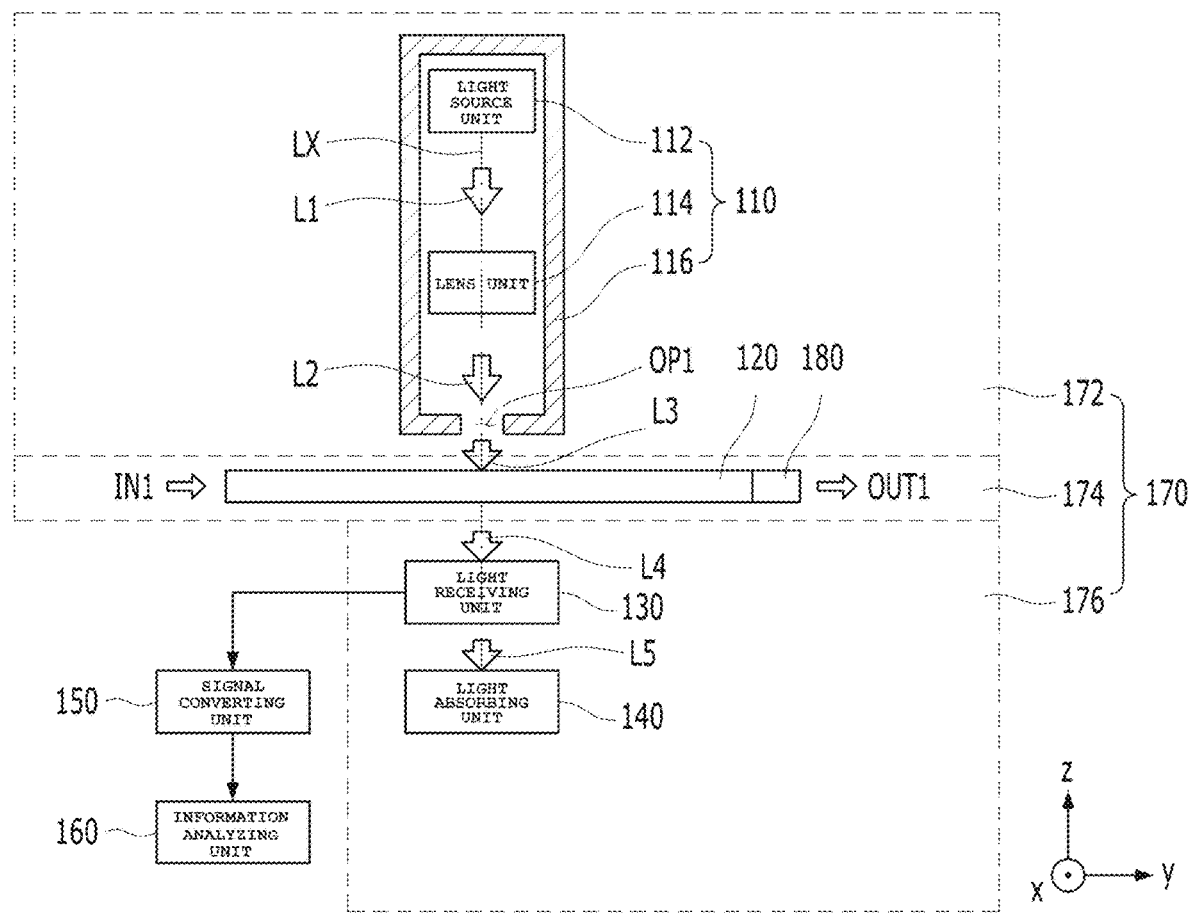
FIG. 1 is a schematic block diagram for explaining a concept of a particle sensing device according to an embodiment.

FIG. 1 is a schematic block diagram for explaining a concept of the particle sensing device 100 according to the embodiment. The particle sensing device 100 may include a light emitting unit 110, a first flow channel 120, a light receiving unit 130, a light absorbing unit 140, a signal converting unit 150, an information analyzing unit 160, a housing 170, and a fan 180.

Referring to FIG. 1, the light emitting unit 110 functions to emit light. The light emitting unit 110 may include a light source unit 112, a lens unit 114, and a light emission case 116.

The light source unit 112 functions to emit first light L1. The light source unit 112 may include at least one light source. The light source included in the light source unit 112 may be at least one of a light emitting diode (LED) or a laser diode (LD). Embodiments are not limited to particular forms of light sources embodying the light source unit 112 or the number of the light sources. For example, a blue LED, a high-brightness LED, a chip LED, a high-flux LED, or a power LED, which has linearity, may be used as the light source embodying the light source unit 112. However, light sources according to embodiments are not limited to forms of particular LEDs.

When the light source unit 112 is embodied using an LED, the light source unit 112 may emit light of a visible wavelength band (for example, 405 to 660 nm) or an infrared wavelength band (for example, 850 to 940 nm). On the other hand, when the light source unit 112 is embodied using an LD, the light source unit 112 may emit light of a red/blue wavelength band (for example, 450 to 660 nm). However, embodiments are not limited to a particular wavelength band of the first light L1 emitted from the light source unit 112.

In addition, the intensity of third light L3 emitted from the light emitting unit 110 may be 3,000 mcd or more. However, embodiments are not limited to a particular intensity of the third light L3 emitted from the light emitting unit 110.

Figure 3:
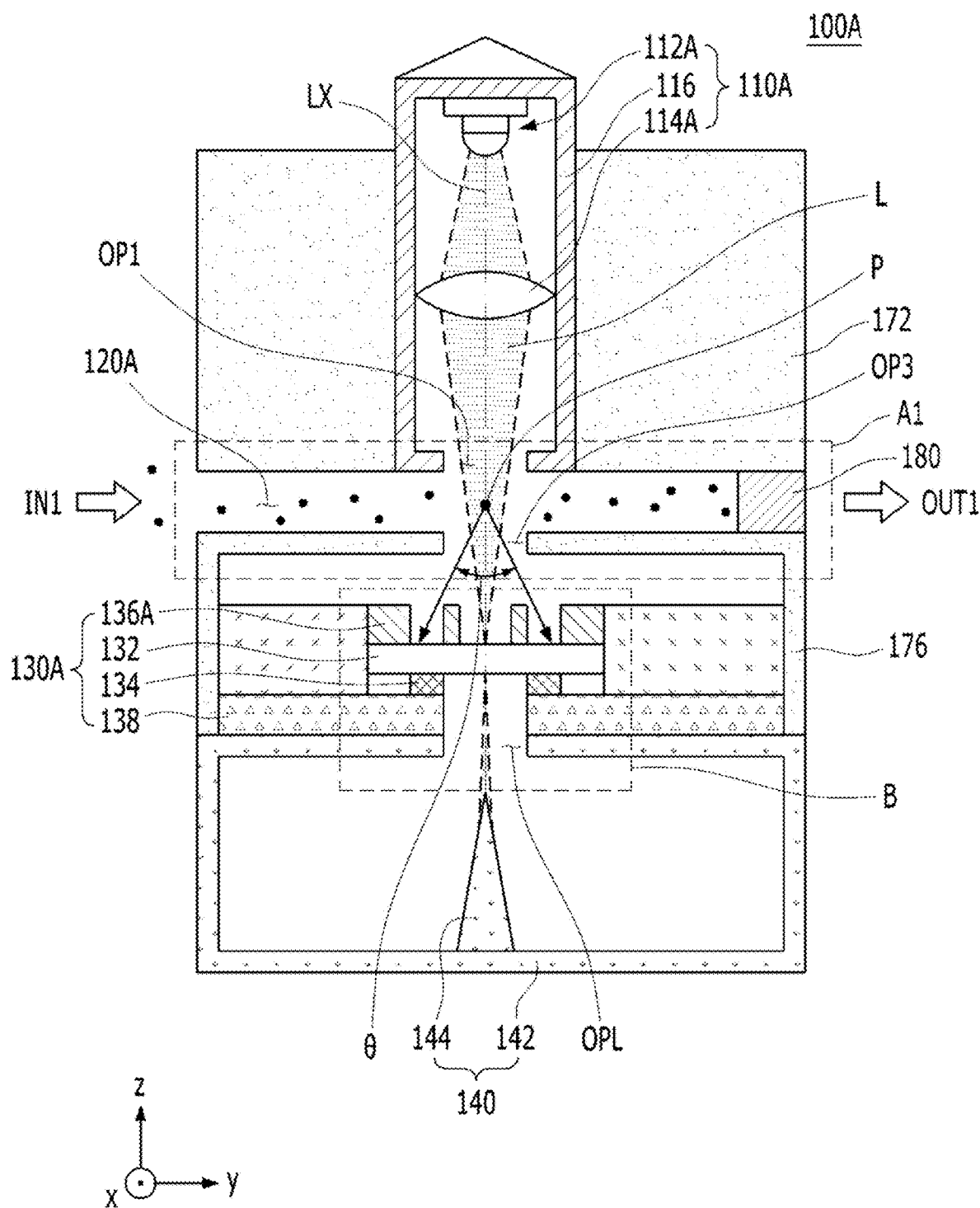
FIG. 3 shows a sectional view of one embodiment of the particle sensing device shown in FIG. 1.

The packaging type of the light source of the light emitting unit 110 may be embodied as a surface mount device (SMD) type or a lead type. Here, the SMD type means a packaging type in which the light source of a light source unit 112A is mounted on a printed circuit board (PCB) through soldering, as illustrated in FIG. 3. On the other hand, the lead type means a packaging type in which a lead protrudes from the light source, to be connected to a PCB electrode. However, embodiments are not limited to a particular packaging type of the light source.

Meanwhile, when the light source unit 110 is embodied as an LD, the LD may be of a TO Can type in which the LD is packaged by metal, and may consume electric power of 5 mW or more. However, embodiments are not limited to these conditions.

The lens unit 114 may be disposed on an optical axis LX between the light source unit 112 and a first opening OP1.

That is, the lens unit 114 may be disposed on a path through which the first light L1 from the light source unit 112 passes toward the first opening OP1. The lens unit 114 functions to focus the first light L1 emitted from the light source unit 112 onto the first opening OP1 (L2). In addition, the lens unit 114 may also perform a function of converting the first light L1 emitted from the light source unit 112 into collimated light L2. For this function, the lens unit 114 may include a single lens, or may include a plurality of lenses arranged on the optical axis LX. The material of the lens unit 114 may be the same as that of a lens applied to a general camera module or an LED module.

The light emission case 116 accommodates the light source unit 112 and the lens unit 114 therein, and functions to form the first opening OP1. Although the light emission case 116 is illustrated as being separate from a top portion 172 of the housing 170 in the case of FIG. 1, embodiments are not limited thereto. That is, as illustrated in FIG. 19, FIG. 20, FIG. 21 or FIG. 22, the light emission case 116 may be formed to be integrated with the top portion 172 of the housing 170. In this case, the light emission case 116 may be omitted.

In addition, the light emission case 116 may include the first opening OP1. The first opening OP1 is a portion through which second light L2 emerging from the lens unit 114 after being emitted from the light source unit 112 is introduced into a scattering portion (or a scattering space) SS of the first flow channel unit 120 as the third light L3. The first opening OP1 may be disposed on the optical axis LX of the light emitting unit 110. The scattering portion SS will be described later in detail upon describing the first flow channel unit 120.

In addition, the first opening OP1 may have an area corresponding to a view angle of the first light L1 emitted from the light source unit 112. Generally, the view angle of an LED, which may be the light source unit 112, is about 15° when the luminous intensity of the LED is lowered to 50%. As such, light of a desired intensity may be emitted through the first opening OP1 even when the area of the first opening OP1 is not great, because the LED exhibits high beam power at a center thereof. However, if the area of the first opening OP1 is determined such that the third light L3 having a desired intensity is emitted from the light emitting unit 110, when the view angle is great, light loss may occur and, as such, luminous intensity may be weakened. Accordingly, the view angle may be determined, taking into consideration the above-described conditions. For example, when the diameter of the first opening OP1 exceeds 10 mm in the case in which the first opening OP1 has a circular planer shape, the size of the particle sensing device 100 increases, and light noise may be generated. Therefore, the diameter of the first opening OP1 may have a maximum value of 10 mm, but embodiments are not limited thereto.

The first flow channel unit 120 may be disposed beneath the light emitting unit 110 while being perpendicular to the optical axis LX of the light emitting unit 110. The first flow channel unit 120 provides a path along which air containing particles flows. Air containing particles may be introduced toward an inlet IH of the first flow channel unit 120 in a direction IN1, and may then be discharged through an outlet OH of the first flow channel unit 120 in a direction OUT1. For example, particles may be particles floating in air, and may be dust or smoke. Embodiments are not limited to a particular form of particles.

Particles contained in air introduced through the inlet IH of the first flow channel unit 120 in the direction IN1 are scattered in the scattering portion SS of the first flow channel unit 120 by the third light L3 emitted from the light source unit 110 and, as such, scattered fourth light L4 (hereinafter referred to as "scattered light") may be supplied to the light receiving unit 130.

Although the first flow channel unit 120 is illustrated as being spaced apart from both the light emitting unit 110 and the light receiving unit 130 in the case of FIG. 1, this is adapted to explain a concept of the particle sensing device 100 according to an embodiment. That is, the first flow channel unit 120 may be disposed to contact both the light emitting unit 110 and the light receiving unit 130 in accordance with an embodiment thereof, as in particle sensing devices 100A to 100D which will be described later.

The fan 180 functions to guide flow of air in the first flow channel unit 120. That is, the fan 180 functions to maintain a flow velocity of air in the first flow channel unit 120. For this function, the fan 180 may be disposed adjacent to the first flow channel unit 120 in a flow direction of air (for example, a y-axis direction). For example, as illustrated in FIG. 1, the fan 180 may be disposed at the side of the outlet OH of the first flow channel unit 120, but embodiments are not limited thereto. That is, embodiments are not limited to a particular position of the fan 180, so long as the fan 180 can guide flow of air in the first flow channel unit 120.

For example, the first flow channel unit 120 may be embodied or a rotation speed of the fan 180 may be determined such that air containing particles is maintained at a flow rate of 5 Mt/sec. However, embodiments are not limited to such conditions.

Meanwhile, the light receiving unit 130 functions to receive the fourth light L4 emerging from the first flow channel unit 120. For this function, the light receiving unit 130 may be disposed on the optical axis LX beneath the first flow channel unit 120. In this case, the fourth light L4 emerging from the first flow channel unit 120 may include at least one of scattered light or non-scattered light.

Figure 2:
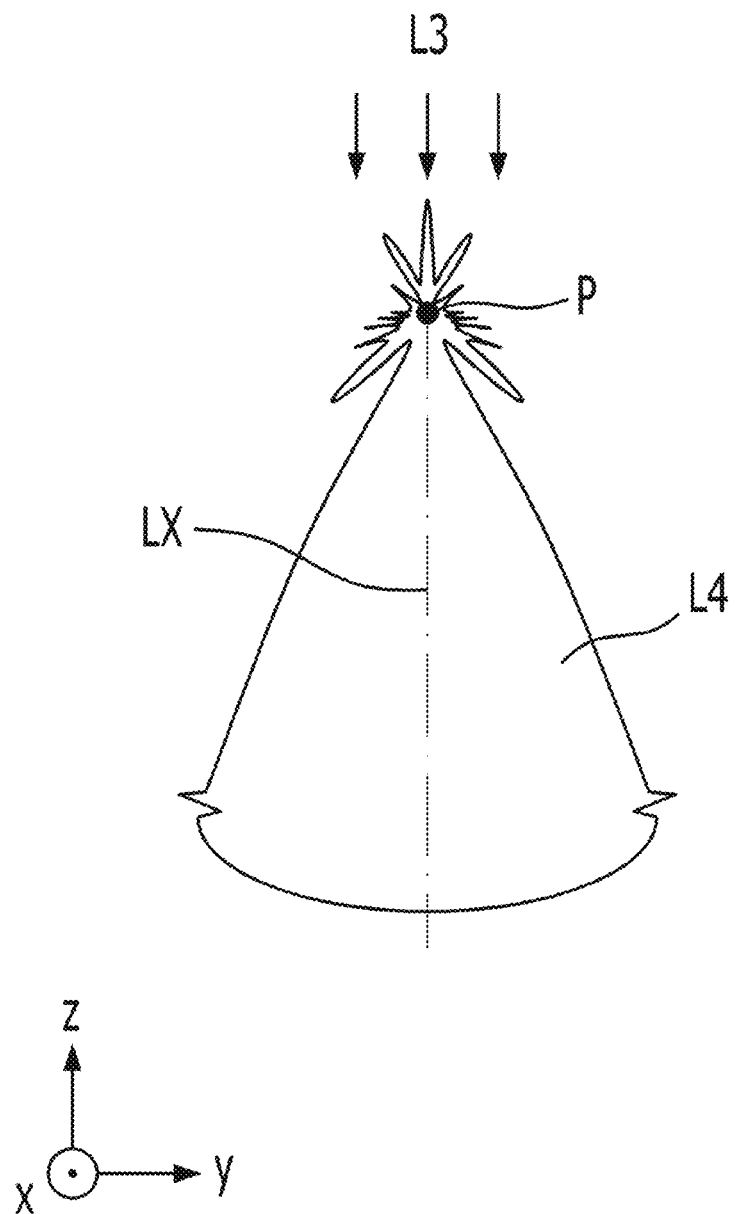
FIG. 2 illustrates an exemplary profile of light scattered by particles, that is, scattered light.

FIG. 2 illustrates an exemplary profile of light scattered by particles P, that is, scattered light.

Referring to FIG. 2, scattered light may mean light resulting from scattering of the third light L3 emitted from the light emitting unit 110 by particles P contained in air passing through the first flow channel unit 120. Non-scattered light may mean light resulting from advance of the third light L3 emitted from the light emitting unit 110 to the light receiving unit 130 without being scattered by particles P passing through the first flow channel unit 120.

The light receiving unit 130 may receive scattered light, and may supply an electrical signal of the received light to the signal converting unit 150.

The light absorbing unit 140 functions to dump fifth light L5 emerging from the light receiving unit 130. For this function, the light absorbing unit 140 may be disposed on the optical axis LX beneath the light receiving unit 130. The light absorbing unit 140 may dump unnecessary light linearly advanced without being received by the light receiving unit 130 (hereinafter referred to as "main light"), thereby confining the light and, as such, may correspond to a kind of darkroom.

The housing 170 functions to accommodate the light emitting unit 110, the first flow channel unit 120, the light receiving unit 130, and the light absorbing unit 140 therein. For example, the housing 170 may include the top portion 172, an intermediate portion 174, and a bottom portion 176. The top portion 172 is a portion capable of accommodating the light emitting unit 110 therein. The intermediate portion 174 is a portion capable of accommodating the first flow channel unit 120 and the fan 180 therein. The bottom portion 176 is a portion capable of receiving the light receiving unit 130 and the light absorbing unit 140.

Although the intermediate portion 174 of the housing 170 and the first channel unit 120 are illustrated as being separate from each other in the case of FIG. 1, embodiments are not limited thereto. In accordance with another embodiment, a first flow channel unit 120A, 120B or 120C may be formed by the intermediate portion 174 of the housing 170, as in a corresponding one of the particle sensing devices 100A to 100D which will be described later.

The signal converting unit 150 may convert a signal having the form of current received from the light receiving unit 130 into a signal having the form of a voltage, and may output converted results to the information analyzing unit 160, as an electrical signal. If necessary, the signal converting unit 150 may be omitted, and the light receiving unit 130 may perform the function of the signal converting unit 150. In this case, an electrical signal output from the light receiving unit 130 may be supplied to the information analyzing unit 160.

The information analyzing unit 160 may analyze at least one of the number, concentration, size or shape of particles P, using an electrical signal supplied from the signal converting unit 150 (or the light receiving unit 130 when the signal converting unit 150 is omitted).

Hereinafter, embodiments 100A to 100D of the particle sensing device 100 illustrated in FIG. 1 will be described with reference to the accompanying drawings.

FIG. 3 shows a sectional view of one embodiment 100A of the particle sensing device 100 shown in FIG. 1. To aid in understanding, the advancing figure of light in FIG. 3 is represented by a shade L.

The particle sensing device 100A illustrated in FIG. 3 includes a light receiving unit 110A, a first flow channel unit 120A, a light receiving unit 130A, a light absorbing unit 140, housings 172 and 176, and a fan 180. The signal converting unit 150 and the information analyzing unit 160 illustrated in FIG. 1 are omitted.

The light receiving unit 110A, the first flow channel unit 120A, the light receiving unit 130A, the light absorbing unit 140, the housings 172 and 176, and the fan 180 perform the same functions as the light receiving unit 110, the first flow channel unit 120, the light receiving unit 130, the light absorbing unit 140, the housings 172 and 176, and the fan 180 illustrated in FIG. 1 and, as such, no description will be given of overlapping portions thereof.

Referring to FIG. 3, the light source unit 112A includes a single light source. The lens unit 114A includes a single lens. The lens unit 114A is disposed on an optical axis LX between the light source 112A and a first opening OP1. The lens unit 114A functions to focus light emitted from the light source 112A onto the first opening OP1.

Figure 4:
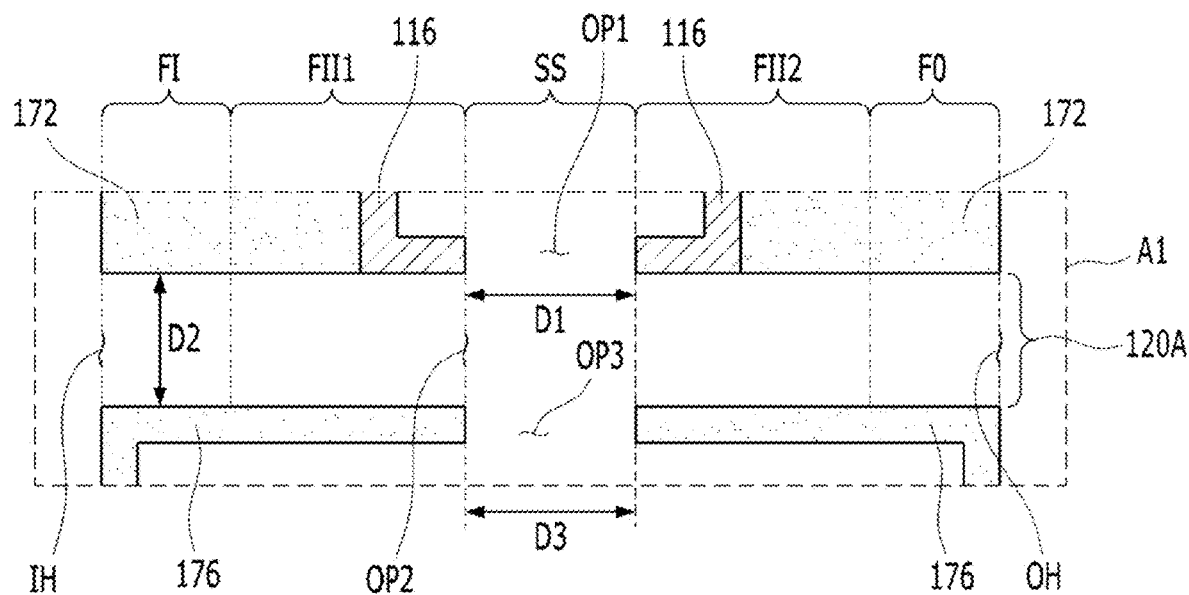
FIG. 4 is an enlarged sectional view corresponding to a portion A1 of FIG. 3, for explanation of a first flow channel unit shown in FIG. 3.

FIG. 4 is an enlarged sectional view corresponding to a portion A1 of FIG. 3, for explanation of the first flow channel unit 120A shown in FIG. 3. For convenience of description, illustration of the fan 180 shown in FIG. 3 is omitted from FIG. 4.

Referring to FIGS. 3 and 4, the first flow channel unit 120A may include an inlet channel portion FI, a first intermediate channel portion FII1, a scattering portion SS, a second intermediate channel portion FII2, and an outlet channel portion FO.

The inlet channel portion FI is a portion into which air containing particles P is introduced. The inlet channel portion FI may include an inlet IH and a first path. Here, the inlet IH corresponds to an inlet of the first flow channel unit 120 into which air is introduced from outside in a direction IN1, and the first path corresponds to a path formed between the inlet IH and the first intermediate channel portion FII1.

The outlet channel portion FO is a portion from which air containing particles P is discharged. The outlet channel portion FO may include an outlet OH and a second path. Here, the outlet OH corresponds to an outlet of the first channel 120 from which air is discharged to the outside in a direction OUT1, and the second path corresponds to a path formed between the second intermediate channel portion FII2 and the outlet OH.

The scattering portion SS is disposed on the optical axis LX between the light emitting unit 110A and the light receiving unit 130A and between the inlet channel portion FI and the outlet channel portion FO. The scattering portion SS provides a space where light emitted from the light emitting unit 110A is scattered by particles P. In this regard, the scattering portion SS may be defined as a region where the light emitting unit 110A and the light receiving unit 130A overlap with the first opening OP1 in the first flow channel unit 120, 120A in facing directions thereof (for example, z-axis directions).

The first intermediate channel portion FII1 may be disposed between the inlet channel portion FI and the scattering portion SS. The second intermediate channel portion FII2 may be disposed between the scattering portion SS and the outlet channel portion FO.

Air containing particles P is introduced through the inlet channel portion FI, and is then advanced to the scattering portion SS via the first intermediate channel portion FII1. After passing through the second intermediate channel portion FII2, the air is discharged through the outlet channel portion FO. As described above, the fan 180 is disposed to assist smooth advance of air containing particles P through the first channel 120A. For example, the fan 180 may be disposed within the outlet channel portion FO, as illustrated in FIG. 3, or may be disposed adjacent to the outlet OH of the outlet channel portion FO, differently from the illustrated case. Alternatively, in accordance with another embodiment, the fan 180 may be disposed within the inlet channel portion FI or may be adjacent to the inlet IH.

During passage of air containing particles P through the first channel 120A, third light L3 emerging from the first opening OP strikes the particles P and, as such, is scattered in a form shown in FIG. 2. In this case, in order to enable all particles P passing through the scattering portion SS to be struck by the third light L3 emitted from the light emitting unit 110A, the first opening OP1 may have an area suitable for the third light L3 emerging from the first opening OP1 to form a light curtain in the scattering portion SS in directions (for example, x and z-axis directions) perpendicular to a flow direction of air (for example, a y-axis direction).

In addition, the first channel 120A may have a cross-sectional area (an area in x and z-axis directions) smaller than an area of the first opening OP1 (an area in x and z-axis directions). For example, referring to FIG. 4, the first opening OP1 may have a width D1 greater than a height D2 of the first channel 120A, assuming that the first opening OP1 has an x-axis length equal to an x-axis length of the first channel 120A. Alternatively, referring to FIG. 4, when the first opening OP1 has a circular planar shape, and the first channel 120A has a circular cross-sectional shape, the first opening OP1 may have a diameter D1 greater than a diameter D2 of the first channel 120A.

When the cross-sectional area of the first channel 120A is smaller than the area of the first opening OP1, as described above, the amount of air, which contains particles P and passes through the first channel 120A, increases, that is, the amount of particles passing through the first channel 120A increases, and, as such, an increased amount of particles may be sensed.

In addition, the cross-sectional area of the first channel 120A may be smaller than the beam size of light emerging from the first opening OP1. In this case, the amount of air, which contains particles P and passes through the first channel 120A, increases, that is, the amount of particles passing through the first channel 120A increases, and, as such, an increased amount of particles may be sensed.

As the amount of particles P passing through the first channel 120A increases, as described above, increased information as to the particles P may be secured. In this case, accordingly, information as to particles P may be more accurately analyzed.

For passage of an increased amount of particles P, the first channel 120 illustrated in FIG. 1 may have various configurations in addition to configurations illustrated in FIGS. 3 and 4.

Figure 5A:
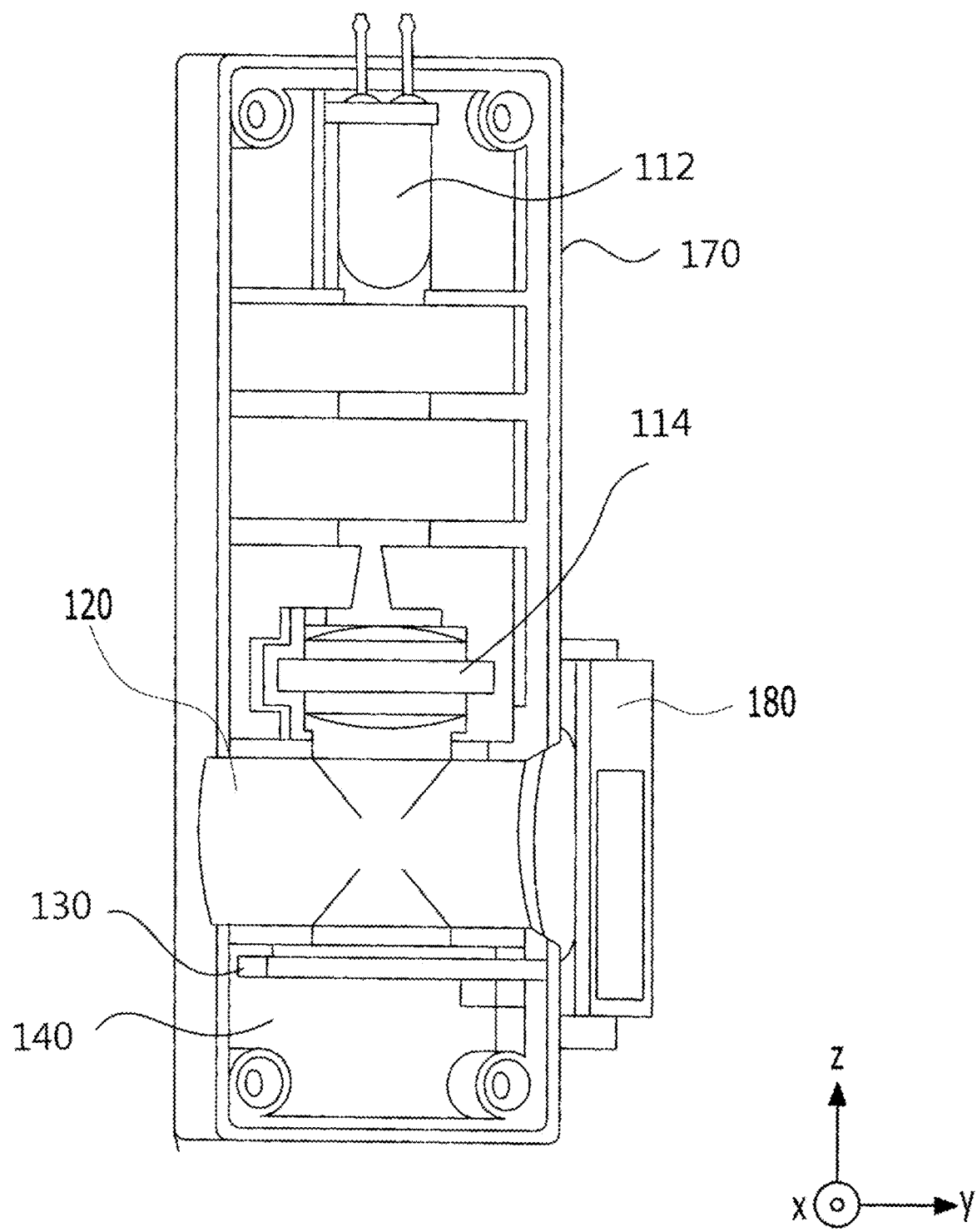
FIG. 5A shows a sectional view of another embodiment of the particle sensing device shown in FIG. 1.

FIG. 5A shows a sectional view of another embodiment of the particle sensing device 100 shown in FIG. 1.

In FIG. 5A, the fan 180 is disposed at one side surface of the housing 170 outside the housing 170 in a protruding state, differently from FIG. 3. The lens unit 114 is disposed closer to the first channel 120 than the case of FIG. 3.

Figure 5B:
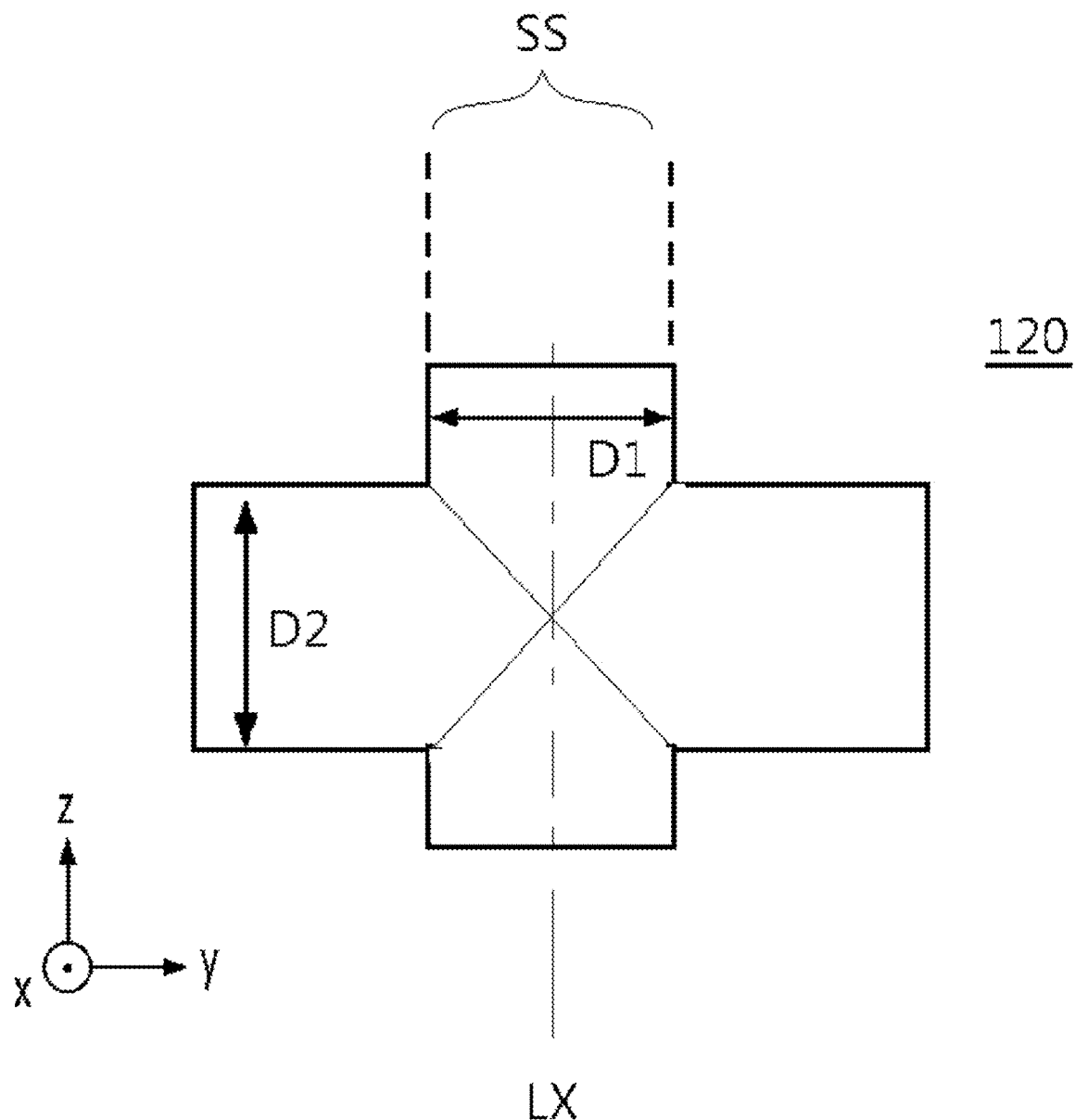
FIG. 5B is a cross-sectional view illustrating a first channel unit shown in FIG. 5A.

Such a structure of the channel is more clearly shown in FIG. 5B.

FIG. 5B is a cross-sectional view illustrating the first channel unit shown in FIG. 5A.

Referring to FIG. 5B, the first flow channel unit 120 has a portion corresponding to the scattering portion SS extending in the optical axis direction, and a portion providing a path, along which air flows in a Y-axis direction, while extending perpendicular to the optical axis. The portions of the first flow channel unit 120 have a linear tube shape having a circular cross-section, and intersect each other while maintaining diameters D1 and D2 of circular cross-sections, respectively. Accordingly, the first flow channel unit 120 wholly has the shape of a single cross-type conduit. In the following embodiments, D1 and D2 are assumed to be equal, unless expressly stated otherwise.

Meanwhile, for accurate measurement of particle concentration in the light receiving unit 130, an environment in the first flow channel unit 120, in particular, the scattering space SS, is very important. Concretely, flow of air in the scattering space SS should be constant in terms of rate and direction, and the amount of particles accumulated in the scattering space SS without flowing in accordance with flow of air should be small. Furthermore, introduction of light from the outside into the scattering space SS should be prevented.

First, in terms of flow velocity, it is preferred that flow velocity of air passing through the scattering space SS be constant. This is because the particle sensing device 100 calculates a particle concentration by counting the number of particles in air sensed per time. In other words, even when the concentration of particles dispersed in air is constant, the number of particles detected per time increases at a high flow velocity of air passing through the scattering portion SS, and decreases at a low flow velocity of the air. For this reason, when the flow velocity is inconstant, the accuracy of the calculated particle concentration may be degraded.

In addition, even if the flow velocity is constant, the measurement accuracy may be greatly degraded when a vortex flow is generated in air within the scattering space SS, or air flows freely without being linearly advanced in the Y-axis direction in the particle sensing device structure as illustrated in FIG. 5A.

The factor having greatest influence on flow velocity variation in a general particle sensing device may be flow velocity variation exhibited outside the particle sensing device. In order to minimize flow velocity variation occurring in the first channel unit 120 due to such external flow velocity variation, and to prevent introduction of light from the outside, an additional flow channel configuration may be taken into consideration, in addition to the first flow channel unit 120. An example of such a flow channel configuration is briefly illustrated in FIG. 6.

Figure 6:
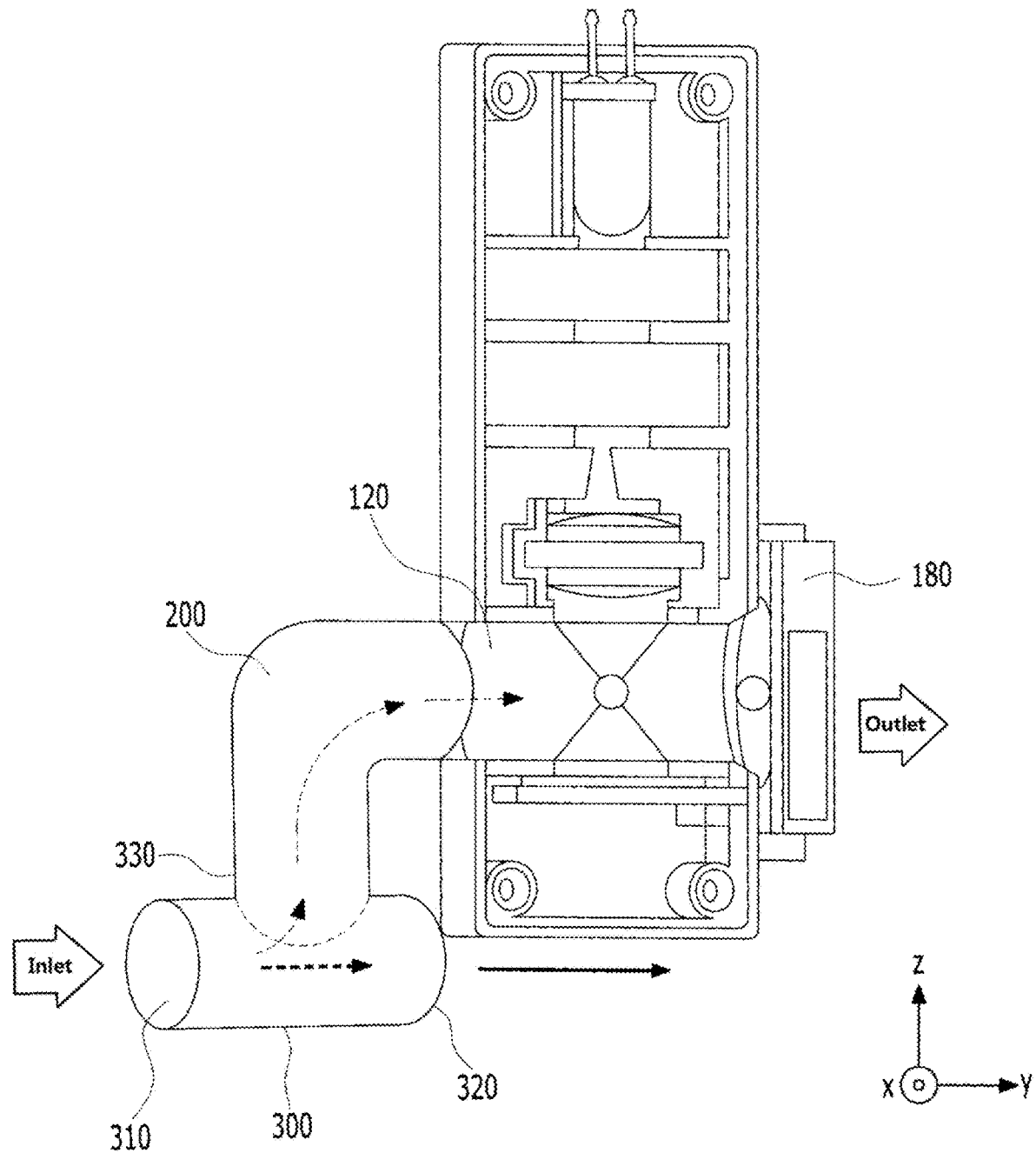
FIG. 6 is a conceptual view for explaining an example of a flow channel unit configuration according to an embodiment of the present disclosure.

FIG. 6 is a conceptual view for explaining an example of a flow channel unit configuration according to an embodiment of the present disclosure.

Referring to FIG. 6, the particle sensing device according to the embodiment may further include a second flow channel unit 200 and a fourth flow channel unit 300, in addition to the first flow channel unit 120.

The first flow channel unit 120, the second flow channel unit 200 and the fourth flow channel unit 300 may communicate with one another. The structure of the first flow channel unit 120 is identical to that as described above and, as such, no overlapping description will be given. In the following description, structures of the second flow channel unit 200 and the fourth flow channel unit 300 will be described.

The fourth flow channel unit 300 may include one external air inlet 310, and two outlets 320 and 330. The external air inlet 310 provides a path along which external air is introduced into the fourth flow channel unit 300. The first external air outlet 320 is disposed in a direction opposite to the external air inlet 310 (for example, the Y-axis direction) in a linear tube. Accordingly, the first external air outlet 320 allows at least a portion of introduced air to be discharged from the first external air outlet 320 while maintaining a movement direction thereof, immediately after introduction thereof. Meanwhile, the second external air outlet 330 may be disposed to be branched between the external air inlet 310 and the first external air outlet 320 in order to allow the introduced air to be advanced to the second flow channel unit 200 after changing in direction (for example, from the Y-axis direction to a Z-axis direction). Accordingly, the fourth flow channel unit 300 may wholly have the shape of a T-shaped conduit. However, this shape is illustrative, and the shape of the fourth flow channel unit is not limited thereto.

The second flow channel unit 200 extends from the second external air outlet 330 of the fourth flow channel unit 300, and communicates with the first flow channel unit 120. The second flow channel unit 200 provides a path along which the flow direction of external air branched from the second external air outlet 330 is changed once or more.

Since the flow direction of air introduced from the outside is changed twice or more, as described above, influence according to external flow velocity variation is reduced and, as such, an effect of shielding external light may be expected. For example, when the flow velocity of air introduced in a direction of the external air inlet 310 increases, a correspondingly increased amount of air is directly discharged through the first external air outlet 320 and, as such, the amount of air introduced into the second external air outlet 330 is not increased in proportion to the external air flow velocity increase. On the contrary, even when the flow velocity of air introduced in the direction of the external air inlet 310 decreases, external air may be stably introduced in accordance with operation of the fan 180.

Hereinafter, structures of the second flow channel unit and the third flow channel unit having optimal effects will be discussed, taking into consideration the above-described matters. Concretely, degree of influence according to external flow velocity variation reduced in accordance with various structures and disposition forms of the second flow channel unit and the third flow channel unit will be verified, and influence according to the overall flow channel length, the curvature (radius of curvature) of a channel portion where the flow direction of air is changed, and variation in channel diameter will also be determined. In the overall channel structure, the fourth flow channel unit and the second flow channel unit may be disposed along a single plane, or may be disposed along two or more planes. FIGS. 7A to 14C illustrate the case in which the fourth flow channel unit and the second flow channel unit are disposed along a single plane. FIGS. 15A to 18B illustrate the case in which the second flow channel unit is disposed along two planes.

In addition, for convenience of description, in FIGS. 7A to 18B, the structure of the first flow channel unit 120 is assumed to have a cross-type conduit shape in which two linear tubes having a circular cross-sectional shape with a uniform diameter intersect each other, as described above with reference to FIGS. 5A and 5B.

Figure 7A:
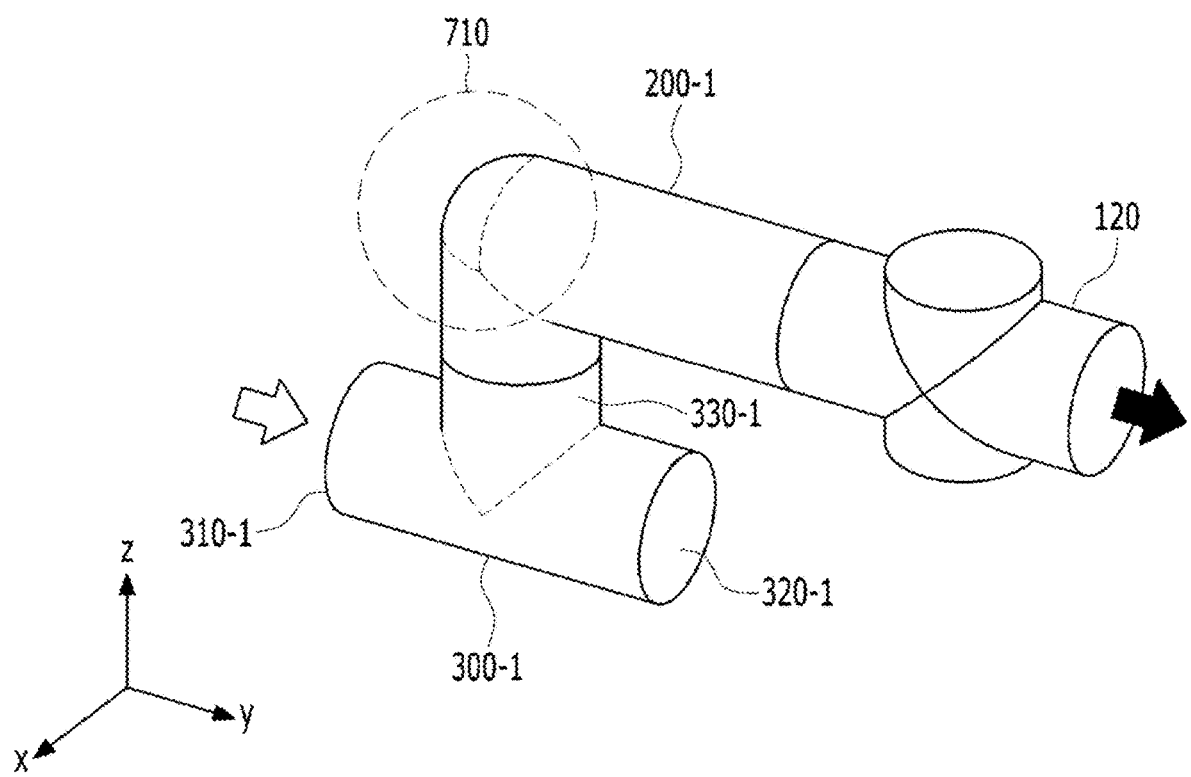
FIG. 7A illustrates an example of a flow channel structure according to an embodiment of the present disclosure.

Among the above-described cases, the case in which the second flow channel unit is disposed along a single plane, and the flow direction of air in the second flow channel unit is changed once or less will be described first with reference to FIGS. 7A to 9B. FIG. 7A illustrates an example of a flow channel structure according to an embodiment of the present disclosure.

Referring to FIG. 7A, the flow channel structure is similar to that illustrated in FIG. 6. In detail, a fourth flow channel unit 300-1 has a T-shaped conduit structure such that an external air inlet 310-1 and a first external air outlet 320-1 are disposed in opposite directions of a linear tube, respectively, and a second external air outlet 330-1 is branched between the external air inlet 310-1 and the first external air outlet 320-1 while having a direction different therefrom (for example, a Z-axis direction).

A second flow channel unit 200-1 extends from the second external air outlet 330-1, and communicates with the first flow channel unit 120. The flow direction of air in the second flow channel unit 200-1 is changed once at a curved portion 710 (for example, from the Z-axis direction to a Y-axis direction).

Figure 7B:
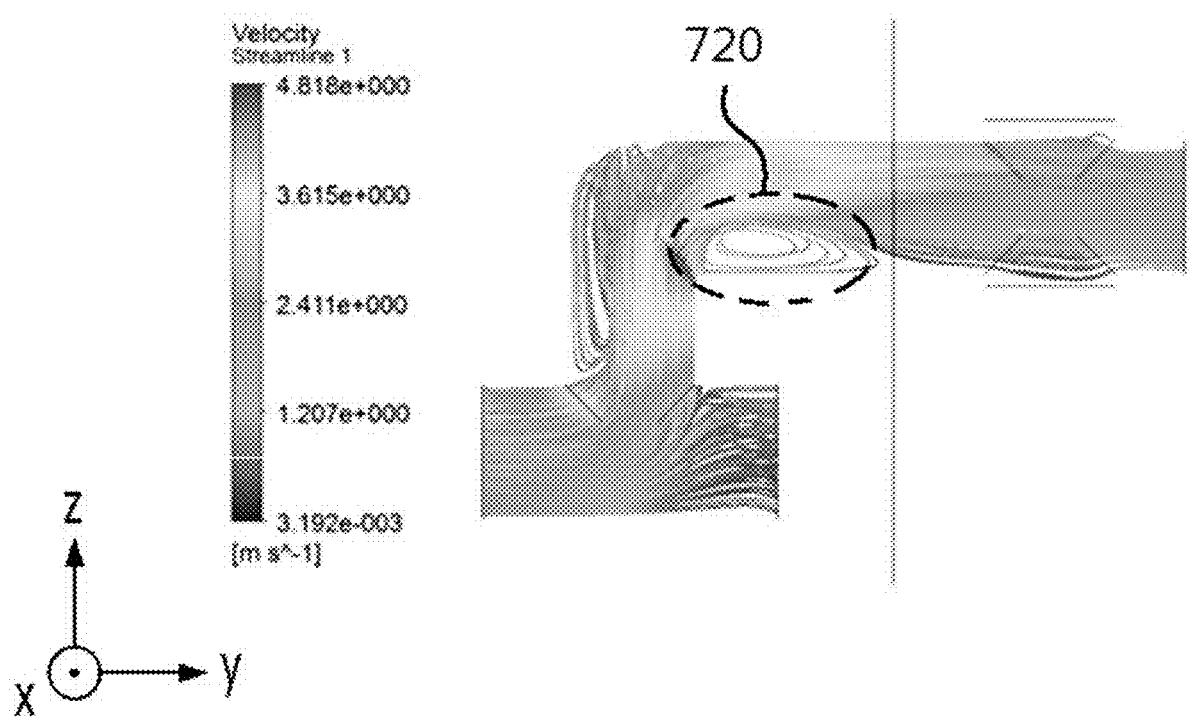
FIG. 7B illustrates results of a flow velocity simulation in the flow channel structure shown in FIG. 7A.

FIG. 7B illustrates results of a flow velocity simulation in the flow channel structure shown in FIG. 7A.

Referring to FIG. 7B, flow velocity variation of a sensing unit according to flow velocity variation of external air in the flow channel structure illustrated in FIG. 7A was 18.5%.

Figure 8A:
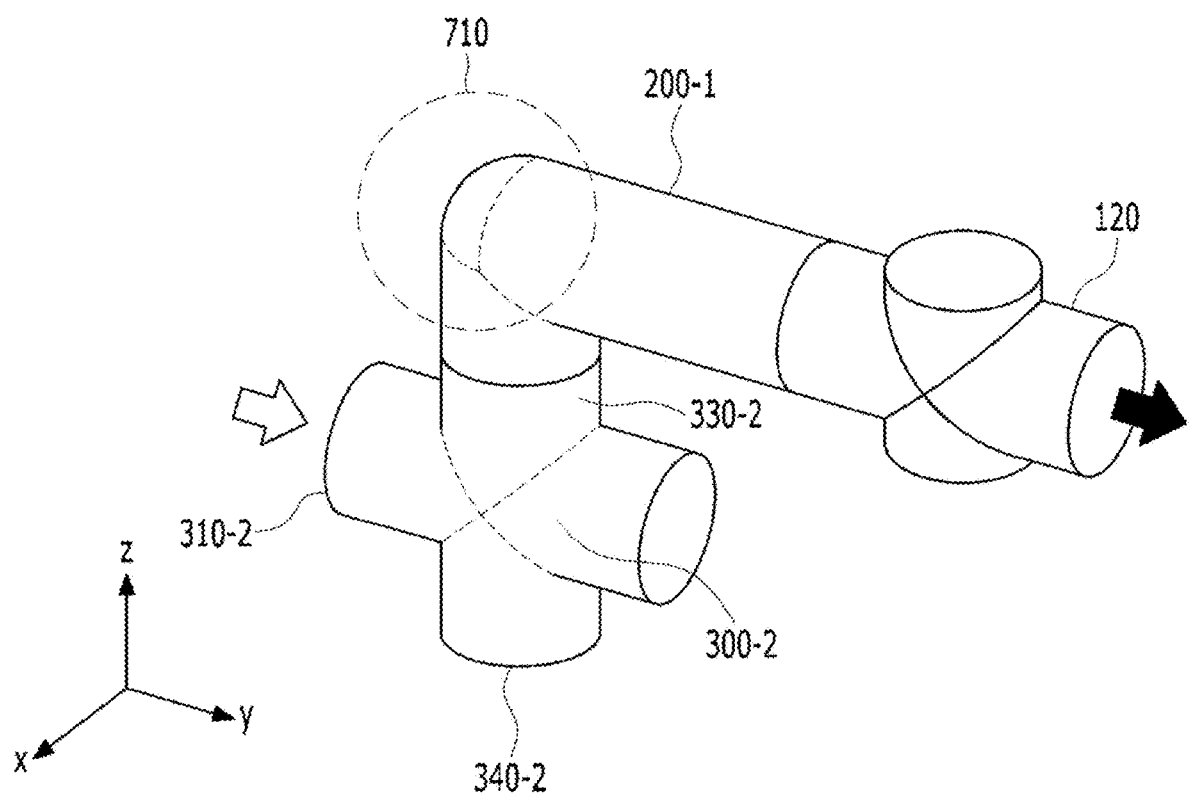
FIG. 8A illustrates an example of a flow channel structure according to another embodiment of the present disclosure.

FIG. 8A illustrates an example of a flow channel structure according to another embodiment of the present disclosure.

Referring to FIG. 8A, a fourth flow channel unit 300-2 is changed from the T-shaped conduit to a cross-shaped conduit when compared with that of FIG. 7A. In detail, the fourth flow channel unit 300-2 further includes an extension portion 340-2 extending after being branched in a direction opposite to the second external air outlet 330-2 (that is, a −Z-axis direction), and having a structure with a closed end.

Figure 8B:
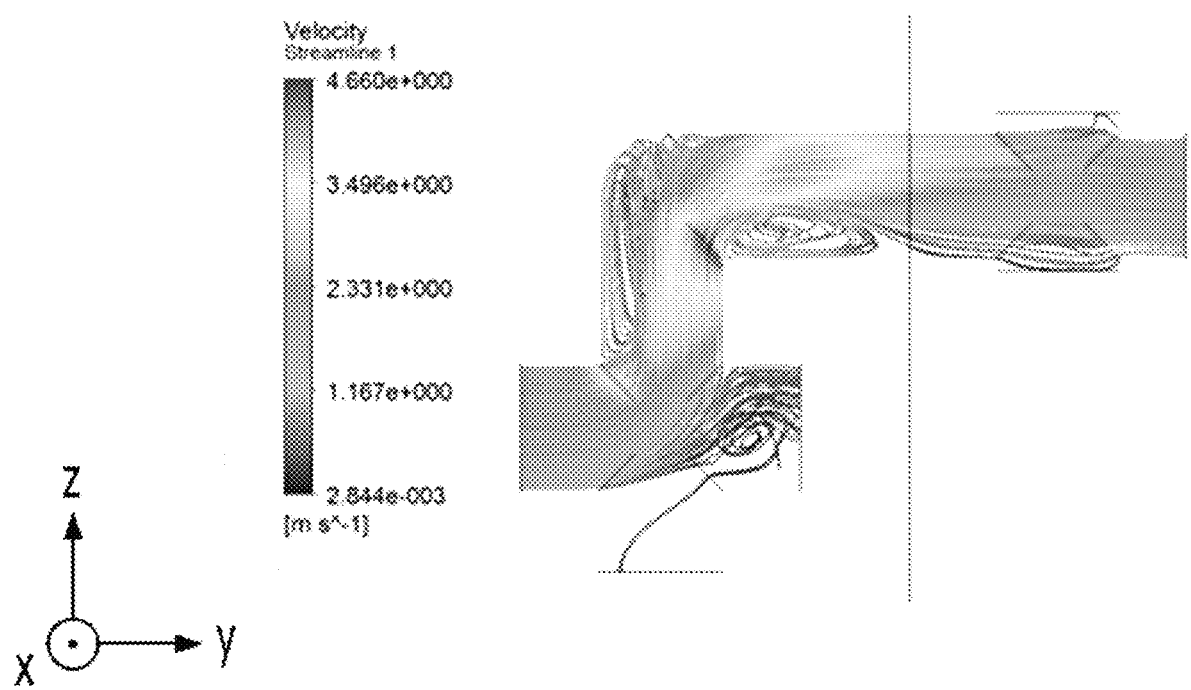
FIG. 8B illustrates results of a flow velocity simulation in the flow channel structure shown in FIG. 8A.

FIG. 8B illustrates results of a flow velocity simulation in the flow channel structure shown in FIG. 8A.

Referring to FIG. 8B, the flow velocity variation of a sensing unit according to flow velocity variation of external air in the flow channel structure illustrated in FIG. 8A was 12.2% and, as such, is more than 10%.

Figure 9A:
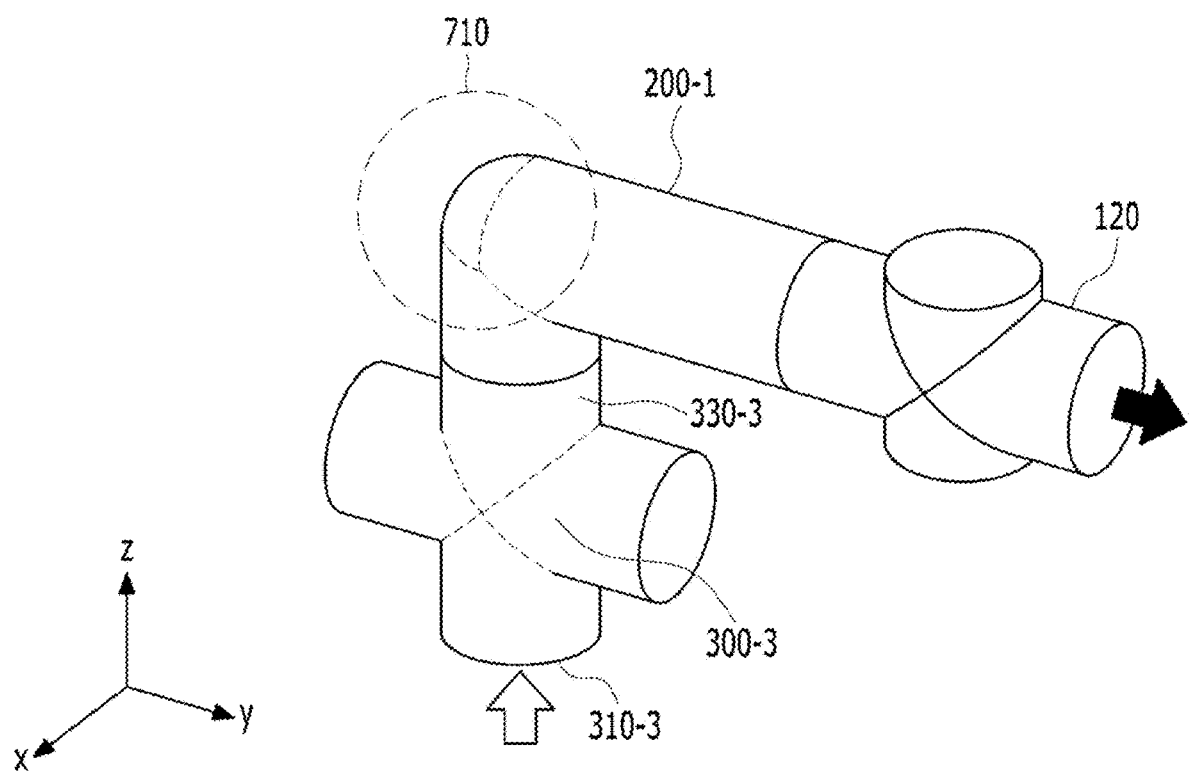
FIG. 9A illustrates an example of a flow channel structure according to another embodiment of the present disclosure.

FIG. 9A illustrates an example of a flow channel structure according to another embodiment of the present disclosure.

Referring to FIG. 9A, the flow channel structure has a fourth flow channel unit 300-3 having a cross-shaped conduit structure, similarly to that of FIG. 8A. In addition, a second external air outlet 330-3 is disposed in a direction opposite to an external air inlet 310-3. Opposite ends of a branch tube extending in a Y-axis direction is closed. Accordingly, the direction of a substantial air flow is changed once at the curved portion 710.

Figure 9B:
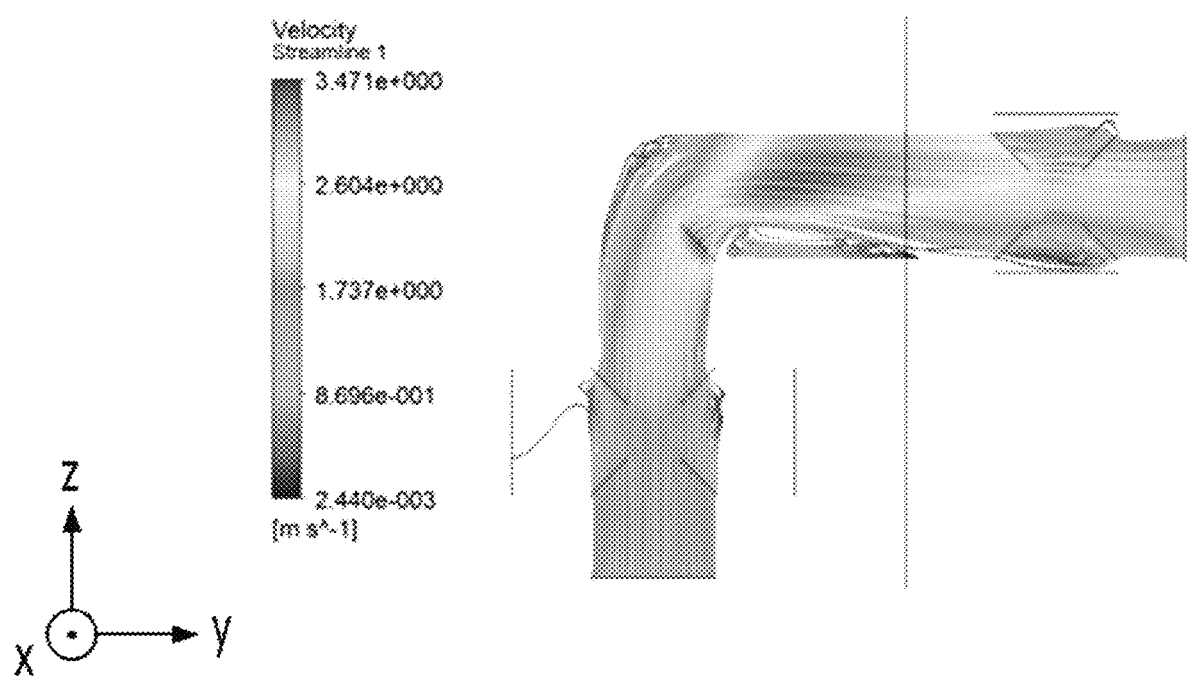
FIG. 9B illustrates results of a flow velocity simulation in the flow channel structure shown in FIG. 9A.

FIG. 9B illustrates results of a flow velocity simulation in the flow channel structure shown in FIG. 9A.

Referring to FIG. 9B, flow velocity variation of a sensing unit according to flow velocity variation of external air in the flow channel structure illustrated in FIG. 9A was 6.6%.

Figure 10A:
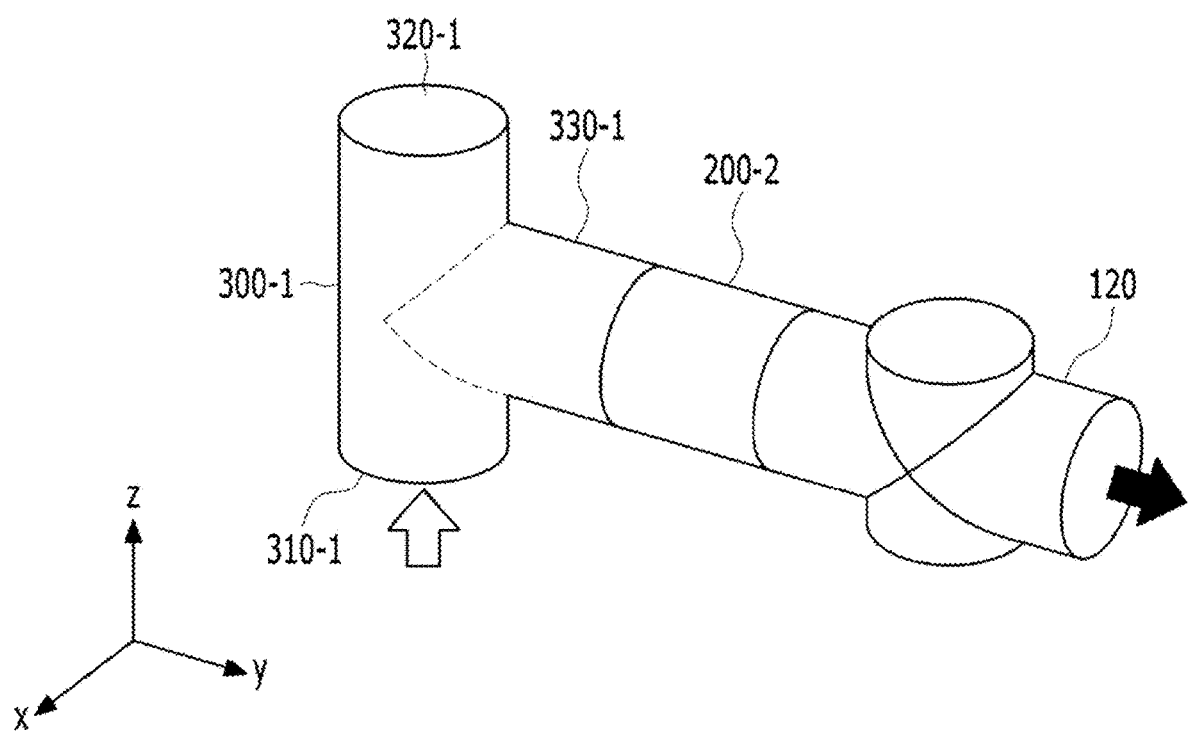
FIG. 10A illustrates an example of a flow channel structure according to another embodiment of the present disclosure.

FIG. 10A illustrates an example of a flow channel structure according to another embodiment of the present disclosure.

Referring to FIG. 10A, the fourth flow channel unit 300-1 is identical to that of FIG. 7A. In this case, the external air inlet 310-1 is directed to a −Z-axis direction. A second flow channel unit 200-2 extends linearly from the second external air outlet 330-1 such that the second flow channel unit 200-2 directly communicates with the first flow channel unit 120. Accordingly, the direction of a substantial air flow is changed once at the fourth flow channel unit 300-1.

Figure 10B:
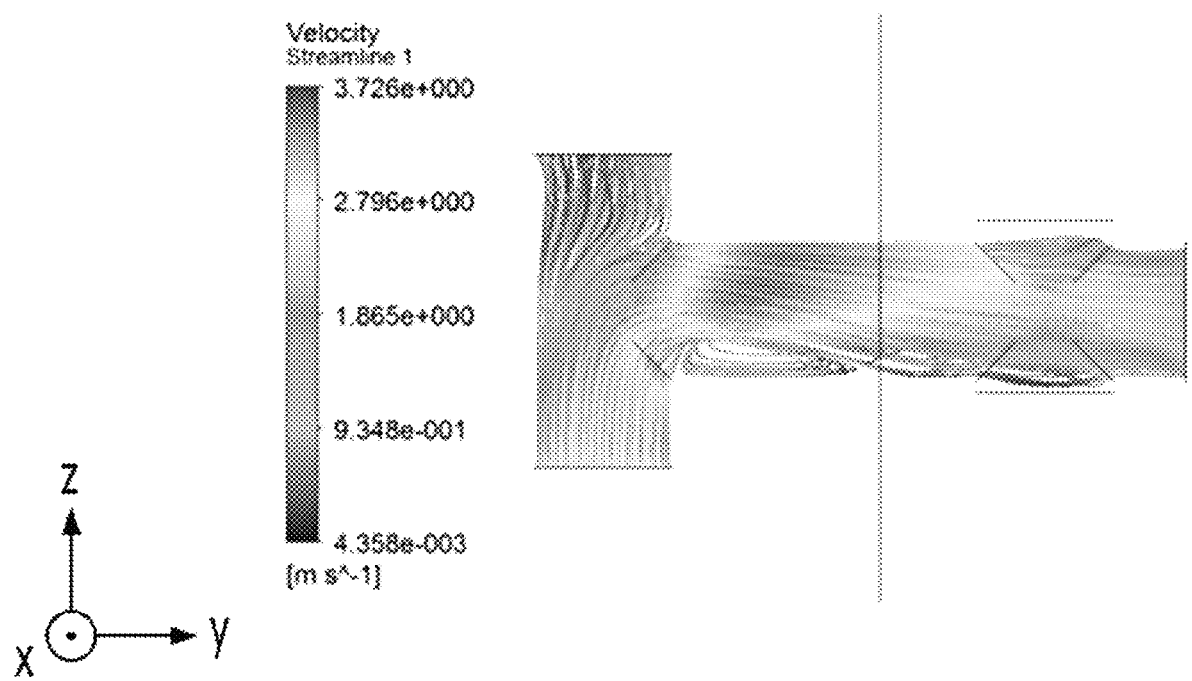
FIG. 10B illustrates results of a flow velocity simulation in the flow channel structure shown in FIG. 10A.

FIG. 10B illustrates results of a flow velocity simulation in the flow channel structure shown in FIG. 10A.

Referring to FIG. 10B, flow velocity variation of a sensing unit according to flow velocity variation of external air in the flow channel structure illustrated in FIG. 10A was 21.2%.

In accordance with comparison of simulation results of the above-described four different flow channel structures referring to FIGS. 7A to 10B, a vortex flow 720 is generated immediately after air passes through the curved portion 710 because the radius of central curvature of the curved portion 710 corresponds to ¼ of a diameter of the flow channel in a cross-sectional direction and, as such, is relatively small. For this reason, a flow of air containing particles is biased toward one side and, as such, tends to flow non-uniformly in the scattering portion. This results in insufficient buffering of external flow velocity variation. For example, it could be seen that the case of FIG. 9A having a sufficient linear path present before the curved portion 710 is superior over the case of FIG. 7A or 8A in which the flow direction of air is changed once again at the curved portion 710 immediately after being changed at the fourth flow channel unit 300-2. In addition, it could be seen that, when the cases of FIGS. 9A and 10A are compared with each other, the case of FIG. 10A having a short absolute path length exhibits an abruptly degraded dumping effect, even though change of air flow direction is carried out once in either case.

After collectively taking into consideration the above-described results, it can be seen that an insufficient radius of curvature of the curved portion and an insufficient overall flow channel length adversely affect buffering of external flow velocity variation.

Next, the case in which the second flow channel unit is disposed along a single plane, and the flow direction of air in the second flow channel unit is changed twice or more will be described with reference to FIGS. 11A to 14C.

Figure 11A:
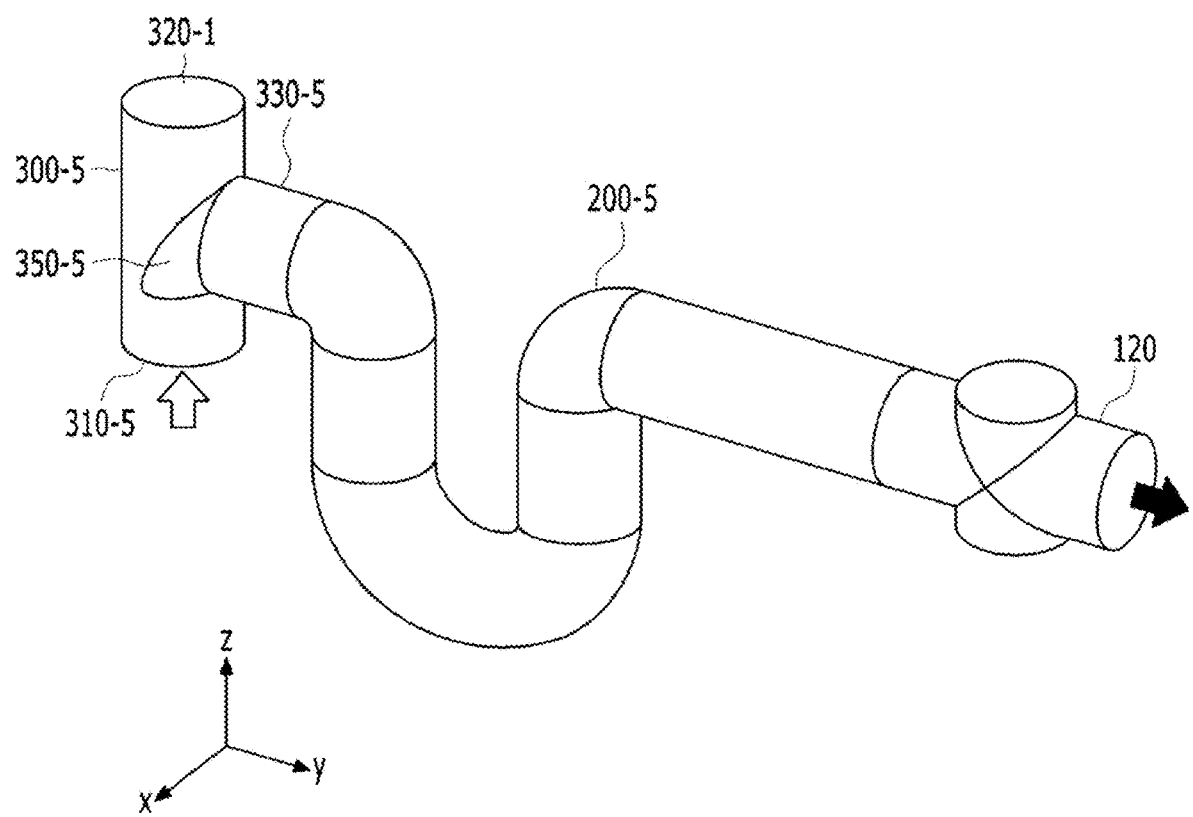
FIG. 11A illustrates an example of a flow channel structure according to an embodiment of the present disclosure in which the flow direction of air in the second flow channel unit is changed twice or more.

FIG. 11A illustrates an example of a flow channel structure according to an embodiment of the present disclosure in which the flow direction of air in the second flow channel unit is changed twice or more.

Referring to FIG. 11A, a fourth flow channel unit 300-5 has a similar structure to that of the fourth flow channel unit 300-1 shown in FIG. 7A, but further includes a branch portion 350-5 having a predetermined radius of curvature between a linear tube and a second external air outlet 330-5. As the fourth flow channel 300-5 further includes the branch portion 350-5, external air introduced from an external air inlet 310-5 is changed in flow direction at a greater radius of curvature than that of FIG. 7A when branched into a second external air outlet 330-5 and, as such, formation of a vortex flow in the vicinity of the second external air outlet 330-5 may be further suppressed.

The second external air outlet 330-5 extends to a second flow channel unit 200-5 which, in turn, communicates with the first flow channel unit 120.

A structure of the second flow channel unit 200-5 will be described in more detail with reference to FIG. 11B.

Figure 11B:
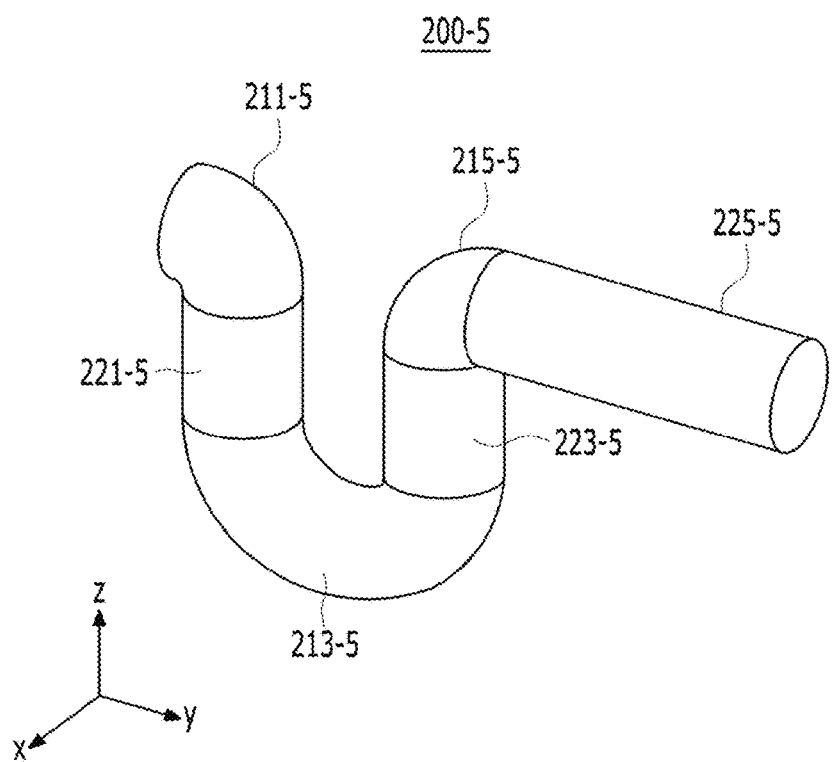
FIG. 11B illustrates a structure of a second flow channel unit shown in FIG. 11A.

FIG. 11B illustrates the structure of the second flow channel unit shown in FIG. 11A.

Referring to FIG. 11B, the second flow channel unit 200-5 includes a first curved portion 211-5, a first extension portion 221-5, a second curved portion 213-5, a second extension portion 223-5, a third curved portion 215-5, and a third extension portion 225-5, which are sequentially disposed in this order, and are connected to one another.

In the following description, each "curved portion" may be used together with a "bent portion", a "curving portion", a "curve", a "flexed portion", an "inflection portion", etc., and each "extension portion" may be used together with a "linear portion", a "linear tube portion", an "I-shaped tube portion", etc. However, it is obvious to those skilled in the art that these elements are illustrative, and may be designated by any terms, so long as the terms represent a constituent element of a flow channel bent while having a curvature (or a radius of curvature) to change a flow direction of air and a constituent element of a flow channel to maintain a flow direction of air, respectively.

In more detail, the first curved portion 211-5 may change a flow direction of air from a Y-axis direction to a −Z-axis direction, and the second curved portion 213-5 may change a flow direction of air from the −Z-axis direction to a Z-axis direction in accordance with advance thereof in the Y-axis direction. In addition, the third curved portion 215-5 may change a flow direction of air from the Z-axis direction to the Y-axis direction.

Accordingly, it can be seen that the second flow channel unit 200-5 shown in FIG. 11A consequently changes the flow direction of air a total of three times.

Figure 11C:
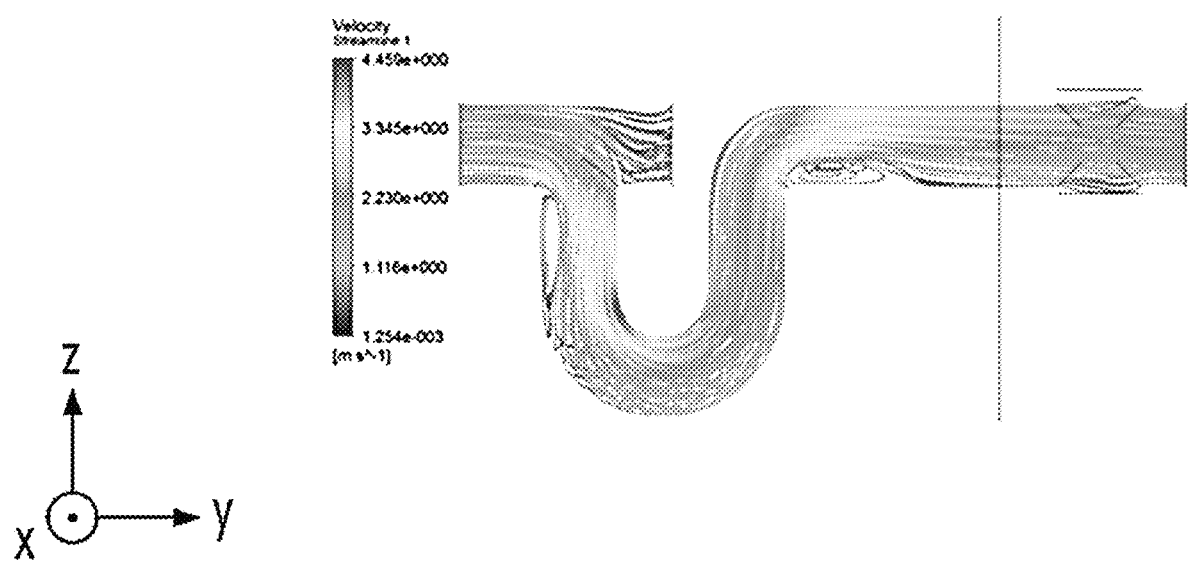
FIG. 11C illustrates results of a flow velocity simulation in the flow channel structure shown in FIG. 11A.

FIG. 11C illustrates results of a flow velocity simulation in the flow channel structure shown in FIG. 11A.

Referring to FIG. 11C, the flow velocity variation of a sensing unit according to flow velocity variation of external air in the flow channel structure illustrated in FIG. 11A was 9.4%.

Figure 12A:
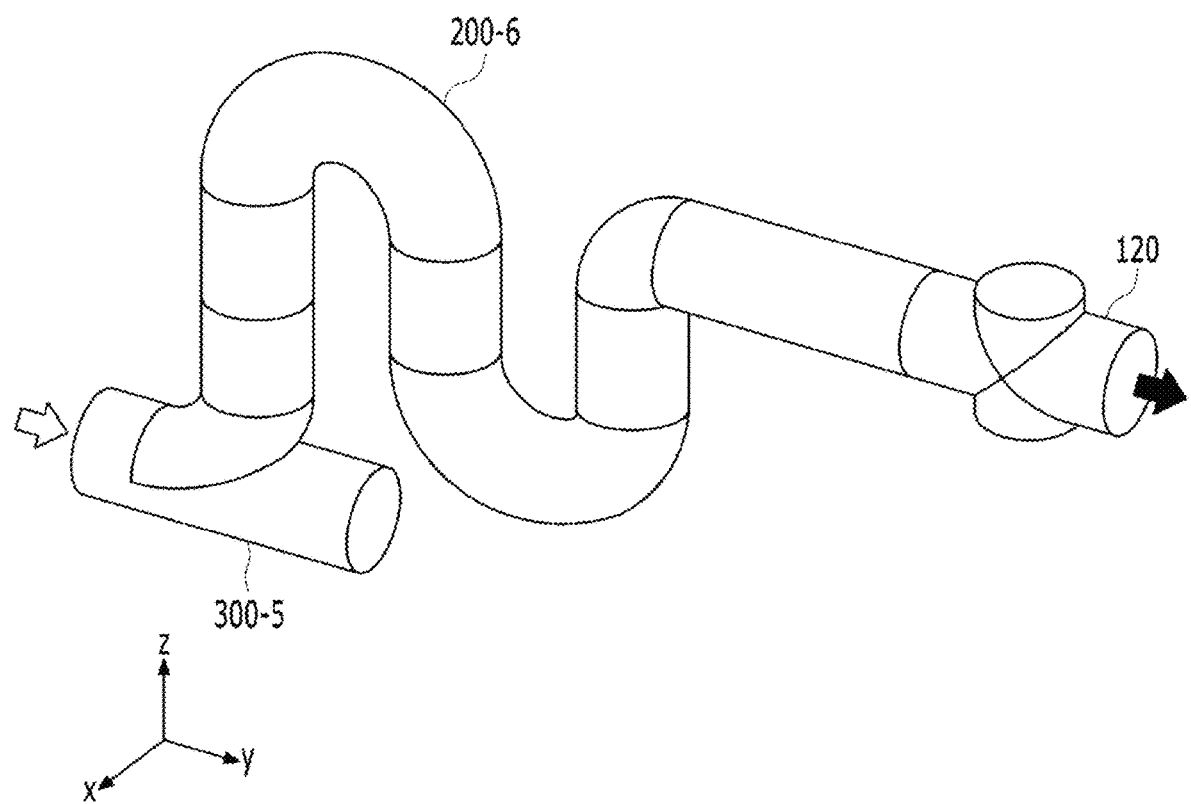
FIG. 12A illustrates another example of the flow channel structure in which the flow direction of air in the second flow channel unit according to the embodiment of the present disclosure is changed twice or more.

FIG. 12A illustrates another example of the flow channel structure in which the flow direction of air in the second flow channel unit according to the embodiment of the present disclosure is changed twice or more.

Referring to FIG. 12A, a disposition direction of the fourth flow channel unit 300-5 with reference to the first flow channel unit 120 and the configuration of a second flow channel unit 200-6 are varied, as compared to those of FIG. 11A.

The structure of the second flow channel unit 200-6 will be described in more detail with reference to FIG. 12B.

Figure 12B:
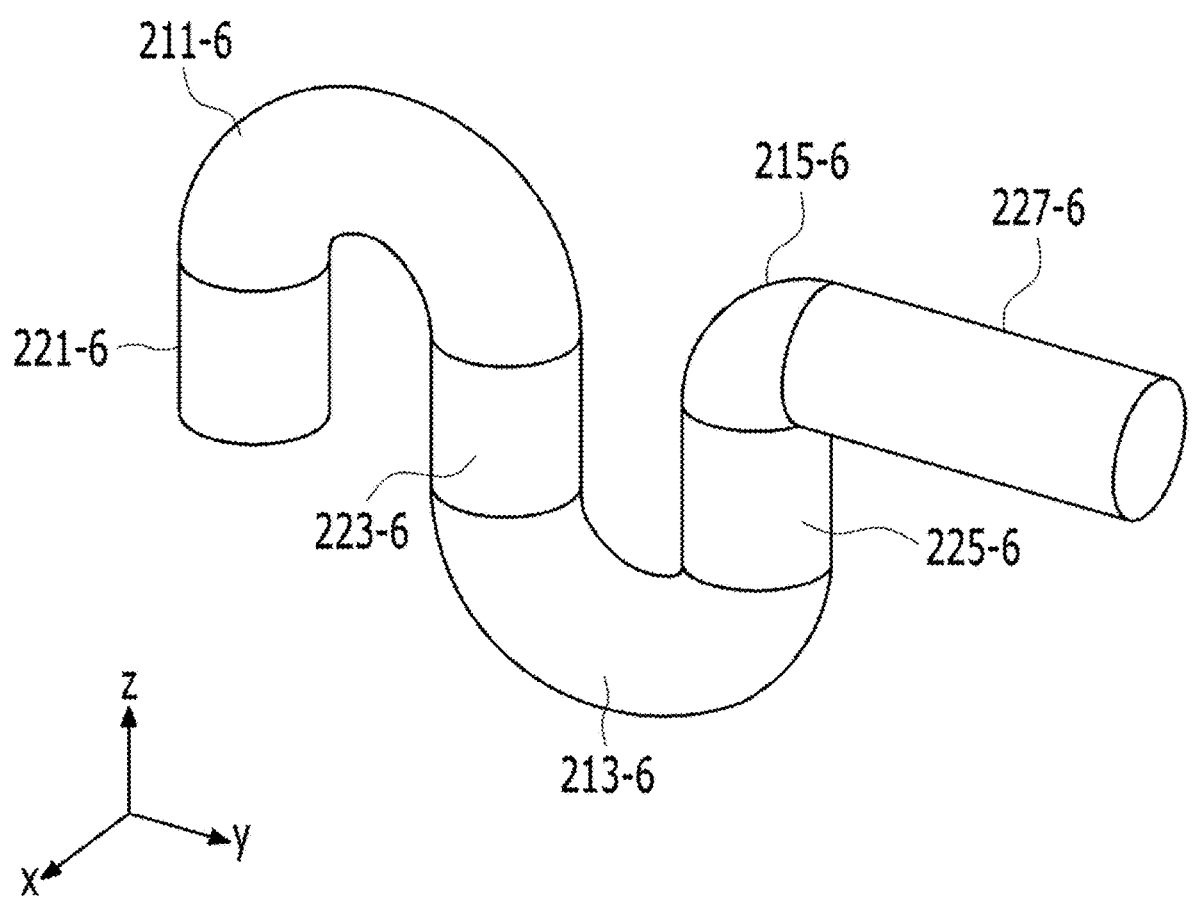
FIG. 12B illustrates the structure of the second flow channel unit shown in FIG. 12A.

FIG. 12B illustrates the structure of the second flow channel unit shown in FIG. 12A.

Referring to FIG. 12B, the second flow channel unit 200-6 includes a first extension portion 221-6, a first curved portion 211-6, a second extension portion 223-6, a second curved portion 213-6, a third extension portion 225-6, and a third curved portion 215-6, which are sequentially disposed in this order, and are connected to one another.

In more detail, the first curved portion 211-6 may change a flow direction of air from a Z-axis direction to a −Z-axis direction in accordance with advance thereof in a Y-axis direction, and the second curved portion 213-6 may change a flow direction of air from the −Z-axis direction to the Z-axis direction in accordance with advance thereof in the Y-axis direction. In addition, the third curved portion 215-6 may change a flow direction of air from the Z-axis direction to the Y-axis direction.

Accordingly, it can be seen that the second flow channel unit 200-6 shown in FIG. 12A consequently changes the flow direction of air a total of three times.

Figure 12C:
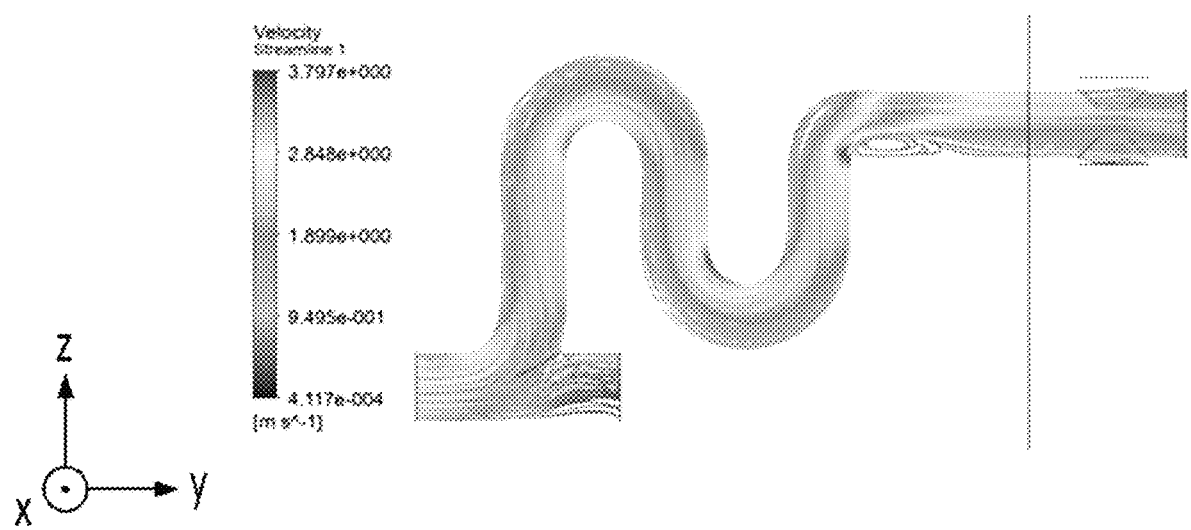
FIG. 12C illustrates results of a flow velocity simulation in the flow channel structure shown in FIG. 12A.

FIG. 12C illustrates results of a flow velocity simulation in the flow channel structure shown in FIG. 12A.

Referring to FIG. 12C, the flow velocity variation of a sensing unit according to flow velocity variation of external air in the flow channel structure illustrated in FIG. 12A was 9.75%.

Figure 13A:
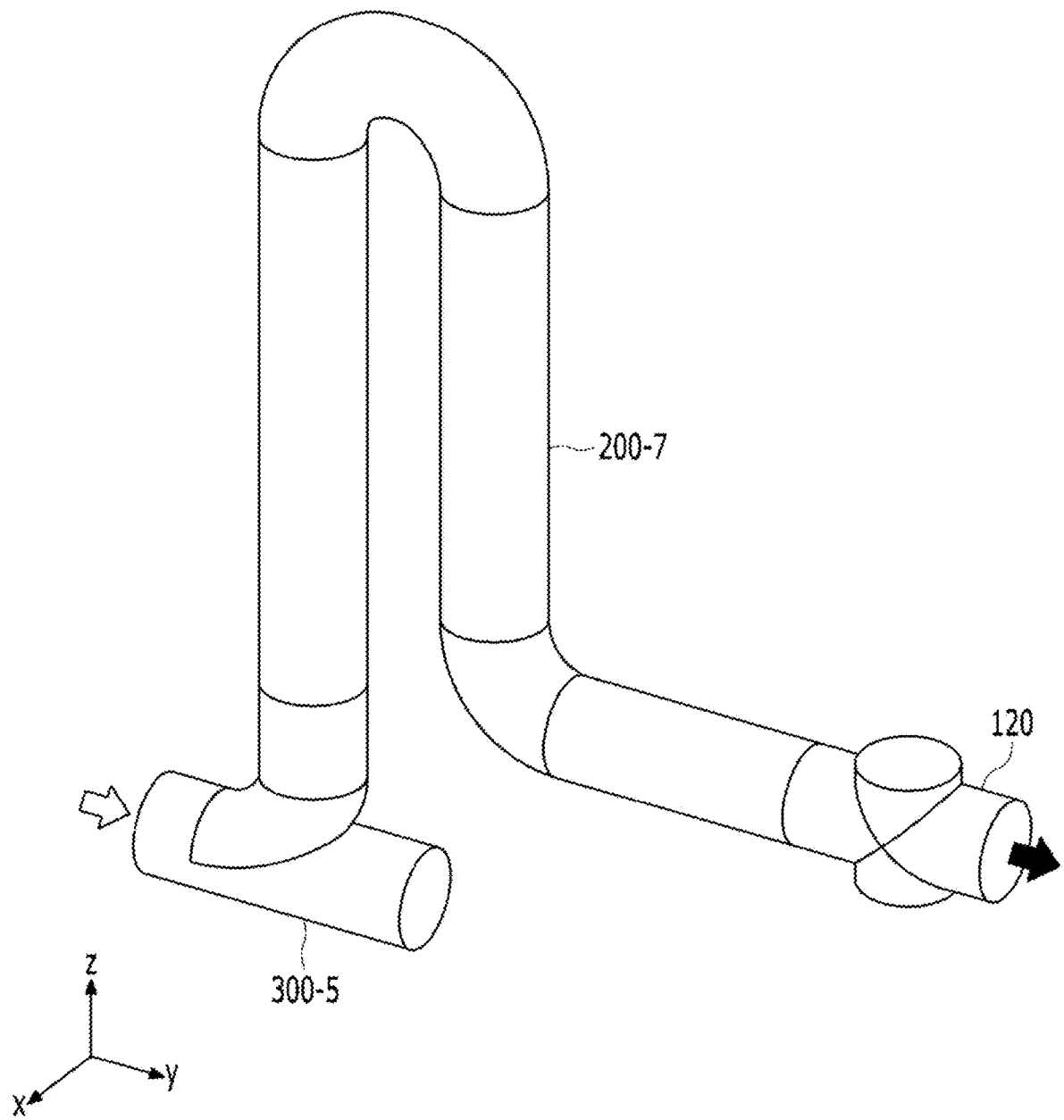
FIG. 13A illustrates another example of the flow channel structure in which the flow direction of air in the second flow channel unit according to the embodiment of the present disclosure is changed twice or more.

FIG. 13A illustrates another example of the flow channel structure in which the flow direction of air in the second flow channel unit according to the embodiment of the present disclosure is changed twice or more.

Referring to FIG. 13A, a second flow channel unit 200-7 has a varied configuration, as compared to that of FIG. 12A.

The structure of the second flow channel unit 200-7 will be described in more detail with reference to FIG. 13B.

Figure 13B:
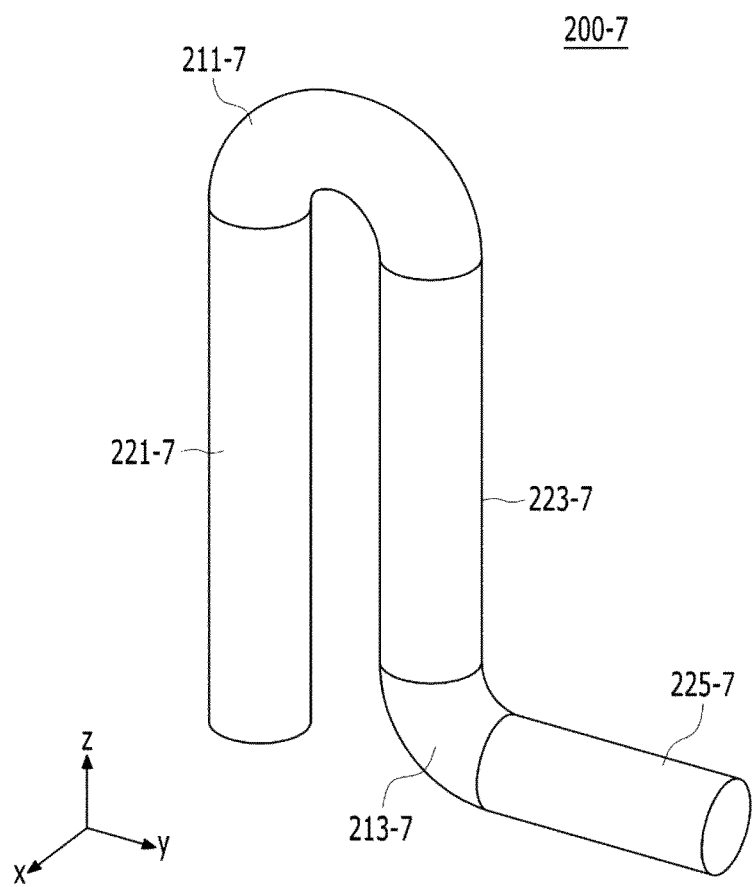
FIG. 13B illustrates the structure of the second flow channel unit shown in FIG. 13A.

FIG. 13B illustrates the structure of the second flow channel unit shown in FIG. 13A.

Referring to FIG. 13B, the second flow channel unit 200-7 includes a first extension portion 221-7, a first curved portion 211-7, a second extension portion 223-7, a second curved portion 213-7, and a third extension portion 225-7, which are sequentially disposed in this order, and are connected to one another.

In more detail, the first curved portion 211-7 may change a flow direction of air from a Z-axis direction to a −Z-axis direction in accordance with advance thereof in a Y-axis direction, and the second curved portion 213-7 may change a flow direction of air from the −Z-axis direction to the Y-axis direction in accordance with advance thereof in the Y-axis direction.

Accordingly, it can be seen that the second flow channel unit 200-7 shown in FIG. 13A consequently changes the flow direction of air a total of two times.

Figure 13C:
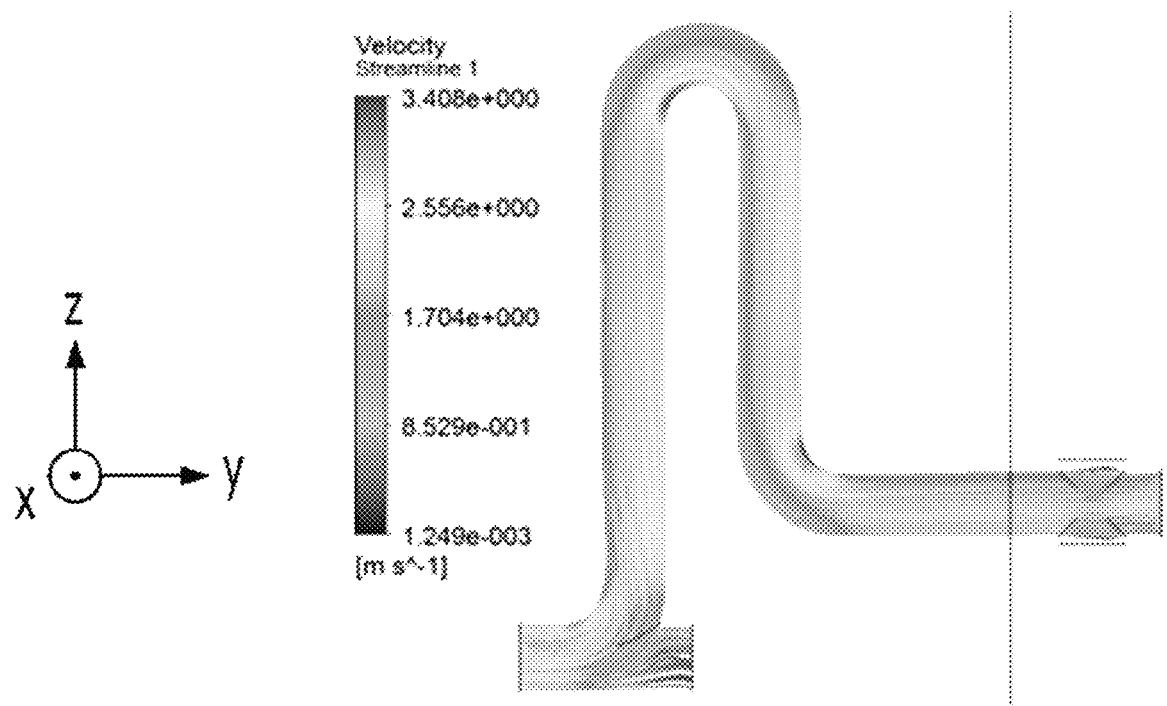
FIG. 13C illustrates results of a flow velocity simulation in the flow channel structure shown in FIG. 13A.

FIG. 13C illustrates results of a flow velocity simulation in the flow channel structure shown in FIG. 13A.

Referring to FIG. 13C, the flow velocity variation of a sensing unit according to flow velocity variation of external air in the flow channel structure illustrated in FIG. 13A was 5%.

Figure 14A:
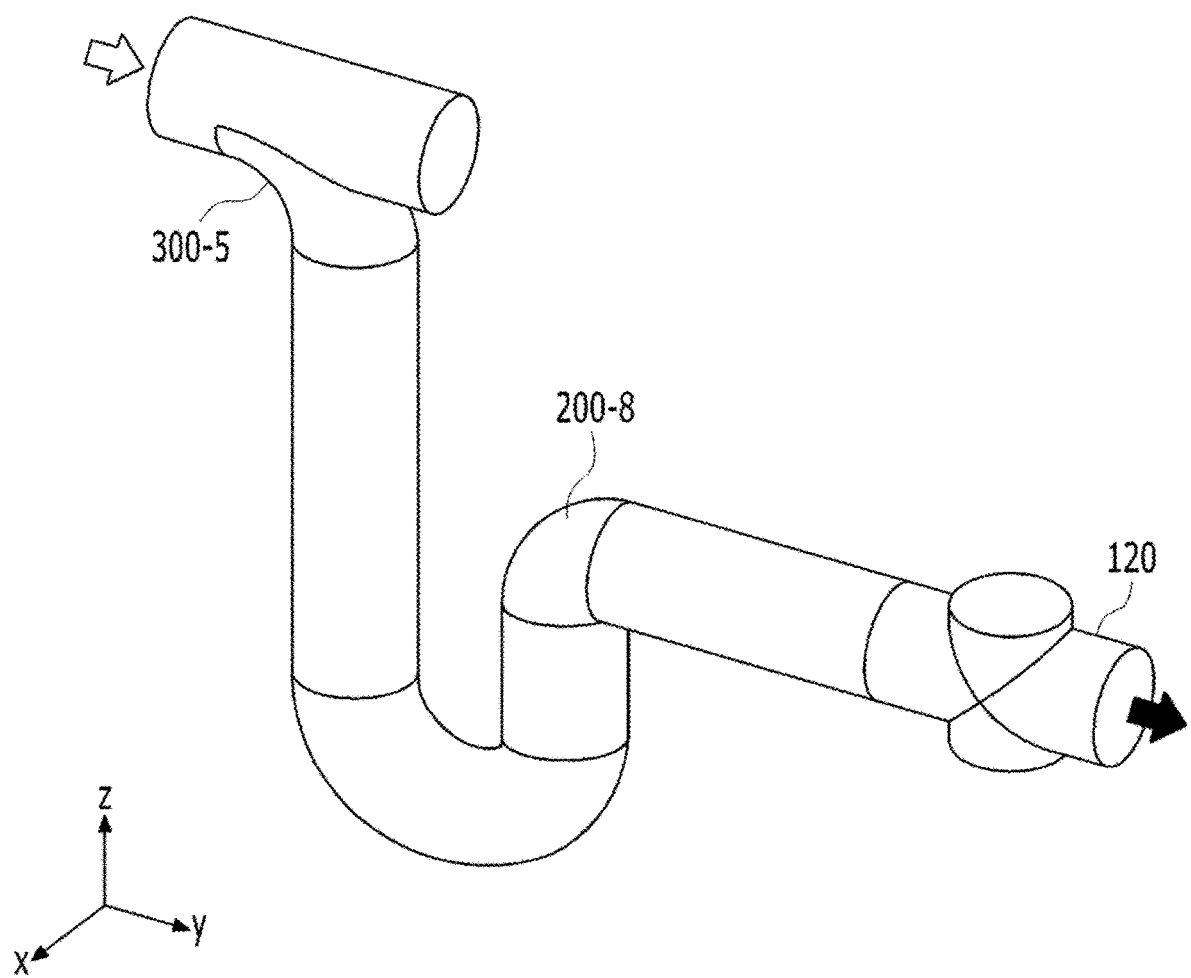
FIG. 14A illustrates another example of the flow channel structure in which the flow direction of air in the second flow channel unit according to the embodiment of the present disclosure is changed twice or more.

FIG. 14A illustrates another example of the flow channel structure in which the flow direction of air in the second flow channel unit according to the embodiment of the present disclosure is changed twice or more.

Referring to FIG. 14A, the entirety of the flow channel structure is vertically inverted with reference to a Z-axis direction, as compared to that of FIG. 13A, and a second flow channel unit 200-8 has a varied configuration such that a second extension portion thereof is shorter than that of FIG. 13A.

The structure of the second flow channel unit 200-8 will be described in more detail with reference to FIG. 14B.

Figure 14B:
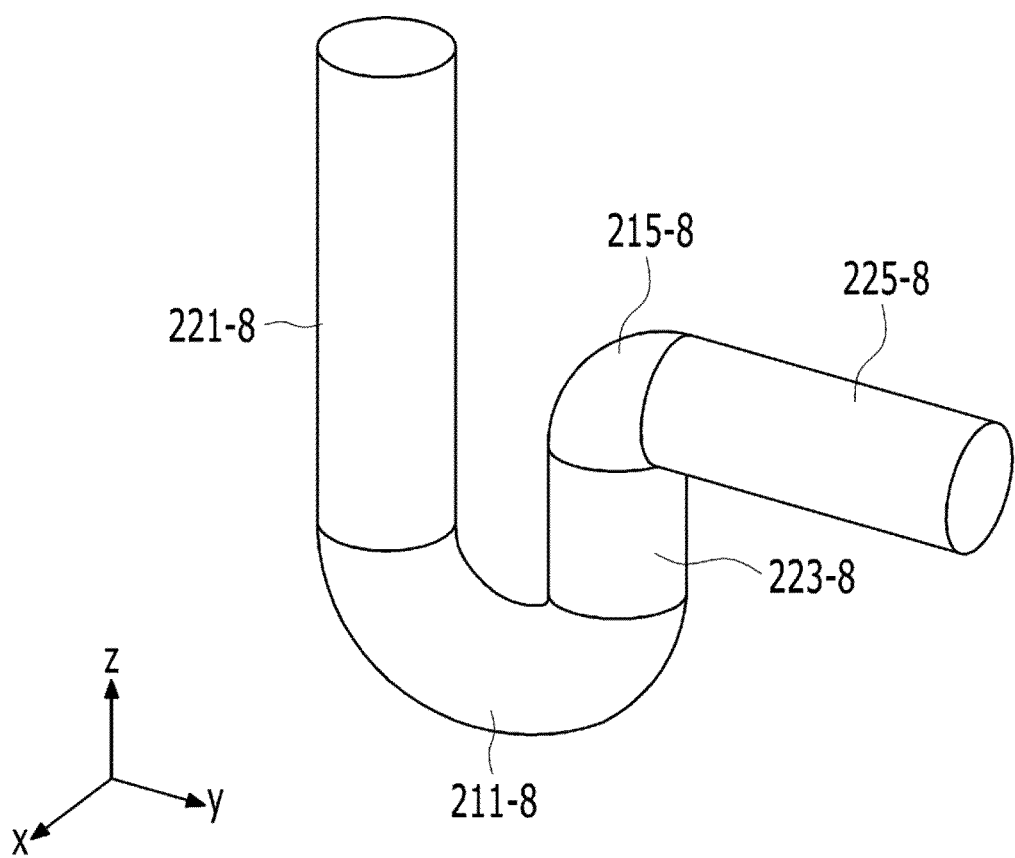
FIG. 14B illustrates the structure of the second flow channel unit shown in FIG. 14A.

FIG. 14B illustrates the structure of the second flow channel unit shown in FIG. 14A.

Referring to FIG. 14B, the second flow channel unit 200-8 includes a first extension portion 221-8, a first curved portion 211-8, a second extension portion 223-8, a second curved portion 213-8, and a third extension portion 225-8, which are sequentially disposed in this order, and are connected to one another.

In more detail, the first curved portion 211-8 may change a flow direction of air from a −Z-axis direction to a Z-axis direction in accordance with advance thereof in a Y-axis direction, and the second curved portion 213-8 may change a flow direction of air from the Z-axis direction to the Y-axis direction in accordance with advance thereof in the Y-axis direction.

Accordingly, it can be seen that the second flow channel unit 200-8 shown in FIG. 14A consequently changes the flow direction of air a total of two times.

Figure 14C:
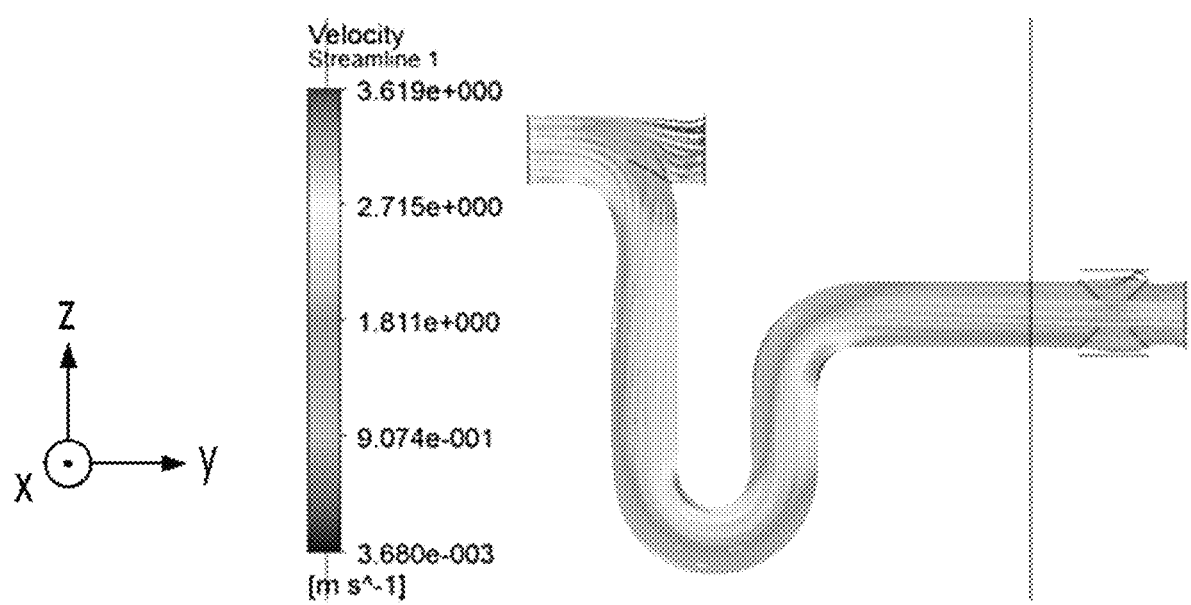
FIG. 14C illustrates results of a flow velocity simulation in the flow channel structure shown in FIG. 14A.

FIG. 14C illustrates results of a flow velocity simulation in the flow channel structure shown in FIG. 14A.

Referring to FIG. 14C, the flow velocity variation of a sensing unit according to flow velocity variation of external air in the flow channel structure illustrated in FIG. 14A was 7%.

Results obtained after comparing simulation results of the four different flow channel structures described above with reference to FIGS. 11A to 14C are as follows.

First, referring to comparison between FIGS. 13A and 13B, external flow velocity variation dumping performance is degraded when it is impossible to secure sufficient lengths of the extension portions before and after the curved portion (that is, the second extension portion 223-8 in the case of FIG. 14A being shorter than that of the case (223-7) of FIG. 13A), even though degrees of air flow direction change are similar. Results similar to the above-described results are exhibited even when air flow direction change degree is increased, as in the case of FIG. 12A.

Next, cases in which a second flow channel unit is disposed along two planes will be described with reference to FIGS. 15A to 18B. Here, disposition of the second flow channel unit along two planes may mean that the second flow channel unit is disposed along two different planes intersecting each other.

In this case, each of the two different planes intersecting each other has two axes (that is, a horizontal axis and a vertical axis). When a line of intersection formed in accordance with meeting of the two planes is assumed to be one axis of each of the two planes, it may be considered that the two planes share one axis.

For example, two intersecting planes may be considered to correspond to two adjacent faces of an optional hexahedron. In this case, an edge of the hexahedron where the two faces meet each other may be considered to be an axis shared by the two faces. In other words, it may be understood that each second flow channel unit to be described with reference to FIGS. 15A to 18B is disposed along two adjacent faces of a hexahedron.

In addition, when the vertical axis of a first one of the two planes is disposed in parallel to an optical axis, the horizontal axis of the first plane intersects the vertical axis and the optical axis. Furthermore, the horizontal axis of a second one of the two planes is parallel to the horizontal axis of the first plane, and the vertical axis of the second plane intersects the horizontal axis of the second plane.

Meanwhile, in association with relation of the two planes with the housing 170, the first plane having the axis parallel to the optical axis may correspond to one side surface of the housing (that is, when at least a portion of the flow channel unit disposed along the first plane contacts one side surface of the housing) or may be parallel to one side surface of the housing, and the second plane may be parallel to a top surface of the housing or a bottom surface of the housing when the housing has a hexahedral shape.

Figure 15A:
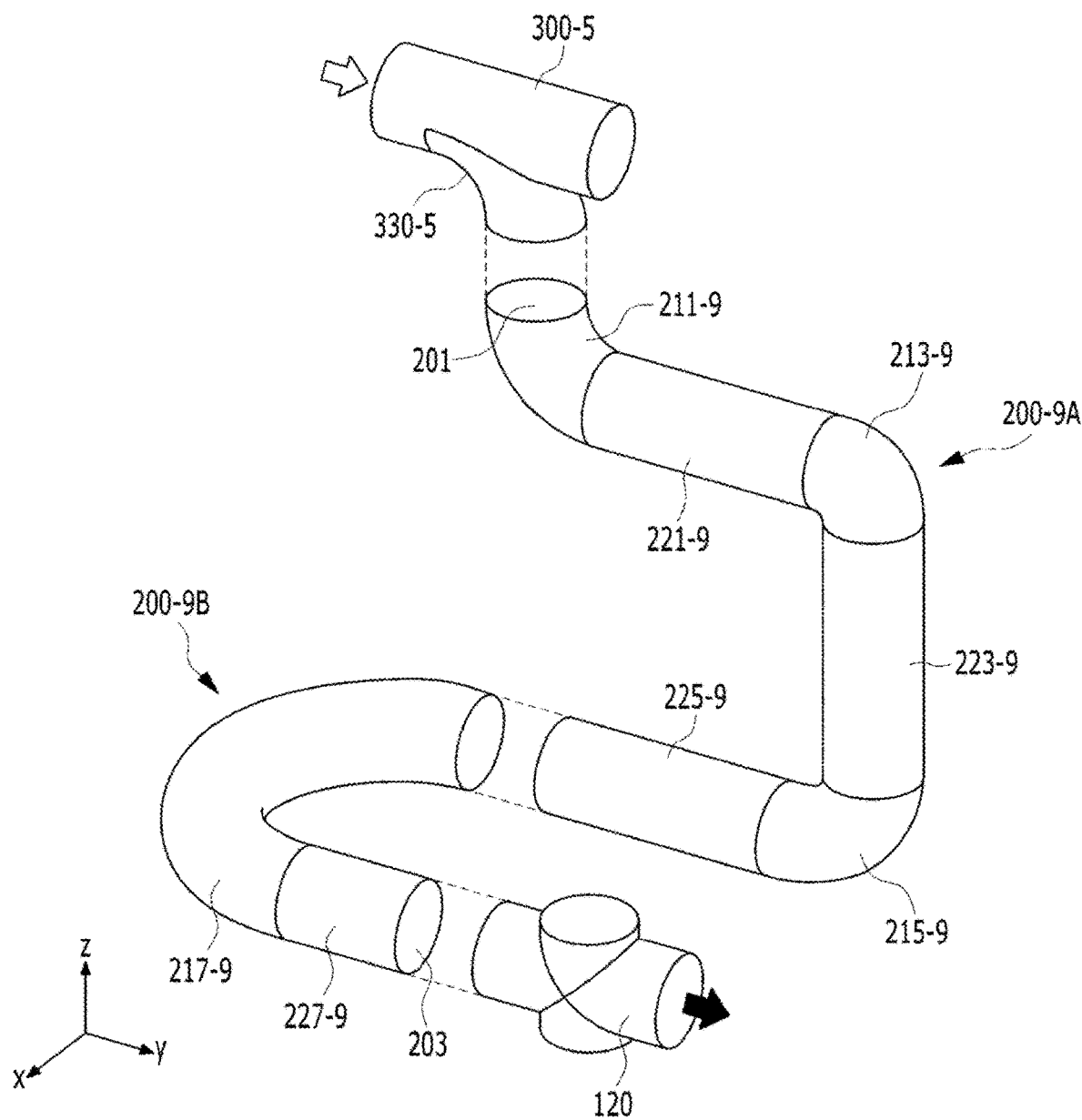
FIG. 15A illustrates an example of a flow channel structure including a second flow channel unit disposed along two planes intersecting each other in accordance with an embodiment of the present disclosure.

FIG. 15A illustrates an example of a flow channel structure including a second flow channel unit disposed along two planes intersecting each other in accordance with an embodiment of the present disclosure.

Referring to FIG. 15A, a fourth flow channel unit 300-5 is identical to the fourth flow channel unit 300-5, and a second flow channel unit 200-9 includes a first flow channel segment 200-9A disposed along a first plane, and a second flow channel segment 200-9B disposed along a second plane.

In FIG. 15A, the first plane corresponds to a Y-Z plane, and the second plane corresponds to an X-Y plane. Accordingly, it is considered that the first and second planes share a Y-axis.

The first flow channel segment 200-9A of the second flow channel unit 200-9 includes a first curved portion 211-9, a first extension portion 221-9, a second curved portion 213-9, a second extension portion 223-9, a third curved portion 215-9, and a third extension portion 225-9, which are sequentially disposed in this order, and are connected to one another.

In this case, the first curved portion 211-9 has an inlet 201 connected to a second external air outlet 330-5 of the fourth flow channel unit 300-5. The fourth extension portion 227-9 has an outlet 203 connected to the first flow channel unit 120.

Meanwhile, the first curved portion 211-9 changes a flow direction of air from −Z-axis direction to a Y-axis direction. The second curved portion 213-9 changes a flow direction of air from the Y-axis direction to the −Z-axis direction. In addition, the third curved portion 215-9 changes a flow direction of air from the −Z-axis direction to a −Y-axis direction. The fourth curved portion 217-9 changes a flow direction of air from the −Y-axis direction to the Y-axis direction in accordance with advance thereof in an X-axis direction.

Figure 15B:
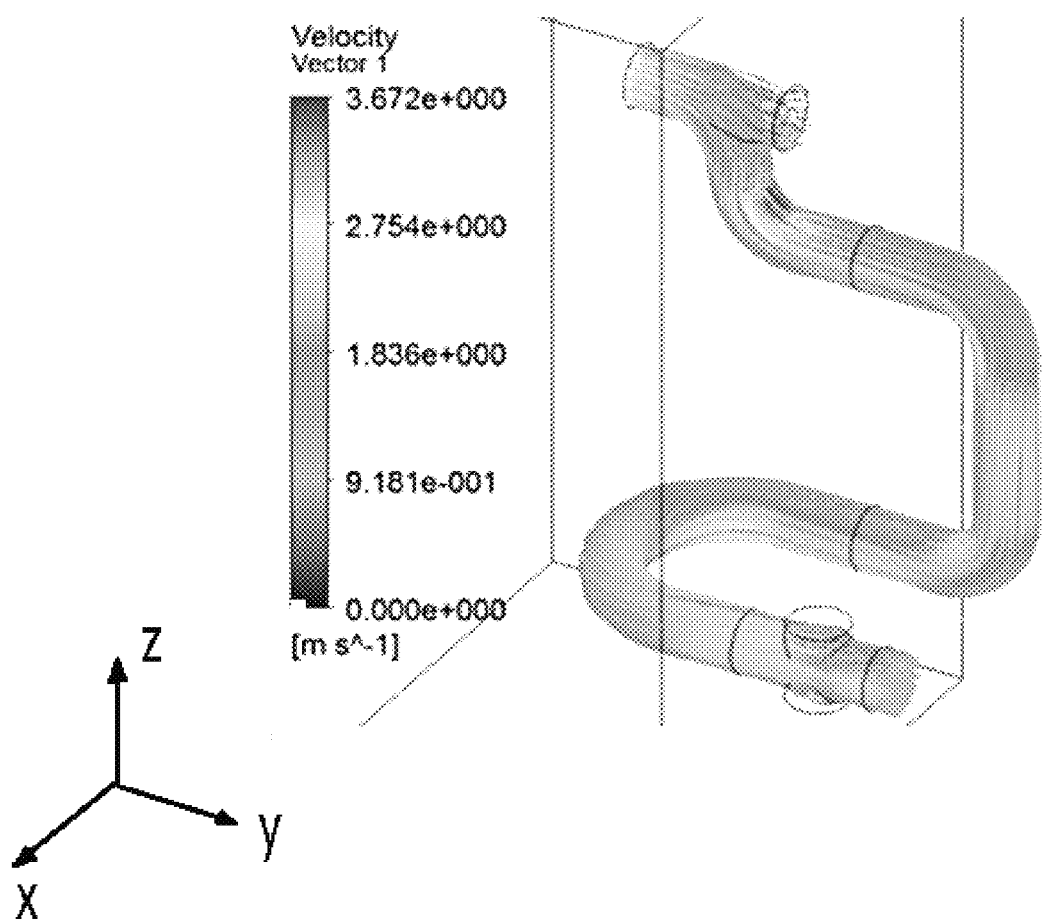
FIG. 15B illustrates results of a flow velocity simulation in the flow channel structure shown in FIG. 15A.

FIG. 15B illustrates results of a flow velocity simulation in the flow channel structure shown in FIG. 15A.

Referring to FIG. 15B, the flow velocity variation of a sensing unit according to flow velocity variation of external air in the flow channel structure illustrated in FIG. 15A was 1.6%.

FIG. 16A illustrates another example of the flow channel structure including the second flow channel unit disposed along two planes intersecting each other in accordance with the embodiment of the present disclosure.

Referring to FIG. 16A, a second flow channel unit 200-10 differs from the second flow channel unit 200-9 shown in FIG. 15A, in terms of the configuration of a first flow channel segment 200-10A. In detail, the first flow channel segment 200-10A of the second flow channel unit 200-10 includes a first curved portion 211-10 and a second curved portion 213-10 which are sequentially disposed in this order, and are connected to each other.

Figure 16B:
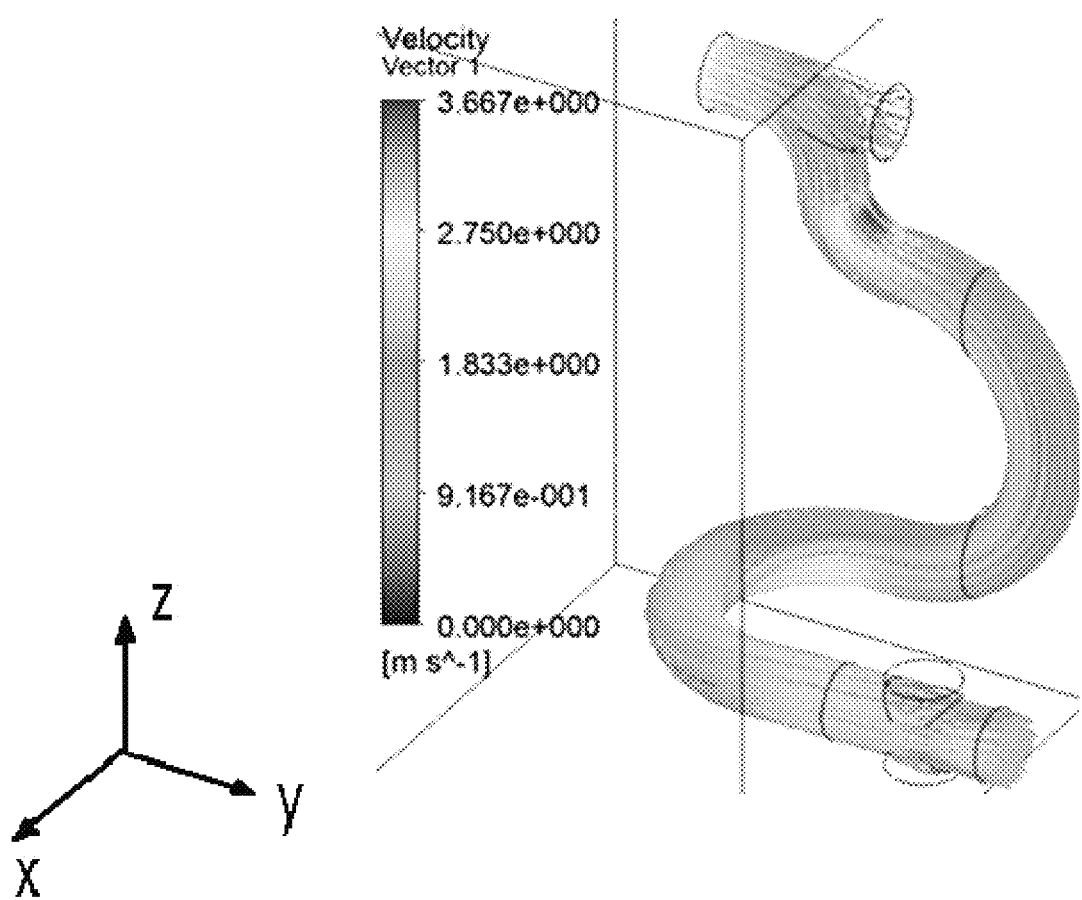
FIG. 16B illustrates results of a flow velocity simulation in the flow channel structure shown in FIG. 16A.

Each of the second curved portion 213-10 and a curved portion of a second flow channel segment 200-10B has a half-ring tube shape. The first curved portion 211-10 provides a path for changing a flow direction of air from a Y-axis direction to a −Y-axis direction in accordance with advance thereof in a −Z-axis direction. The curved portion of the second flow channel segment 200-10B provides a path for changing a flow direction of air from a −Y-axis direction to the Y-axis direction in accordance with advance thereof in an X-axis direction. FIG. 16B illustrates results of a flow velocity simulation in the flow channel structure shown in FIG. 16A.

Referring to FIG. 16B, the flow velocity variation of a sensing unit according to flow velocity variation of external air in the flow channel structure illustrated in FIG. 16A was 0.5%.

Figure 17A:
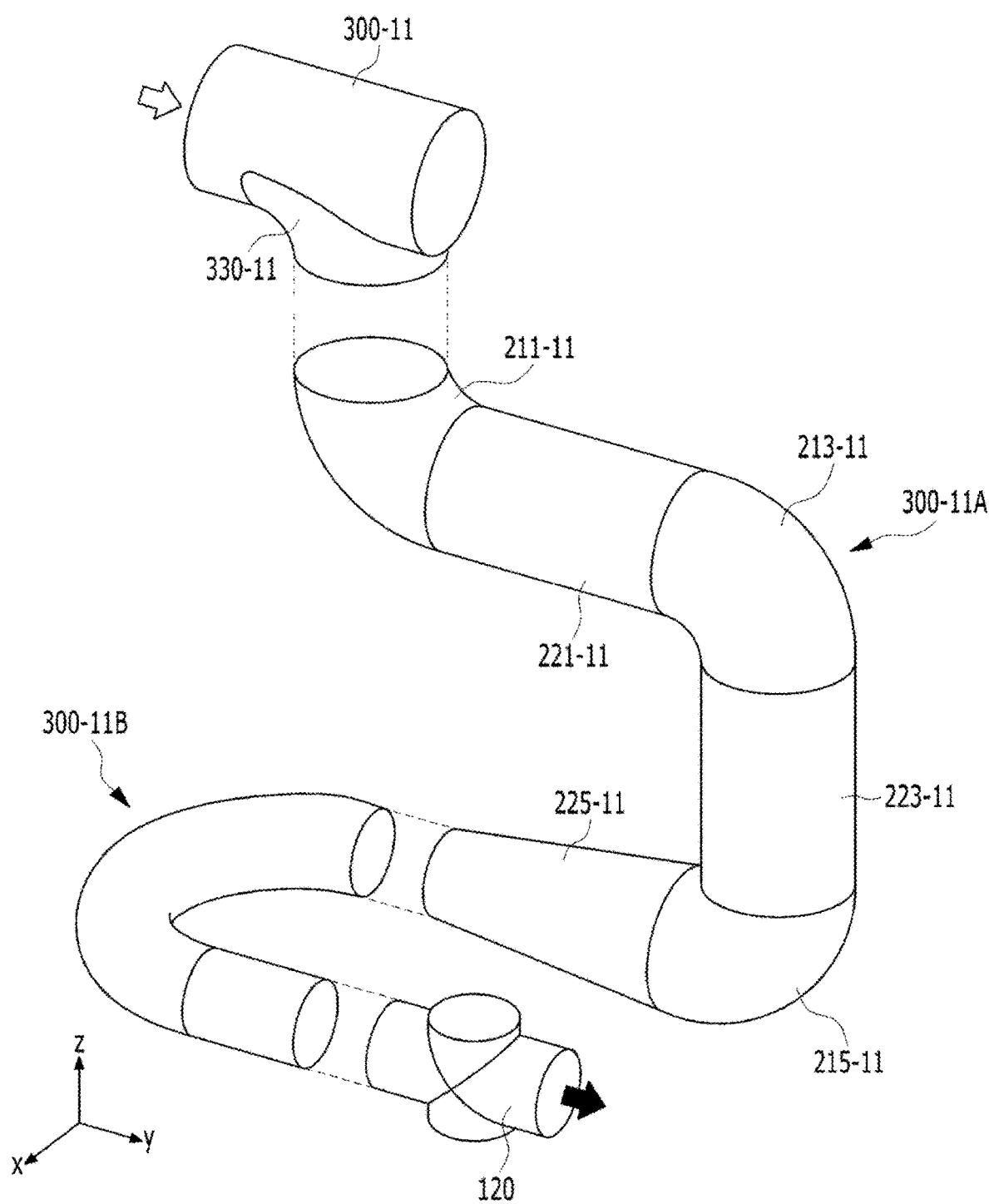
FIG. 17A illustrates another example of the flow channel structure including the second flow channel unit disposed along two planes intersecting each other in accordance with the embodiment of the present disclosure.

FIG. 17A illustrates another example of the flow channel structure including the second flow channel unit disposed along two planes intersecting each other in accordance with the embodiment of the present disclosure.

Referring to FIG. 17A, the entirety of the flow channel structure is similar to that of the flow channel structure shown in FIG. 15A. However, the diameter of a fourth flow channel unit 300-11 in a flow channel cross-sectional direction and the diameter of a portion of a second flow channel unit 200-11 in a flow channel cross-sectional direction are enlarged to about twice the remaining portion of the second flow channel unit 200-11. That is, configurations of a second flow channel segment 200-11B of the second flow channel unit 200-11 and the first flow channel 120 are identical to those of FIG. 15A.

Of course, the configuration of a first flow channel segment 200-11A of the second flow channel unit 200-11 is also identical to that of the above-described case, in terms of the connection order of constituent elements and air flow direction change in each curved portion, except for a diameter. However, the diameter of a third extension portion 225-11 is gradually reduced and, as such, an increase in flow velocity is exhibited in a portion after the third extension portion 225-11. In this regard, it may be considered that the third extension portion 225-11 substantially performs the function of a nozzle. Accordingly, the third extension portion 225-11 may be referred to as a "nozzle portion".

Figure 17B:
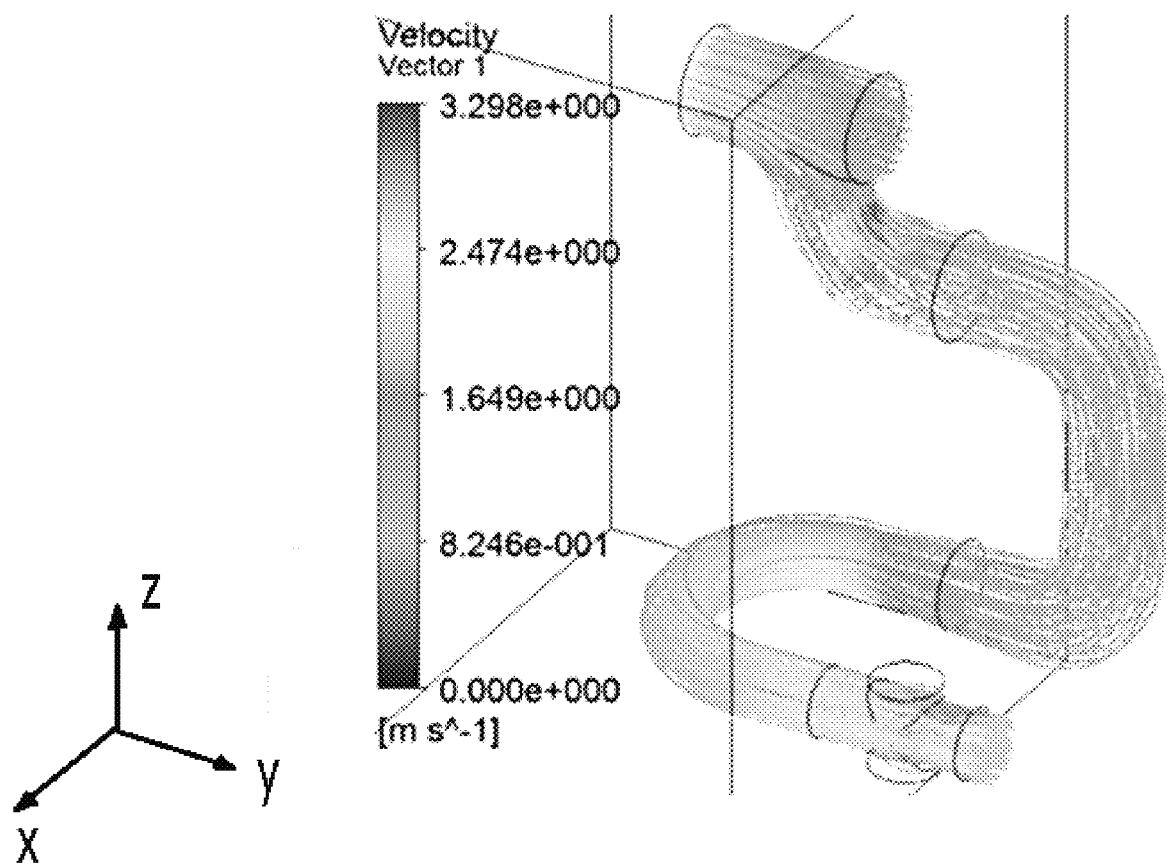
FIG. 17B illustrates results of a flow velocity simulation in the flow channel structure shown in FIG. 17A.

FIG. 17B illustrates results of a flow velocity simulation in the flow channel structure shown in FIG. 17A.

Referring to FIG. 17B, the flow velocity variation of a sensing unit according to flow velocity variation of external air in the flow channel structure illustrated in FIG. 17A was 2.6%.

Figure 18A:
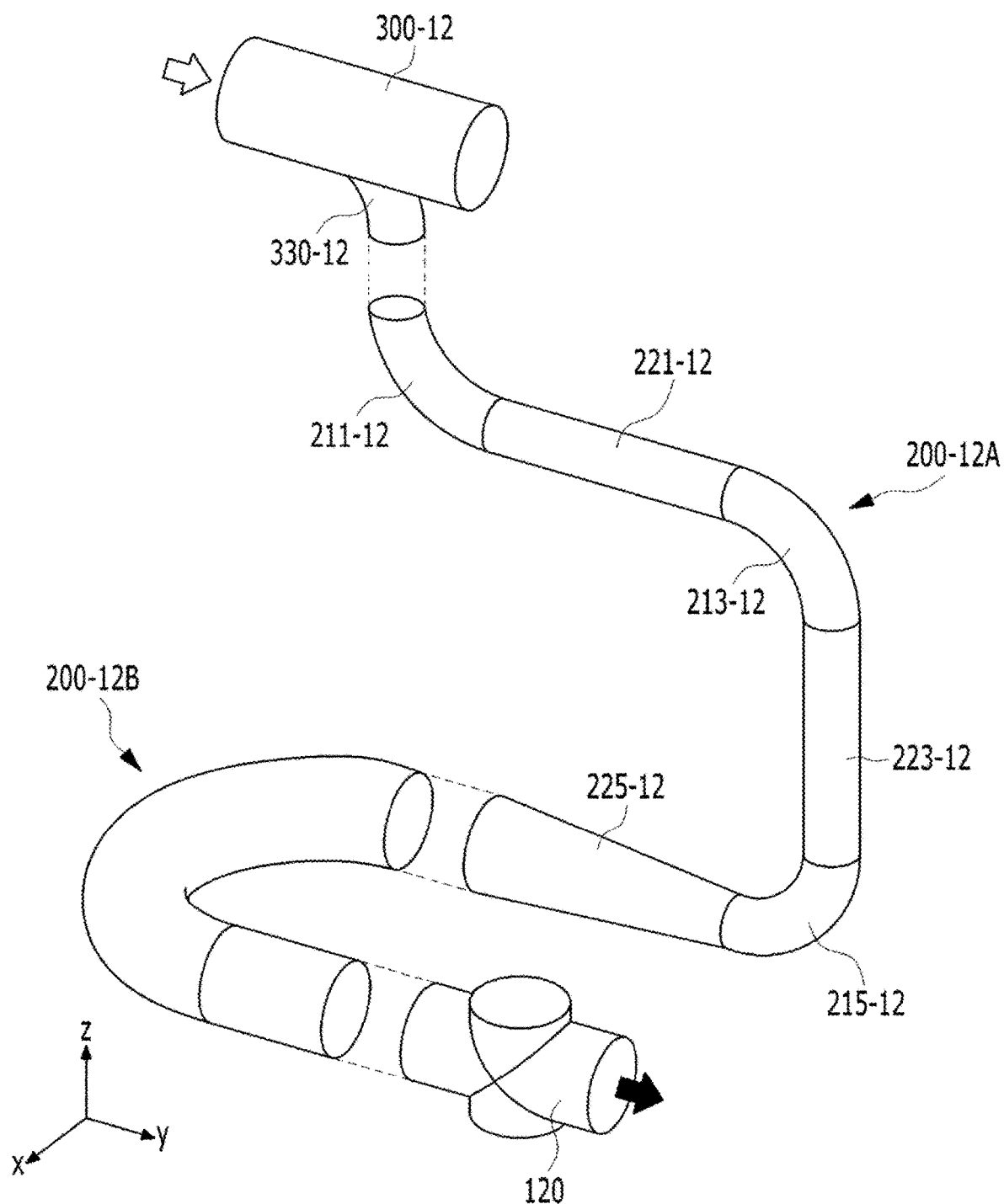
FIG. 18A illustrates another example of the flow channel structure including the second flow channel unit disposed along two planes intersecting each other in accordance with the embodiment of the present disclosure.

FIG. 18A illustrates another example of the flow channel structure including the second flow channel unit disposed along two planes intersecting each other in accordance with the embodiment of the present disclosure.

Referring to FIG. 18A, the entirety of the flow channel structure is similar to that of the flow channel structure shown in FIG. 15A. However, the diameter of a second external air outlet 330-12 of a fourth flow channel unit 300-12 in a flow channel cross-sectional direction and the diameter of a portion of a second flow channel unit 200-12 in a flow channel cross-sectional direction are reduced to about ½ times the remaining portion of the second flow channel unit 200-12. That is, configurations of a second flow channel segment 200-12B of the second flow channel unit 200-11 and the first flow channel 120 are identical to those of FIG. 15A.

Of course, the configuration of a first flow channel segment 200-12A of the second flow channel unit 200-12 is also identical to that of the above-described case, in terms of the connection order of constituent elements and air flow direction change in each curved portion, except for a diameter. However, the diameter of a third extension portion 225-12 is gradually increased and, as such, a reduction in flow velocity is exhibited in a portion after the third extension portion 225-12.

Figure 18B:
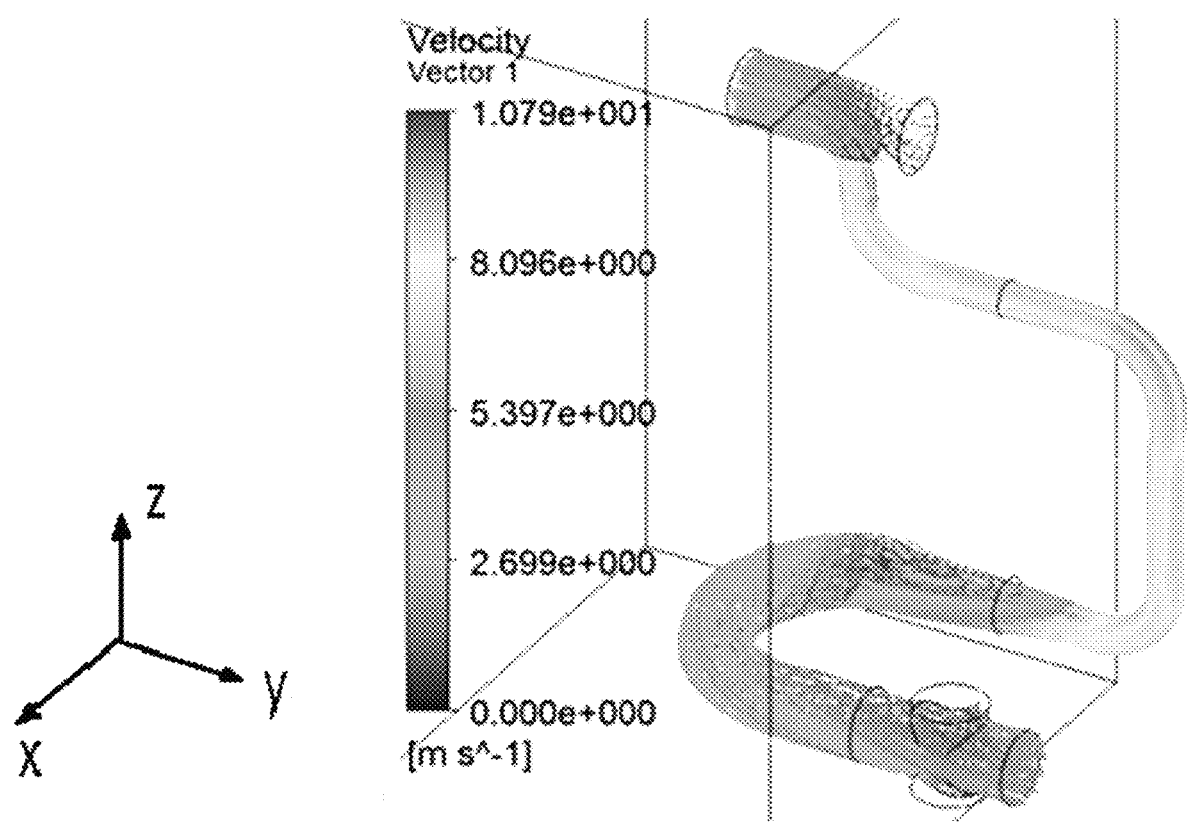
FIG. 18B illustrates results of a flow velocity simulation in the flow channel structure shown in FIG. 18A.

FIG. 18B illustrates results of a flow velocity simulation in the flow channel structure shown in FIG. 18A.

Referring to FIG. 18B, the flow velocity variation of a sensing unit according to flow velocity variation of external air in the flow channel structure illustrated in FIG. 18A was 12.2%.

In the cases of FIGS. 15A to 18 as described above, it may be considered that the fourth flow channel unit 300 constitutes a portion of the second flow channel unit 200. For example, the external air inlet 310 and the first external air outlet 320 of the fourth flow channel unit 300 may be considered as the inlet and outlet of the second flow channel unit 200, respectively, and the branch portion 350 of the second external air outlet 330 may be considered as a portion of the first curved portion 211.

Results obtained after comparing simulation results of the four different flow channel structures described above with reference to FIGS. 15A to 18B are as follows.

First, it can be seen that, when it is possible to secure a sufficient overall flow channel length and a sufficient radius of curvature of each curved portion, as in the flow channel structures shown in FIGS. 15A and 16A, external flow velocity variation dumping performance is greatly enhanced. However, when a channel diameter is reduced at an intermediate flow channel portion, that is, the intermediate flow channel portion includes a nozzle structure, as in the flow channel structure shown in FIG. 17A, air tends to flow non-uniformly at a central part of the scattering portion even though the external flow velocity variation dumping performance is excellent. This may be considered as a drawback in the current flow channel structure, but may provide an effect of concentrating a flow of air at a specific point within the scattering portion. This will be described in more detail with reference to FIGS. 34A to 34D.

In addition, when the channel diameter is reduced at the intermediate flow channel portion, as in the flow channel structure shown in FIG. 18A, on the contrary to the case of FIG. 17A, a vortex flow is severely generated due to pressure variation occurring in the third extension portion 225-12 increasing in diameter, and flow velocity variation in the scattering portion is also great.

When the above-described flow channel structures shown in FIGS. 7A to 18B are collectively discussed, the flow channel shape, the flow channel length, the number of curved portions, the curvature (radius of curvature) of each curved portion, and the flow channel diameter variation are factors having influence on the flow variation in the scattering portion caused by external flow velocity variation. Hereinafter, an optimal range of each factor based on results of discussion as to each structure as described above will be described.

First, in association with flow channel shape, the structure, in which a flow channel is disposed along two planes interesting each other, exhibits excellent performance, as compared to the structure in which a flow channel is disposed along a single plane. Of course, it may be considered that this is not an effect obtained only by a flow channel shape, but is obtained in accordance with security of a sufficient flow channel length and a sufficient radius of curvature according to flow channel disposition along two planes.

Next, in association with a flow channel length, external flow velocity variation is insufficiently dumped when a minimum flow channel length cannot be secured. On the contrary, when the flow channel length is excessively great, there may be a drawback. For example, when the flow channel length is excessively great, there may be problems in that the overall size of the particle sensing device becomes great, and particles are accumulated within the flow channel. In particular, in association with size, even when the first flow channel segment 200-9A, 200-10A, 200-11A, or 200-12A is disposed to closely contact one side surface of the housing 170 in order to minimize the overall volume when the second flow channel unit 200 is disposed along two planes, the overall size of the particle sensing device may also be increased when the overall length of the second flow channel unit is excessively great.

Therefore, the ratio of the flow channel length to the flow channel diameter (that is, flow channel length/flow channel diameter) exhibiting a variation of 10% or less may be 5 to 22. For example, when the flow channel diameter is assumed to be 8 mm, a minimally securable flow channel length is 40 mm, and a maximally securable flow channel length is 170 mm. That is, when a flow channel length of 40 mm or more is secured under the condition that the flow channel diameter is 8 mm, the internal flow velocity variation satisfies a target value of 10% or less, and a flow of air in the scattering portion becomes uniform. In addition, when a maximum flow channel length is 170 mm or less, excellent flow velocity variation is exhibited, and particle accumulation in the flow channel may be minimized. For example, in the case of FIG. 15A, the diameter of the second flow channel unit 200-9 may be 8 mm, the Y-axis linear lengths of the first extension portion 221-9 and the third extension portion 225-9 may be 20 mm, the Z-axis linear length of the second extension portion may be 22 mm, and the Y-axis length of the fourth extension portion 227-9 may be 10 mm. In addition, the radii of curvature of the first curved portion 211-9, the second curved portion 213-9 and the third curved portion 215-9 may be R8, and the radius of central curvature of the fourth curved portion 217-9 may be R14. In this case, the overall length of the second flow channel unit 200-9 may be about 166 mm.

Here, the above-described ratio of flow channel diameter to flow channel length takes into consideration only the length of the second flow channel unit 200, except for the lengths of the fourth flow channel unit 300 and the first flow channel unit 120.

Meanwhile, although a flow of air before the scattering portion is important, discharge of air emerging from the scattering portion is also important, similarly to the above-described air flow. This will be described in more detail with reference to FIGS. 36 to 38B.

Next, relation between the number of curved portions, that is, the number of times of air flow direction change, and flow velocity variation will be described.

As described above, for an enhancement in particle sensing accuracy in the scattering portion SS disposed between the lens unit 114 and the light receiving unit 130, it is preferred that a flow of air passing through the scattering portion SS be uniform in terms of velocity and direction. In connection with this, the number of times of air flow direction change in the second flow channel unit 200 has influence on the air flow uniformity.

That is, when there is no curved portion in a flow channel, it is difficult to expect dumping of external flow velocity variation. Furthermore, a probability that external light is incident upon the scattering space is increased. In detail, when air is changed in direction twice while passing through the second flow channel unit 200, sufficient dumping of external flow velocity variation (for example, variation of 10% or less) may be expected, and a flow of air in the scattering portion SS also tends to be uniform. However, when the number of times of air flow direction change exceeds 4, there is a possibility of particles accumulating within the flow channel, and there is a problem in that the overall size of the particle sensing device is increased. Therefore, it is preferred that the number of curved portions be 2 to 4.

This can be seen from flow velocity variation exhibited to be superior in the order of the case of FIG. 10A in which there is no curved portion in the second flow channel unit, the case of FIG. 9A in which there is one curved portion in the second flow channel unit, the case of FIG. 14A in which there are two curved portions in the second flow channel unit, and the case of FIG. 16A in which there are three curved portions in the second flow channel unit.

Of course, this is an illustration according to the above-described simulation results and, as such, the number of curved portions according to embodiments is not limited thereto.

Meanwhile, the curved portions of the flow channel are important in terms of not only the number thereof, but also, the radius of curvature thereof. This will be described with reference to FIGS. 19 and 20.

Figure 19:
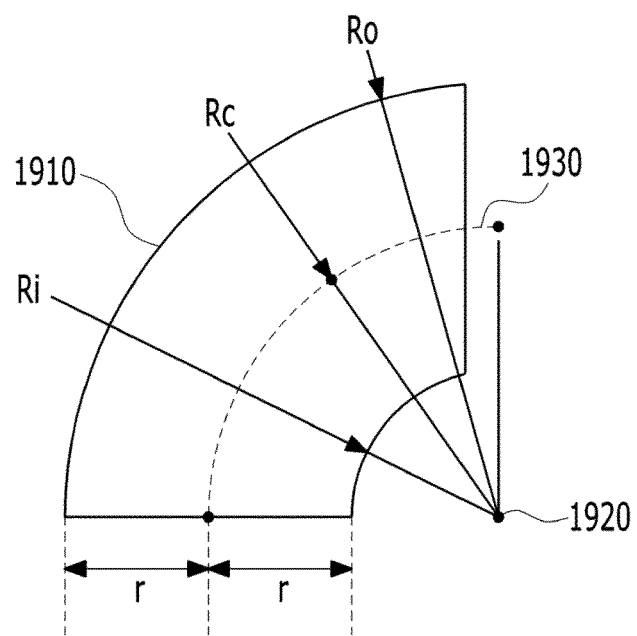
FIG. 19 is a view for explaining a radius of curvature of a curved portion according to an embodiment.
Figure 20:
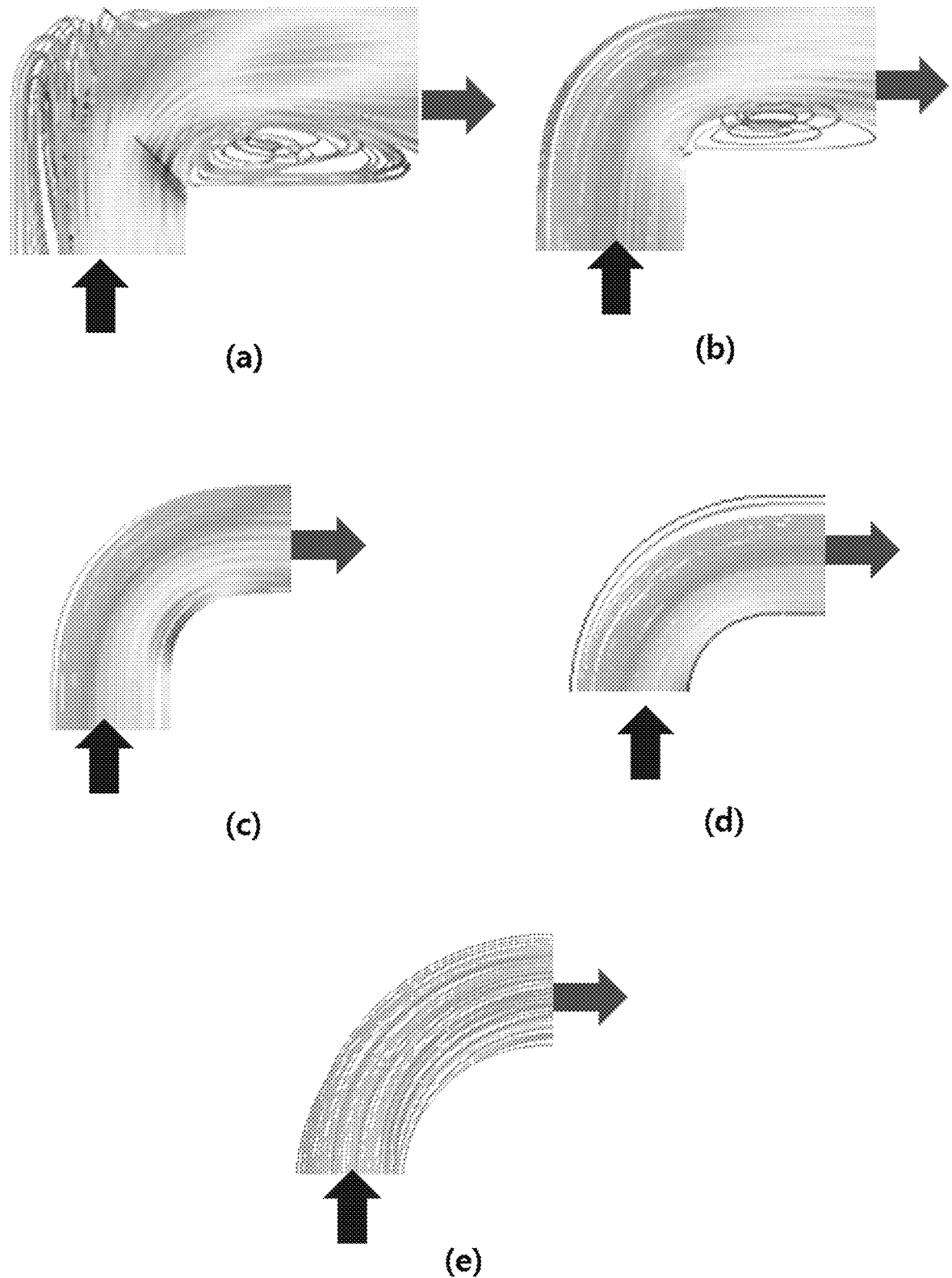
FIG. 20 illustrates results of a simulation representing air flow variation according to different radii of curvature.

FIG. 19 is a view for explaining a radius of curvature of a curved portion according to an embodiment. FIG. 20 illustrates results of a simulation representing air flow variation according to different radii of curvature.

First, referring to FIG. 19, a side view of a curved portion 1910 having bending of 90°. Here, the curved portion 1910 is assumed to have a circular cross-section having a diameter uniform in a flow channel cross-sectional direction. Assuming that the radius of the curved portion 1910 is "r", the diameter of the curved portion 1910 is "2r". In addition, assuming that the curved portion 1910 forms a ring-shaped tube having an annular planar shape when the curved portion 1910 extends continuously while having a constant radius of curvature because the curved portion 1910 has a uniform radius of curvature throughout the entirety thereof, the ring has a single apex 1920.

The radius of curvature of the curved portion may be mainly classified into three radii of curvature, that is, a central curvature (or a radius of central curvature), a radius of outside curvature (or a radius of outer curvature), and a radius of inside curvature (or a radius of inner curvature). The radius of central curvature may be expressed by a distance Rc from the apex 1920 to a line 1930 connecting diameter centers of the curved portion.

With reference to the radius of central curvature, the radius of outside curvature, Ro, corresponds to a value obtained by adding "r" to the radius of central curvature, and the radius of inside curvature, Ri, corresponds to a value obtained by deducting "r" from the radius of central curvature. With reference to the above description of radii of curvature, influence of a radius of curvature will be described through the ratio of the radius of curvature to the flow channel diameter (that is, the radius of curvature/the flow channel diameter, and referred to as a "curvature ratio", for convenience of description), in conjunction with FIG. 20.

Referring to FIG. 20, results of an air flow simulation in cases of FIGS. 20(a) to 20(e) respectively having central curvature ratios of 0, ¼, ½, ¾, and 1 in this order. For example, when the flow channel diameter of the curved portion in the flow channel cross-sectional direction is 8 mm, the radius of central curvature corresponds to 4 mm (that is, R4) in the case of FIG. 20(c).

First, when bending of the curved portion is rectangular (the radius of central curvature being 0), or cannot secure a sufficient radius of curvature, there is a problem in that a vortex flow is generated at a lower portion of the flow channel immediately after change of an air flow direction.

In addition, in the case of FIG. 20(c), an air flow at the inside of the curved portion is more or less rapid, as compared to other sides of the curved portion.

However, the air flow becomes uniform after air flow direction change.

In the cases of FIGS. 20(d) and 20(e), velocity increase of the air flow at the inside of the curved portion is slight and, as such, the entire air flow is uniform.

Accordingly, assuming that the number of times of air flow direction change as described above satisfies an optimal range, an air flow becomes non-uniform when the curvature ratio of the curved portion is less than ⅜, and the overall size of the particle sensing device is increased when the curvature ratio of the curved portion exceeds 1. Accordingly, the curvature ratio of the curved portion is preferably ranged from ⅜ to 1. More preferably, the curvature ratio of the curved portion is ⅝ to ¾, taking into consideration the overall size of the particle sensing device.

Figure 21:
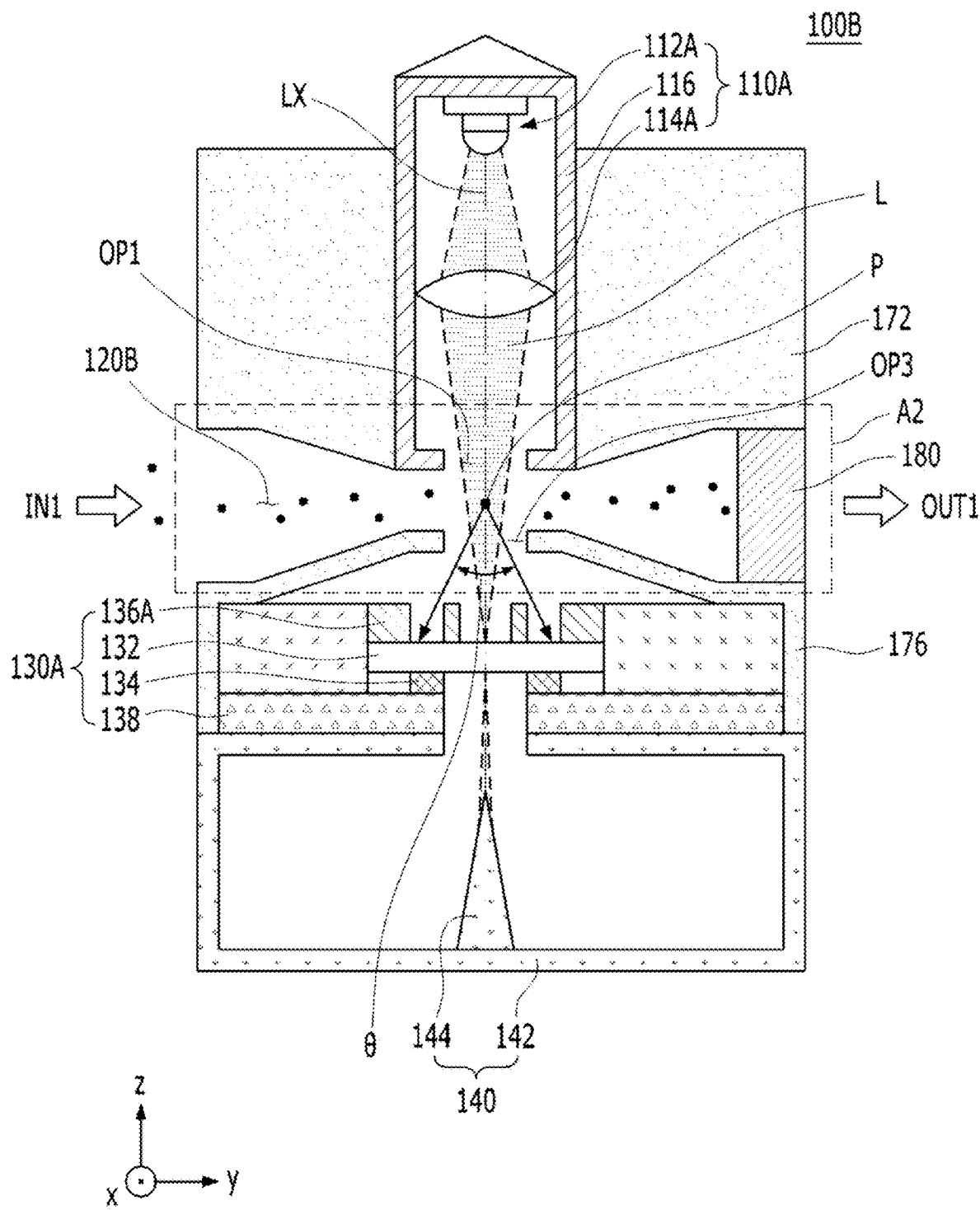
FIG. 21 illustrates a sectional view of another embodiment of the particle sensing device shown in FIG. 1.
Figure 22:
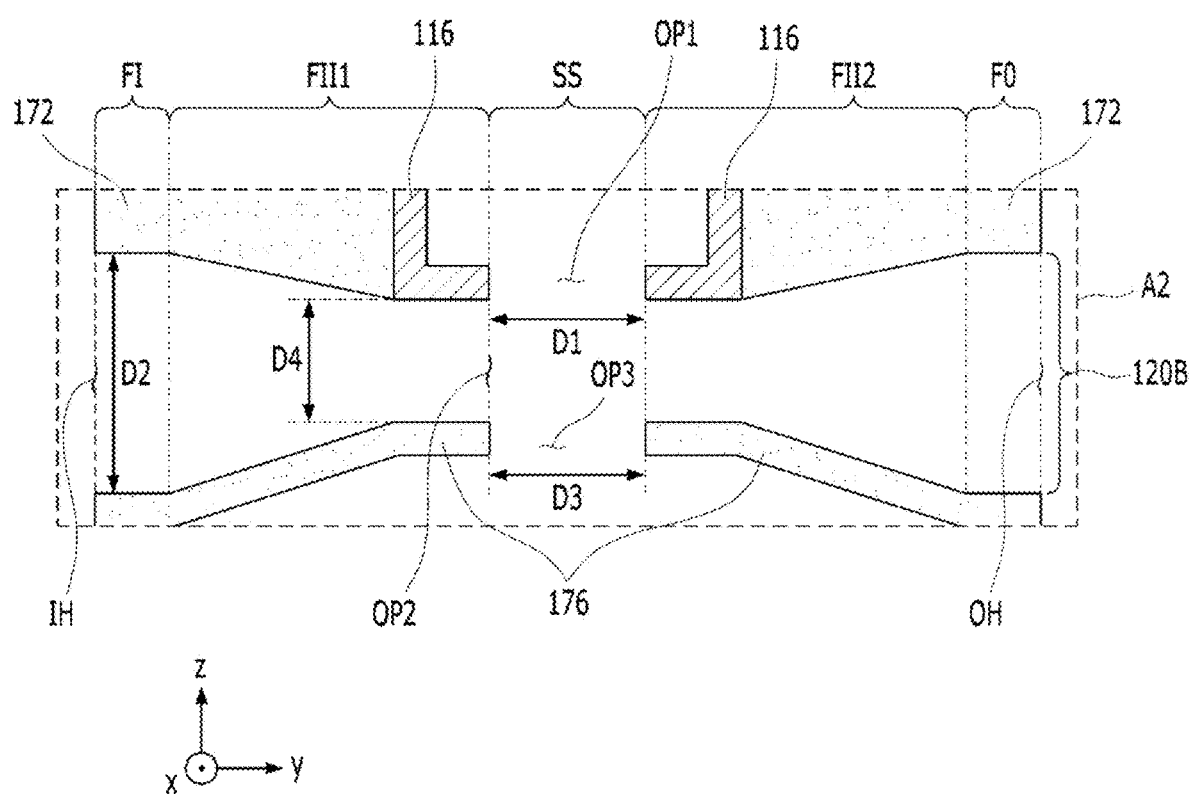
FIG. 22 is an enlarged sectional view corresponding to a portion A2 of FIG. 21, for explanation of a first flow channel unit shown in FIG. 21.

FIG. 21 illustrates a sectional view of another embodiment (100B) of the particle sensing device 100 shown in FIG. 1. FIG. 22 is an enlarged sectional view corresponding to a portion A2 of FIG. 21, for explanation of a first flow channel unit 120B shown in FIG. 21. For convenience of description, illustration of the fan 180 shown in FIG. 21 is omitted from FIG. 22.

The cross-sectional shape of the first flow channel unit 120B shown in FIG. 21 differs from that of the first flow channel unit 120A shown in FIG. 3. Except for this configuration, the particle sensing device 100B shown in FIG. 21 is identical to the particle sensing device 100A shown in FIG. 3 and, as such, overlapping description will be omitted. For example, definition of the scattering portion SS described above with reference to FIG. 4 may be applied to the first flow channel unit 120B shown in FIG. 22.

In the case of FIGS. 3 and 4, cross-sectional areas of the inlet channel portion FI, the first intermediate channel portion FII1, the scattering portion SS, the second intermediate channel portion FII2, and an outlet channel portion FO are constant in directions (for example, x and z-axis directions) perpendicular to a flow direction of air (for example, a y-axis direction).

On the other hand, in the directions (for example, the x and z-axis directions) perpendicular to the air flow direction (for example, the y-axis direction), the cross-sectional area of the first intermediate channel portion FIl1 may include a portion decreasing gradually toward the scattering portion SS, and the cross-sectional area of the second intermediate channel portion FII2 may include a portion increasing gradually away from the scattering portion SS.

For example, as illustrated in FIGS. 21 and 22, in the directions (for example, the x and z-axis directions) perpendicular to the air flow direction (for example, the y-axis direction), the cross-sectional area of the first intermediate channel portion FIl1 may decrease gradually and may then be constant as the first intermediate channel portion FIl1 extends toward the scattering portion SS, and the cross-sectional area of the second intermediate channel portion FII2 may be constant and may then increase gradually as the second intermediate channel portion FII2 extends away from the scattering portion SS. Alternatively, differently from the case of FIGS. 21 and 22, in the directions (for example, the x and z-axis directions) perpendicular to the air flow direction (for example, the y-axis direction), the cross-sectional area of the first intermediate channel portion FII1 may decrease continuously as the first intermediate channel portion FII1 extends toward the scattering portion SS, and the cross-sectional area of the second intermediate channel portion FII2 may increase continuously as the second intermediate channel portion FII2 extends away from the scattering portion SS.

In addition, differently from the case of FIGS. 3 and 4, in the directions (for example, the x and z-axis directions) perpendicular to the air flow direction (for example, the y-axis direction), the cross-sectional areas of the inlet channel portion FI and the outlet channel portion FO may be greater than that of the scattering portion SS.

Furthermore, when an opening area of the first flow channel unit 120A or 120B shown in each of FIGS. 4 and 22, through which the first intermediate channel portion FII1 (or the second intermediate channel portion FII2) communicates with the scattering portion SS, is defined as a second opening portion OP2, the area of the first opening portion OP1 (for example, an area in the x and y-axis directions) may be greater than the cross-sectional area of the second opening portion OP2 in the directions (for example, the x and z-axis directions) perpendicular to the air flow direction (for example, the y-axis direction).

For example, referring to FIGS. 4 and 6, assuming that the x-axis length of the first opening portion OP1 is equal to the x-axis length of the second opening portion OP2, a width D1 of the first opening portion OP1 may be greater than a height D4 of the second opening portion OP2. Alternatively, referring to FIGS. 4 and 6, when the first opening portion OP1 has a circular planar shape, and the second opening portion OP2 has a circular cross-sectional shape, a diameter D1 of the first opening portion OP1 may be greater than a diameter D2 of the second opening portion OP2.

When the first flow channel unit 120B has a cross-sectional shape as shown in FIGS. 21 and 22, an increased amount of particles P may pass through the first flow channel unit 120B in accordance with variation in the cross-sectional areas of the first and second intermediate channel portions FII1 and FII2. Accordingly, accuracy of sensing particles P may be enhanced.

Figure 23:
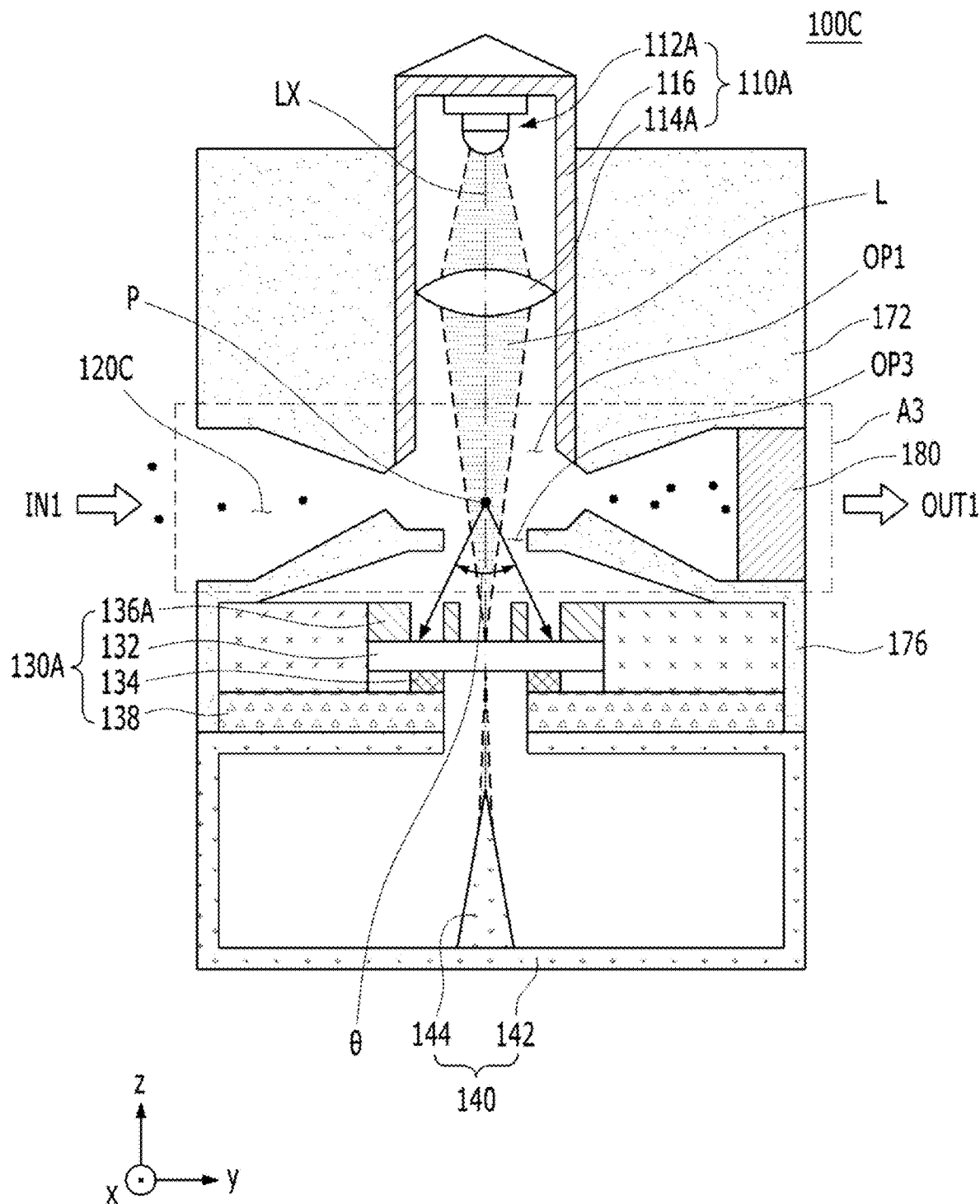
FIG. 23 illustrates a sectional view of another embodiment of the particle sensing device shown in FIG. 1.
Figure 24:
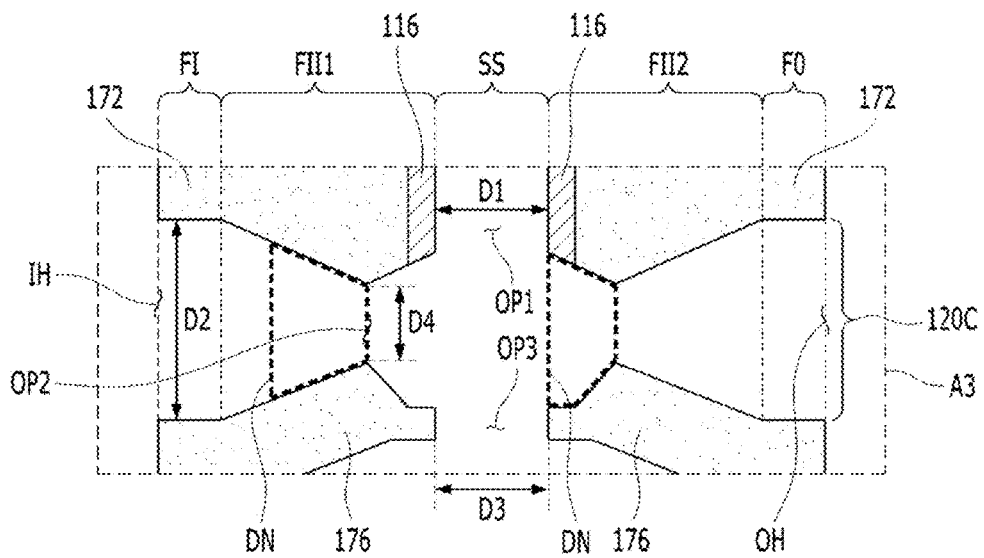
FIG. 24 is an enlarged sectional view corresponding to a portion A3 of FIG. 23, for explanation of a first flow channel unit shown in FIG. 23.

FIG. 23 illustrates a sectional view of another embodiment (100C) of the particle sensing device 100 shown in FIG. 1. FIG. 24 is an enlarged sectional view corresponding to a portion A3 of FIG. 23, for explanation of a first flow channel unit 120C shown in FIG. 23. For convenience of description, illustration of the fan 180 shown in FIG. 23 is omitted from FIG. 24.

The cross-sectional shape of the first flow channel unit 120C shown in FIG. 23 differs from that of the first flow channel unit 120A shown in FIG. 3. Except for this configuration, the particle sensing device 100C shown in FIG. 23 is identical to the particle sensing device 100A shown in FIG. 3 and, as such, overlapping description will be omitted.

In the case of FIGS. 3 and 4, cross-sectional areas of the inlet channel portion FI, the first intermediate channel portion FII1, the scattering portion SS, the second intermediate channel portion FII2, and an outlet channel portion FO are constant in directions (for example, x and z-axis directions) perpendicular to a flow direction of air (for example, a y-axis direction).

On the other hand, in the case of FIGS. 23 and 24, in the directions (for example, the x and z-axis directions) perpendicular to the air flow direction (for example, the y-axis direction), the cross-sectional area of the first intermediate channel portion FII1 may decrease gradually and may then increase gradually as the first intermediate channel portion FII1 extends toward the scattering portion SS. In addition, in the directions (for example, the x and z-axis directions) perpendicular to the air flow direction (for example, the y-axis direction), the cross-sectional area of the second intermediate channel portion FII2 may decrease gradually and may then increase gradually as the second intermediate channel portion FII2 extends away from the scattering portion SS.

In addition, when an opening area having a minimum cross-sectional area in directions perpendicular to an air flow direction in the first intermediate channel portion FII1 (or the second intermediate channel portion FII2) in the first flow channel unit 120C shown in FIG. 24 is defined as a second opening portion OP2, the area of the first opening portion OP1 (for example, an area in the x and y-axis directions) may be greater than the cross-sectional area of the second opening portion OP2 in the directions (for example, the x and z-axis directions) perpendicular to the air flow direction (for example, the y-axis direction).

For example, referring to FIG. 24, assuming that the x-axis length of the first opening portion OP1 is equal to the x-axis length of the second opening portion OP2, a width D1 of the first opening portion OP1 may be greater than a height D4 of the second opening portion OP2. Alternatively, referring to FIG. 24, when the first opening portion OP1 has a circular planar shape, and the second opening portion OP2 has a circular cross-sectional shape, a diameter D1 of the first opening portion OP1 may be greater than a diameter D2 of the second opening portion OP2.

For example, the height D4 of the second opening portion OP2 shown in FIGS. 22 and 24 may be 10.0 mm or less, 6.0 mm or less, 4.0 mm or less, or 2.0 mm or less, but embodiments are not limited thereto. Since the height D4 of the second opening portion OP2 is reduced in accordance with the embodiment, as described above, the overall size of each of the particle sensing devices 100A to 100C can be reduced.

In addition, in order to allow an increased amount of particles to pass through the first flow channel unit 120 (120A, 120B, or 120C), the flow rate of air passing through the first flow channel unit 120 should not be varied in volume. To this end, a double nozzle (DN) structure is formed by the second opening portion OP2, as illustrated in FIGS. 23 and 24. In this case, an air flow velocity may be adjusted such that easy measurement thereof can be achieved, even when the flow rate of air passing through the first flow channel unit 120C is varied in volume. Accordingly, accuracy of sensing particles P may be enhanced. For example, since a bottleneck phenomenon occurs in accordance with the double nozzle structure, an increased amount of particles P may pass through the first flow channel unit 120C and, as such, accuracy of sensing particles P may be enhanced.

The first flow channel units 120A, 120B, and 120C shown in FIG. 3, FIG. 4, and FIGS. 21 to 24 are merely illustrative. That is, embodiments are not limited to specific examples of the first flow channel unit 120, so long as an increased amount of air can be introduced through the first flow channel units 120A, 120B, and 120C.

Meanwhile, the light receiving unit 120 may have various structures in order to accurately sense light scattered from particles P. The light receiving units 130A respectively illustrated in FIGS. 3, 21, and 23 correspond to embodiments of the light receiving unit 130 shown in FIG. 1.

Figure 25:
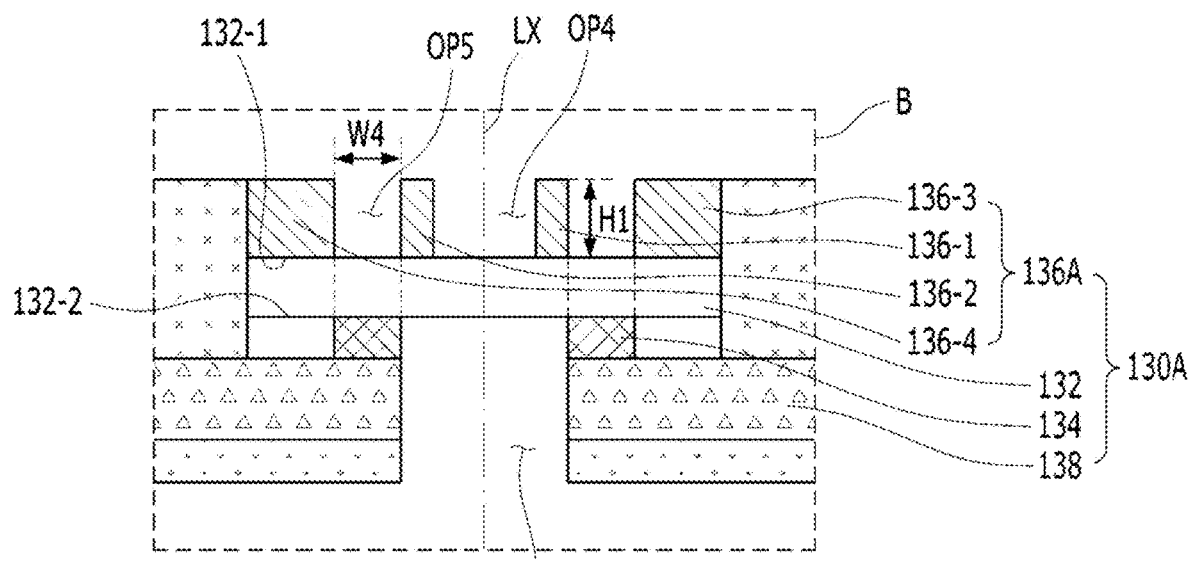
FIG. 25 is an enlarged sectional view corresponding to a portion B of FIG. 3.

FIG. 25 is an enlarged sectional view corresponding to a portion B of FIG. 3.

Referring to FIGS. 3 and 25, the light receiving unit 130A may include a light-transmissive member 132 and a light sensor 134. In addition, the light receiving unit 130A may further include a light guide 130A. If necessary, the light guide 130A may be omitted.

The light-transmissive member 132 may be made of a material capable of transmitting light, and, for example, may be made of glass. The light-transmissive member 132 may include a first surface 132-1 and a second surface 132-2. The first surface 132-1 corresponds to an upper surface (that is, a top surface) of the light-transmissive member 132 facing the scattering portion SS. The second surface 132-2 is a surface opposite to the first surface 132-1, and may correspond to a lower surface (that is, a bottom surface) of the light-transmissive member 132.

The light sensor 134 and the light guide 136A may be disposed around an optical axis of the light-transmissive member 132. The light sensor 134 and the light guide 136A may be disposed at opposite surfaces of the light-transmissive member 132, respectively. For example, as illustrated in FIG. 25, the light sensor 134 may be disposed at the second surface 132-2 of the light-transmissive member 132, and the light guide 136A may be disposed at the first surface 132-1 of the light-transmissive member 132. Alternatively, as illustrated in FIG. 25, the light sensor 134 may be disposed at the first surface 132-1 of the light-transmissive member 132, and the light guide 136A may be disposed at the second surface 132-2 of the light-transmissive member 132. The following description will be given in conjunction with the case in which the light sensor 134 may be disposed at the second surface 132-2 of the light-transmissive member 132, and the light guide 136A may be disposed at the first surface 132-1 of the light-transmissive member 132. However, the following description will also be applied to the case reverse to the above-described case.

The light sensor 134 is disposed beneath the light-transmissive member 132 around an optical axis LX, and may sense light incident thereupon through a light incidence portion OP3 after being scattered by particles P in the scattering portion SS. The light incidence portion will be described later.

Figure 26:
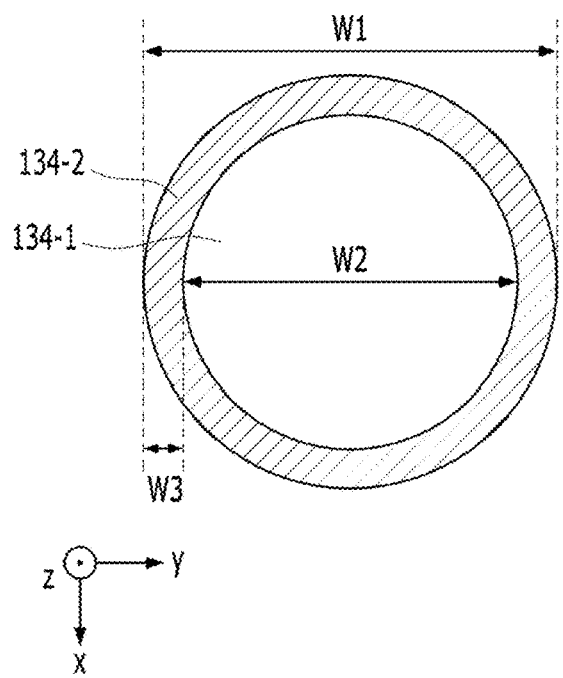
FIG. 26 is a planar shape of an embodiment of a light sensor shown in FIG. 25.

FIG. 26 is a planar shape of an embodiment (134A) of the light sensor 134 shown in FIG. 25.

Referring to FIG. 26, a light sensor 134A may include a central portion 134-1 and a photodiode 134-2. The central portion 134-1 is disposed on the optical axis LX, and may be made of a material having light transmissivity in order to send main light emerging from the scattering portion SS after transmitting the main light therethrough. For example, the central portion 134-1 may be made of glass.

In addition, the central portion 134-1 may cover a light entrance OPL of the light absorbing unit 140. When the central portion 134-1 covers the light entrance OPL, as described above, penetration of foreign matter into the light absorbing unit 140 is prevented. Introduction of particles P emerging from the scattering portion SS into the light absorbing unit 140 is also prevented. Accordingly, flow of particles P in the first flow channel unit 120 becomes smooth, and measurement error may be reduced.

In addition, when the photodiode 134-2 is disposed at the second surface 132-2 of the light-transmissive member 132, damage to the photodiode 132-2 caused by foreign matter may be prevented.

The photodiode 134-2 is disposed around the central portion 134-1, and functions to sense light scattered by particles P. The photodiode 134-2 corresponds to an active region absorbing light in a general photodiode structure.

For example, the photodiode 134-2 may detect light in a wavelength band of 380 to 1,100 nm. However, embodiments are not limited to specific wavelength bands detectable by the photodiode 134-2. In addition, in order to effectively sense scattered light, the photodiode 134-2 may have a sensitivity of 0.4 A/W at a wavelength of 660 nm or a sensitivity of 0.3 A/W at a wavelength of 450 nm, but embodiments are not limited thereto.

Referring to FIG. 26, the width W1 of the light sensor 134A may be 5 to 20 mm, for example, 7 to 15 mm, preferably, 8 to 10 mm, but embodiments are not limited thereto.

In addition, a width W2 of the central portion 134-1 may be 3 to 18 mm, for example, 5 to 13 mm, preferably 7 to 9 mm, but embodiments are not limited thereto.

Furthermore, a planar width W3 of the photodiode 134-2 may be 0.1 to 5 mm, for example, 1 to 3 mm, preferably, 1.5 to 2.5 mm, but embodiments are not limited thereto.

The planar shape of the photodiode 134-2 shown in FIG. 26 is a circular ring shape, but embodiments are not limited thereto. For example, the photodiode 134-2 may have various planar shapes, so long as the light sensor 134 includes the central portion 134-1.

Figure 27:
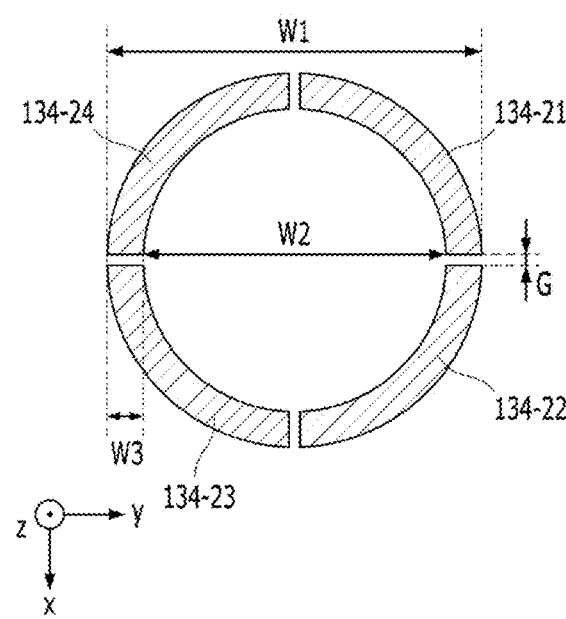
FIG. 27 illustrates a planar shape of another embodiment of the light sensor shown in FIG. 25.

For example, the planar shape of the photodiode 134-2 may be a polygonal shape (a rectangular shape, a square shape, a triangular shape, etc.) or an oval ring shape. FIG. 27 illustrates a planar shape of another embodiment (134E) of the light sensor 134 shown in FIG. 25.

The photodiode 134-2 may include a plurality of sensing segments disposed on the same plane while being spaced apart from one another. For example, as illustrated in FIG. 27, the photodiode 134-2 may include a plurality of sensing segments 134-21, 134-22, 134-23, and 134-24 disposed to be spaced apart from one another. Of course, even when the light sensor 134 has a polygonal shape (a rectangular shape, a square shape, a triangular shape, etc.) or an oval ring shape, each light sensor 134 may include a plurality of sensing segments 134-21, 134-22, 134-23, and 134-24.

In addition, the plurality of sensing segments 134-21, 134-22, 134-23, and 134-24 may be disposed to be spaced apart from one another at a uniform interval or at different intervals. For example, at a greater interval G of the plurality of sensing segments 134-21, 134-22, 134-23, and 134-24, an increased signal level is obtained and, as such, freedom of design may be enhanced. For example, the interval G may be 0.01 to 1 mm, for example, 0.1 to 0.5 mm, preferably, 0.15 to 0.25 mm, but embodiments are not limited thereto.

In addition, the plurality of sensing segments 134-21, 134-22, 134-23, and 134-24 may have the same planar area or may have different planar areas.

Furthermore, the light sensors illustrated in FIGS. 26 and 27 may be symmetrically disposed on a plane, but embodiments are not limited thereto. In accordance with another embodiment, such a light sensor may be asymmetrically disposed on a plane.

In addition, the plurality of sensing segments 134-21, 134-22, 134-23, and 134-24 may be symmetrically or asymmetrically disposed on a plane.

The widths W1, W2 and W3 shown in FIG. 27 may be applied to the content described in conjunction with FIG. 26.

For example, similarly to the photodiode 134-2, each of the plural sensing segments 134-21, 134-22, 134-23, and 134-24 may detect light in a wavelength band of 380 to 1,100 nm. However, embodiments are not limited to a specific wavelength band detectable by the plurality of sensing segments 134-21, 134-22, 134-23, and 134-24. In addition, in order to effectively sense scattered light, each of the plural sensing segments 134-21, 134-22, 134-23, and 134-24 may have a sensitivity of 0.4 A/W at a wavelength of 660 nm or a sensitivity of 0.3 A/W at a wavelength of 450 nm, but embodiments are not limited thereto.

When the photodiode 134-2 includes the plurality of sensing segments 134-21, 134-22, 134-23, and 134-24 disposed to be spaced apart from one another, as illustrated in FIG. 27, the information analyzing unit 160 may estimate the shape of a particle using relative sizes of sensed results obtained from the plurality of sensing segments 134-21, 134-22, 134-23, and 134-24.

Figure 28A:
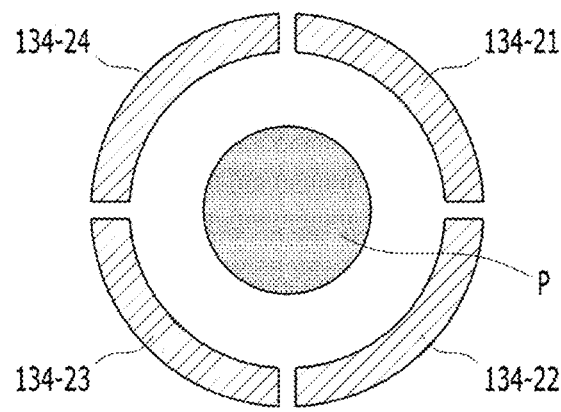
FIGS. 28A and 28B are views for explaining estimation of the shape of a particle using a plurality of sensing segments.
Figure 28B:
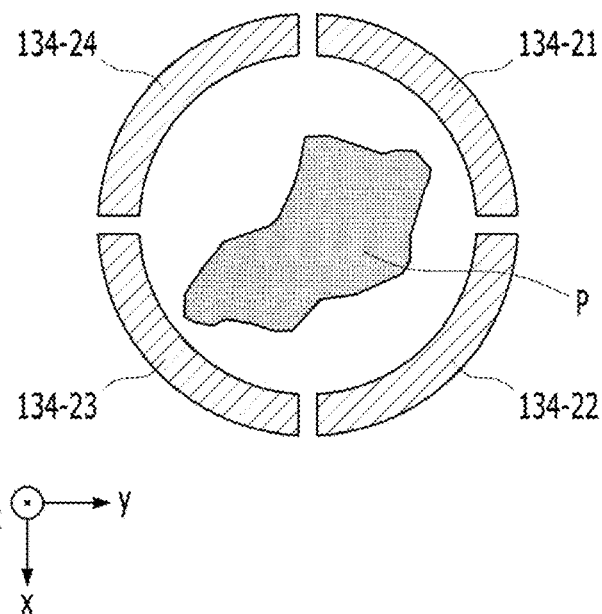

FIGS. 28A and 28B are views for explaining estimation of the shape of a particle P using the plurality of sensing segments 134-21, 134-22, 134-23, and 134-24.

Referring to FIG. 28A, when the shape of a particle P is a symmetrical shape, for example, a spherical shape, intensities of scattered light respectively sensed by the plurality of sensing segments 134-21, 134-22, 134-23, and 134-24 are equal. When intensities of light sensed by the plurality of sensing segments 134-21, 134-22, 134-23, and 134-24 are equal, as described above, the information analyzing unit 160 may determine the particle P to have a symmetrical shape.

On the other hand, referring to FIG. 28B, when the shape of a particle P is an asymmetrical shape, for example, a non-spherical shape, intensities of scattered light respectively sensed by the plurality of sensing segments 134-21, 134-22, 134-23, and 134-24 are different. When intensities of light sensed by the plurality of sensing segments 134-21, 134-22, 134-23, and 134-24 are different, as described above, the information analyzing unit 160 may determine the particle P as having an asymmetrical shape.

Of course, the segmentation shape and number of plural sensing segments may be varied in order to estimate various shapes of particles.

Similarly to the light source 112A of the light emitting unit 110A, the packaging type of the photodiodes 134-2 and 134-21 to 134-24 in the above-described light receiving unit 130A may be embodied as an SMD type or a lead type. However, embodiments are not limited to a particular packaging type of the photodiodes 134-2 and 134-21 to 134-24.

Meanwhile, the light incidence portion is disposed between the scattering portion SS and the light receiving unit 130A to perform a function of adjusting the amount of light incident upon the light receiving unit 130A. For this function, the light incidence portion may include a third opening portion OP3 disposed on the optical axis LX.

The third opening portion OP3 may have an area (for example, an area in x and y-axis directions) suitable for incidence of 20 to 80% of the total amount of light scattered by particles P in the scattering portion SS upon the light receiving unit 130A.

For example, when a portion of light scattered by particles P in the scattering portion SS, which ranges from the center of the scattering portion SS to a fifth opening portion OP5, has an angle of 12° at left and right sides with reference to the optical axis LX, that is, when a predetermined angle θ shown in FIGS. 3, 21 and 23 is 24°, 20% of the entirety of the light scattered by the particles P may be incident upon the light receiving unit 130A. When the predetermined angle θ is 60° (that is, 30° at left and right sides with reference to the optical axis LX), 50% of the entirety of the light scattered by the particles P may be incident upon the light receiving unit 130A. When these conditions are taken into consideration, the third opening portion OP3 may have an area suitable for light ranging through a sum of left and light angles with reference to the optical axis LX, that is, a predetermined angle θ of 24 to 60°, for example, 30° at left and right sides with reference to the optical axis LX, among light scattered by particles P, to be incident upon the light receiving unit 130A in accordance with an embodiment. Accordingly, it can be seen that it is possible to adjust the amount of light incident upon the light receiving unit 130A by adjusting the area of the third opening portion OP3.

In addition, referring to FIGS. 4, 22 and 24, the area of the third opening portion OP3 (for example, an area in x and y-axis directions) may differ from the area of the first opening portion OP1 (for example, an area in x and y-axis directions). For example, when the third opening portion OP3 has a circular planar shape, scattered light having a greater area than the area of the photodiode 134-2 or the photodiodes 134-21 to 134-24 may be incident under the condition that the diameter D3 of the third opening portion OP3 is greater than 10 mm. In this case, light noise may be generated. On the other hand, when the diameter D3 of the third opening portion OP3 is smaller than 2 mm, the amount of scattered light received by the photodiode 134-2 or the photodiodes 134-21 to 134-24 is reduced and, as such, the magnitude of a signal sensed by the photodiode 134-2 or the photodiodes 134-21 to 134-24 may be small. Therefore, the D3 of the third opening portion OP3 may be 2 to 10 mm, but embodiments are not limited thereto.

In addition, as illustrated in FIGS. 22 and 24, each cross-sectional area of the inlet IH and the outlet OH in directions (for example, x and z-axis directions) perpendicular to a flow direction of air (for example, a y-axis direction) may be greater than the area of the first opening portion OP1, and may be greater than the cross-sectional area of the second opening portion OP2.

Alternatively, each greatest cross-sectional area of a first path of the inlet channel portion FI and a second path of the outlet channel portion FO in directions (for example, x and z-axis directions) perpendicular to a flow direction of air (for example, a y-axis direction) may be greater than the area of the first opening portion OP1, and may be greater than the cross-sectional area of the second opening portion OP2.

For example, when the x-axis lengths of the inlet IH and the outlet OH are equal to the x-axis lengths of the first opening portion OP1 and the second opening portion OP2, each height D2 of the inlet IH and the outlet OH may be greater than the y-axis width D1 of the first opening portion OP1, and may be greater than the z-axis height D4 of the second opening portion OP2.

In addition, for example, when each of the inlet channel portion FI, the outlet channel portion FO, and the second opening portion OP2 has a circular cross-sectional shape, and the first opening portion OP1 has a circular planar shape, each diameter D2 of the inlet IH and outlet OH may be greater than the diameter D1 of the first opening portion OP1, and may be greater than the diameter D4 of the second opening portion OP2.

Alternatively, for example, when each x-axis length of the inlet IH and the outlet OH is equal to each x-axis length of the first opening portion OP1 and the second opening portion OP2, each greatest z-axis height of the first path and the second path may be greater than the y-axis width D2 of the first opening portion OP1, and may be greater than the z-axis height D4 of the second opening portion OP2.

In addition, for example, when each of the inlet channel portion FI, the outlet channel portion FO, and the second opening portion OP2 has a circular cross-sectional shape, and the first opening portion OP1 has a circular planar shape, each greatest diameter of the first path and the second path may be greater than the diameter D1 of the first opening portion OP1, and may be greater than the diameter D4 of the second opening portion OP2.

Meanwhile, again referring to FIG. 25, the light guide 136A functions to guide light scattered in the scattering portion SS to the light sensor 134. For this function, for example, the light guide 136A may include inner barrier walls 136-1 and 136-2, and outer barrier walls 136-3 and 136-4. When the inner barrier walls 136-1 and 136-2 have a circular planar shape, the inner barrier walls 136-1 and 136-2 may have an integrated structure. When the outer barrier walls 136-3 and 136-4 have a circular planar shape, the outer barrier walls 136-3 and 136-4 may have an integrated structure.

The inner barrier walls 136-1 and 136-2 may define a fourth opening portion OP4 overlapping with the light entrance OPL of the light absorbing unit 140 in a direction (for example, a z-axis direction) parallel to the optical axis LX. The inner barrier walls 136-1 and 136-2 may have a height H1 allowing scattered light emerging from the third opening portion OP3 to advance to the fifth opening portion OP5 while allowing main light emerging from the third opening portion P3 to advance to the fourth opening portion OP4. That is, the inner barrier walls 136-1 and 136-2 may function to separate the main light and the scattered light from each other.

The outer barrier walls 136-3 and 136-4 may define the fifth opening portion OP5 overlapping with the photodiode 134-2 in a direction (for example, a z-axis direction) parallel to the optical axis LX, together with the inner barrier walls 136-1 and 136-2.

The fifth opening portion OP5 has a width W4 of 2 to 6 mm, but embodiments are not limited thereto.

When the inner barrier walls 136-1 and 136-2, and the outer barrier walls 136-3 and 136-4 are disposed as described above, scattered light incident upon the third opening portion OP3 may advance to the photodiode 134-2 of the light sensor 134, and main light incident upon the third opening portion OP3 may advance to the light absorbing unit 140, as indicated by an arrow in FIG. 3.

Meanwhile, the light receiving unit 130A may further include a sensing support 138. If necessary, the sensing support 136 may be omitted.

The sensing support 138 performs a function of supporting the light sensor 134. The sensing support 138 may be separate from the bottom portion 176 of the housing 170, as illustrated in FIG. 3. Differently from the illustrated case, the sensing support 138 may be integrated with the bottom portion 176 of the housing 170.

Meanwhile, in accordance with an embodiment, the light absorbing unit 140 may include a dumping case 142 and a protrusion 144. The dumping case 142 defines the light entrance OPL upon which light emerging from the light receiving unit 130A is incident, and functions to accommodate main light emerging from the light receiving unit 130A therein. For this function, an inner wall of the dumping case 142 may be coated with a material having light absorbance. Although the dumping case 142 is illustrated as being separate from the bottom portion 176 of the housing 170 in the case of FIG. 3, embodiments are not limited thereto. That is, the dumping case 142 may be integrated with the bottom portion 176 of the housing 170, as in the particle sensing device 100D which will be described later. That is, the bottom portion 176 of the housing 170 may also perform the function of the dumping case 142.

In addition, the protrusion 144 may have a shape protruding from a bottom surface of the dumping case 142 toward the light entrance OPL. Furthermore, the width of the protrusion 144 may be gradually reduced as the protrusion 144 extends from the bottom surface of the dumping case 142 to the light entrance OPL. For example, as illustrated in FIG. 3, the protrusion 144 may have a circular (conical) cross-sectional shape, but embodiments are not limited thereto. When the protrusion 144 is disposed as described above, main light incident upon the light entrance OPL is prevented from exiting the light entrance OPL after being reflected from the inner wall of the dumping case 142. The protrusion 144 reflects the main light incident through the light entrance OPL toward the inner wall of the absorbing case 142 and, as such, absorbance of the main light incident upon the light entrance OPL may be enhanced.

Figure 29:
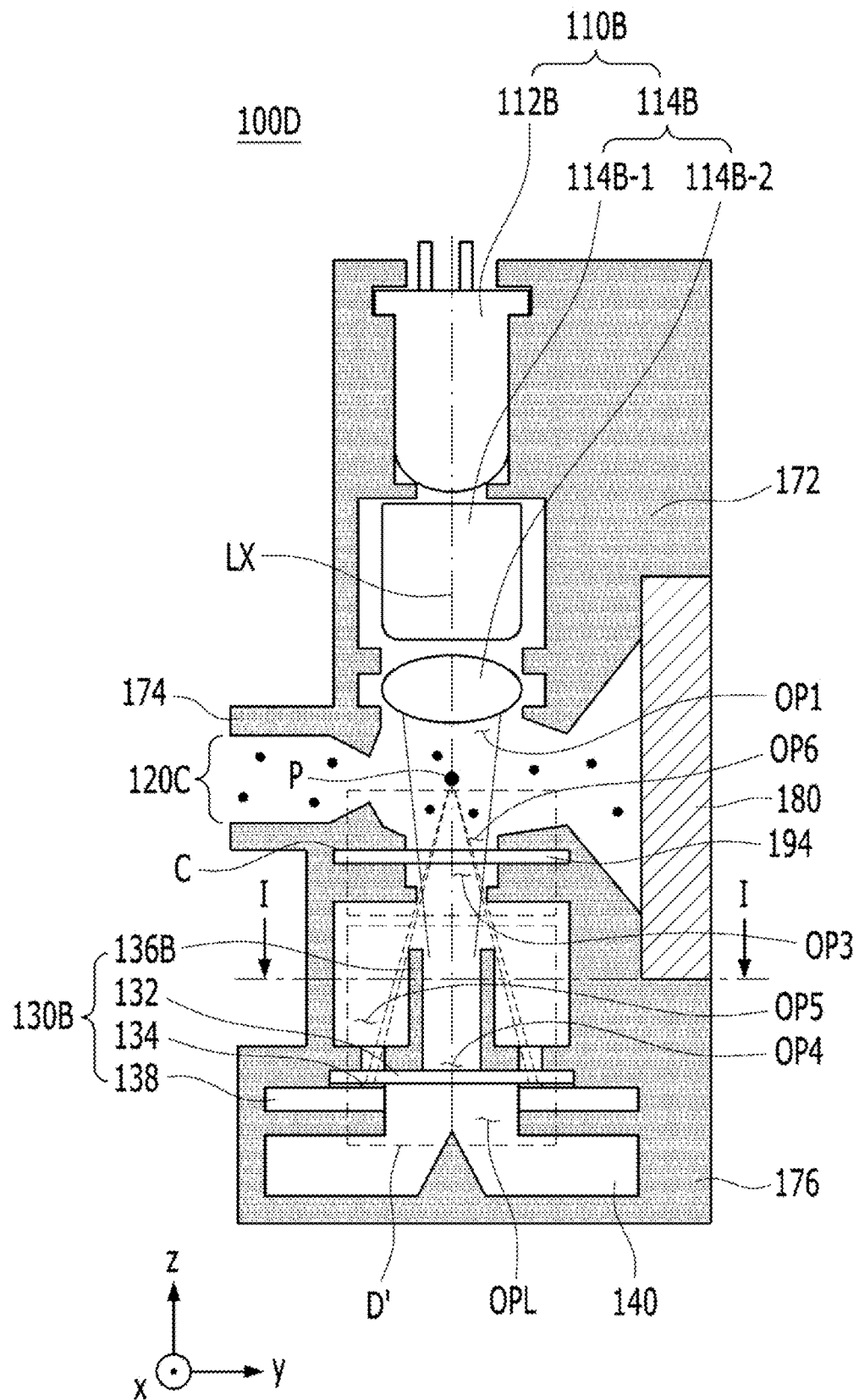
FIG. 29 illustrates a sectional view of another embodiment of the particle sensing device shown in FIG. 1.
Figure 30:
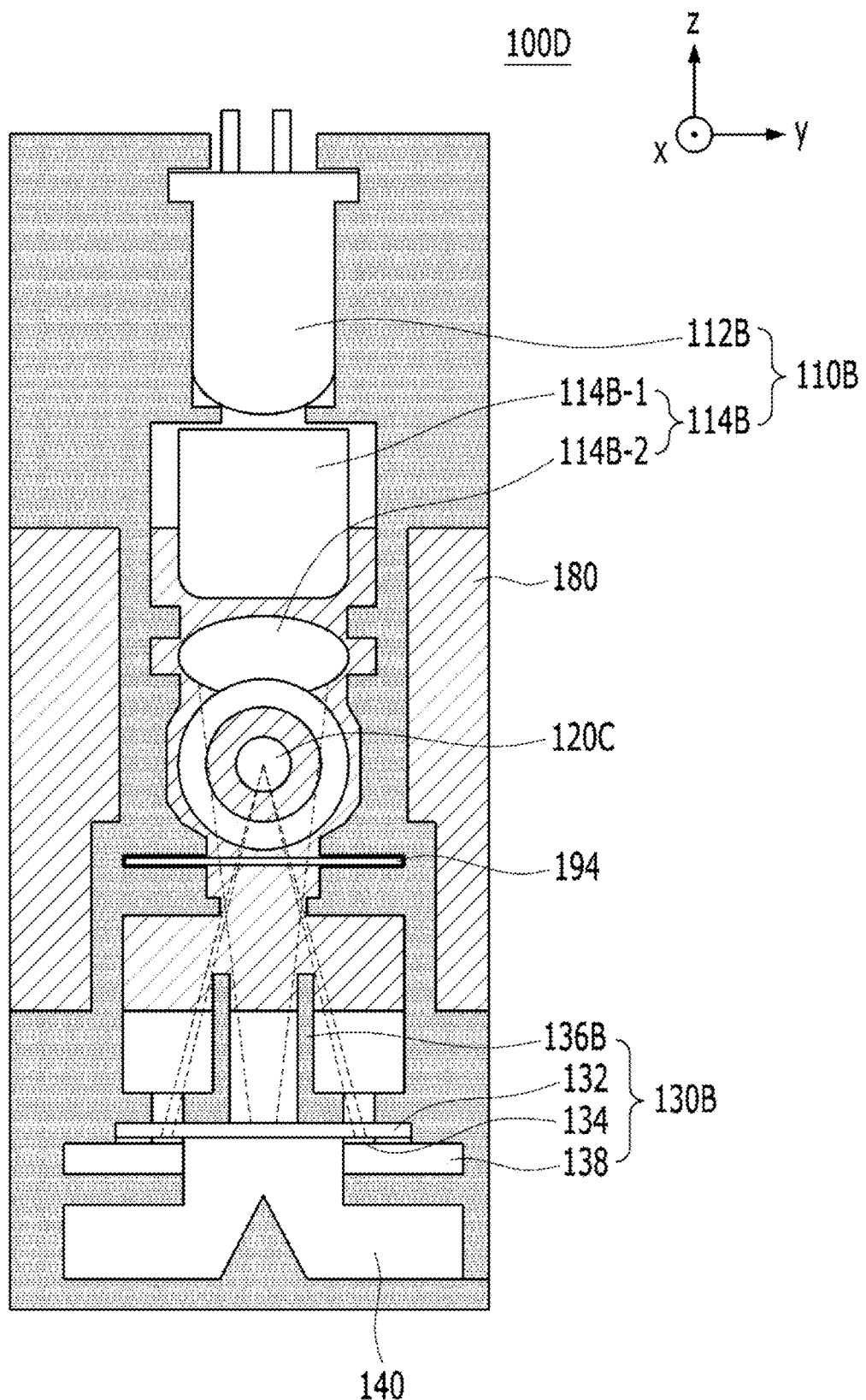
FIG. 30 illustrates a side view of the particle sensing device shown in FIG. 29.
Figure 31:
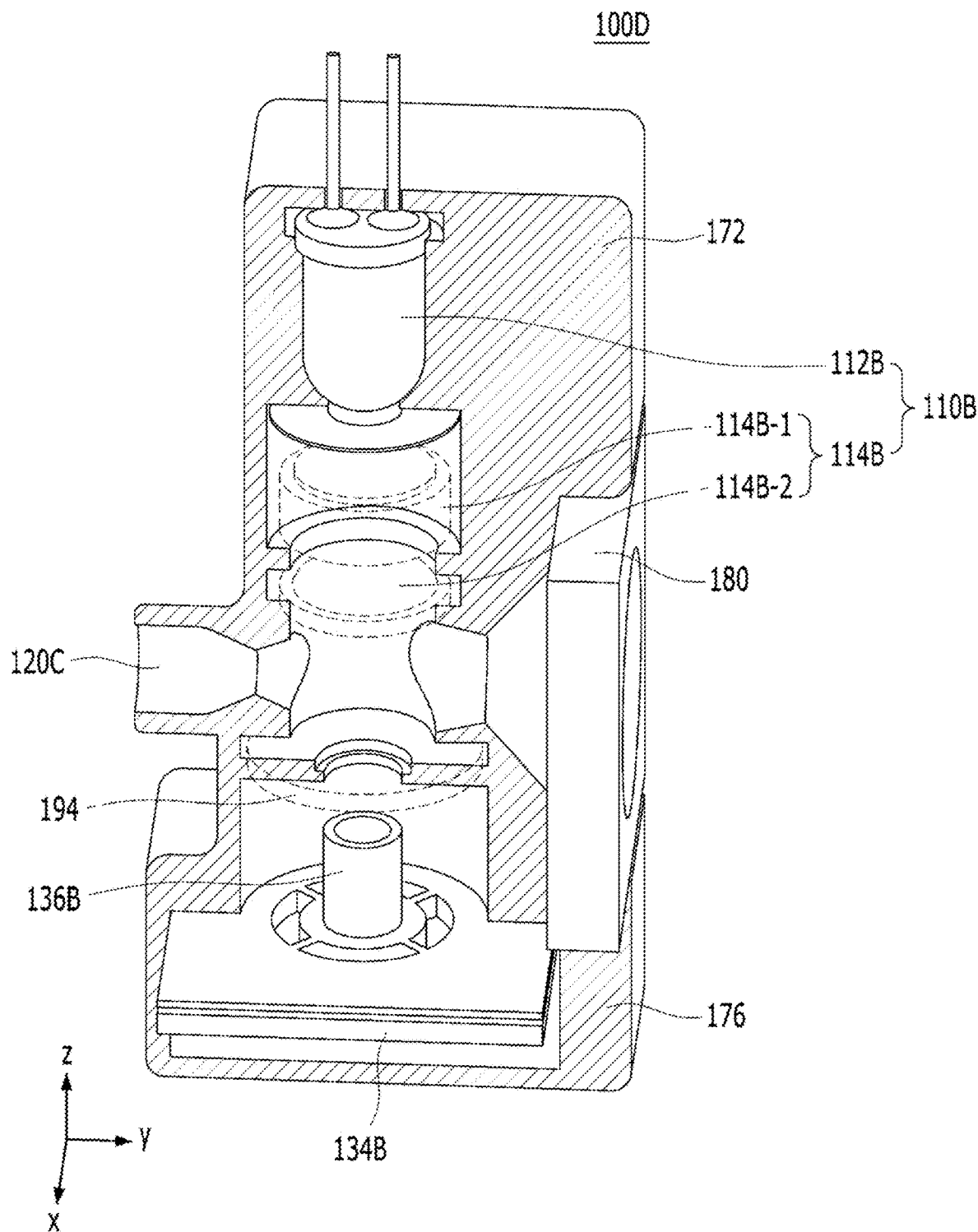
FIG. 31 illustrates a top perspective view of the particle sensing device shown in FIG. 29.

FIG. 29 illustrates a sectional view of another embodiment (100D) of the particle sensing device 100 shown in FIG. 1. FIG. 30 illustrates a side view of the particle sensing device 100D shown in FIG. 29. FIG. 31 illustrates a top perspective view of the particle sensing device 100D shown in FIG. 29. In conjunction with FIGS. 29 and 31, description will be given of portions different from those shown in FIGS. 21 to 28B. Accordingly, it may be appreciated that the descriptions given in conjunction with FIG. 3, FIG. 4, and FIGS. 21 to 28G may be applied to portions not described in conjunction with FIGS. 29 to 31, except for the different portions to be described hereinafter.

The packaging type of the light source unit 112A in each of the particle sensing devices 100A, 100B and 100C respectively shown in FIGS. 3, 21, and 23 is an SMD type, whereas the light source unit 112A in the particle sensing device 100D shown in FIGS. 29 to 31 may be a dome type (or a through hole type) LED, but embodiments are not limited thereto. For example, a dome type light emitting unit 110B may have a diameter φ of 3 to 5 mm and a view angle of 20°, but embodiments are not limited thereto.

In addition, an operating temperature of the photodiode 134-2 may be −10 to 50° C., but embodiments are not limited to a specific operating temperature of the photodiode 134-2.

The lens unit 114A in each of the particle sensing devices 100A, 100B and 100C respectively shown in FIGS. 3, 21, and 23 includes a single lens, whereas the lens unit 114B in the particle sensing device 100D shown in FIGS. 29 to 31 includes first and second lenses 114B-1 and 114B-2. The first lens 114B-1 may perform a function of converting light emitted from the light source unit 112B into collimated light. The second lens 114B-2 may perform a function of focusing collimated light emerging from the first lens 114B-1 onto the first opening portion OP1.

In each of the particle sensing devices 100A, 100B and 100C respectively shown in FIGS. 3, 21, and 23, the top portion 172 of the housing 170 is separate from the light emission case 116. However, in the particle sensing device 100D shown in FIGS. 29 to 31, the top portion 172 of the housing 170 is integrated with the light emission case 116. That is, it can be seen that the top portion of the housing 170 performs the function of the light emission case 116.

The first flow channel unit 120C in the particle sensing device 100D shown in FIGS. 29 to 31 may have a double nozzle (DN) structure, similarly to the first flow channel unit 120C shown in FIGS. 23 and 24. Accordingly, overlapping description of the first flow channel unit 120C shown in FIGS. 29 to 31 will be substituted by the description of the first flow channel unit 120C given in conjunction with FIGS. 23 and 24.

Figure 32:
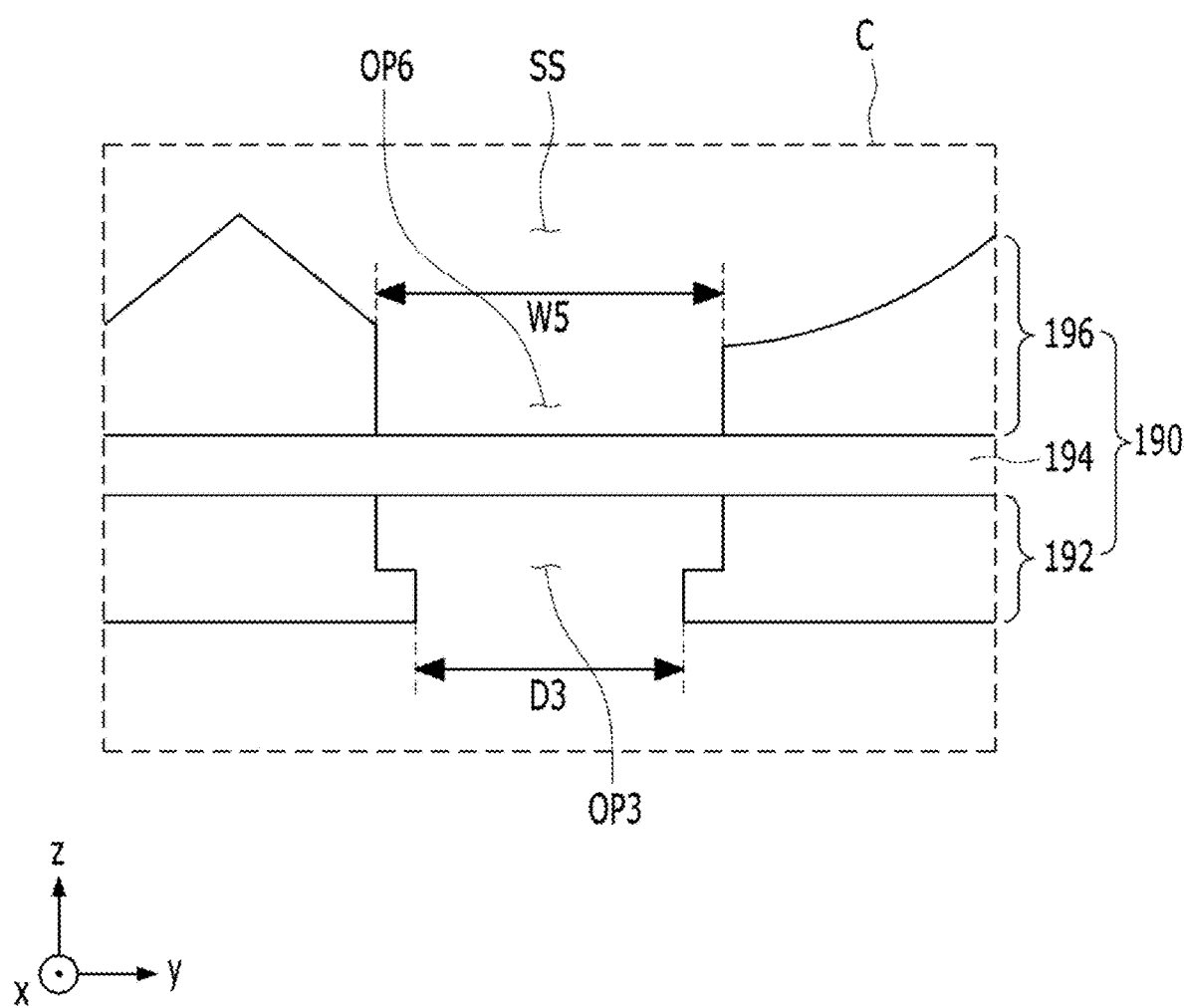
FIG. 32 is an enlarged sectional view corresponding to a portion C of FIG. 29.

FIG. 32 is an enlarged sectional view corresponding to a portion C of FIG. 29.

Referring to FIG. 32, a light incidence portion 190 may include a light guide 192, a cover light transmitting portion 194, and a light shielding portion 196.

The light guide 192 may be disposed between the scattering portion SS and a light receiving unit 130B, to define a third opening portion OP3. Here, characteristics of the third opening portion OP3 may be identical to those of the third opening portion OP3 described above with reference to FIG. 3. That is, the third opening portion OP3 may have an area (for example, an area having an x-axis length and a y-axis width) suitable for incidence of 20 to 80% of the total amount of light scattered by particles P in the scattering portion SS upon the light receiving unit 130B. In addition, the third opening portion OP3 has an area suitable for light ranging from the center of the scattering portion SS to a fifth opening portion OP5 through a sum of left and light angles with reference to the optical axis LX, that is, a predetermined angle θ of 24 to 60°, for example, 60°, among light scattered by particles P, to be incident upon the light receiving unit 130B. Accordingly, it can be seen that it is possible to adjust the amount of light incident upon the light receiving unit 130B by adjusting the area of the third opening portion OP3.

In addition, the area of the third opening portion OP3 may differ from the area of the first opening portion OP1. For example, when the third opening portion OP3 has a circular planar shape, the third opening portion OP3 may have a diameter D3 of 2 to 10 mm, but embodiments are not limited thereto.

For example, the area of the first opening portion OP1 may be greater than the area of the third opening portion OP3. In this case, a focus of light generated from the light emitting unit 110b may be formed at a position far from the center of the scattering portion SS and, as such, measurement error caused by a main beam may be reduced.

The light shielding portion 196 may be disposed between the scattering portion SS and the light guide 192, to define a sixth opening portion OP6. It may be possible to prevent incidence of main light onto the photodiode 134-2 or to adjust the amount of main light advancing to the light absorbing unit 140 after being incident upon the light receiving unit 130B by adjusting a width W5 of the sixth opening portion OP6. As the light shielding unit 196 is disposed as described above, it may be possible to prevent main light from advancing to the photodiode 134-2 of the light sensing unit 134 through the fifth opening portion OP5. In this case, the light sensing unit 134 may have a module type.

In addition, the cover light transmitting portion 194 may be disposed between the third opening portion OP6 and the sixth opening portion OP6. The cover light transmitting portion 194 may perform a function of preventing incidence of foreign matter upon the light receiving unit 130B. In accordance with disposition of the cover light transmitting portion 194, it may be possible to prevent particles P passing through the scattering portion SS from penetrating the light receiving unit 130B. Accordingly, flow of particles P in the first flow channel unit 120C becomes smooth, and measurement error may be reduced. In this case, damage to the photodiode 134-2 or the photodiodes 134-21 to 134-24 caused by foreign matter may be prevented even when the photodiode 134-2 or the photodiodes 134-21 to 134-24 are formed at any one of the first surface 132-1 and the second surface 132-2 of the light-transmissive member 132.

Figure 33:
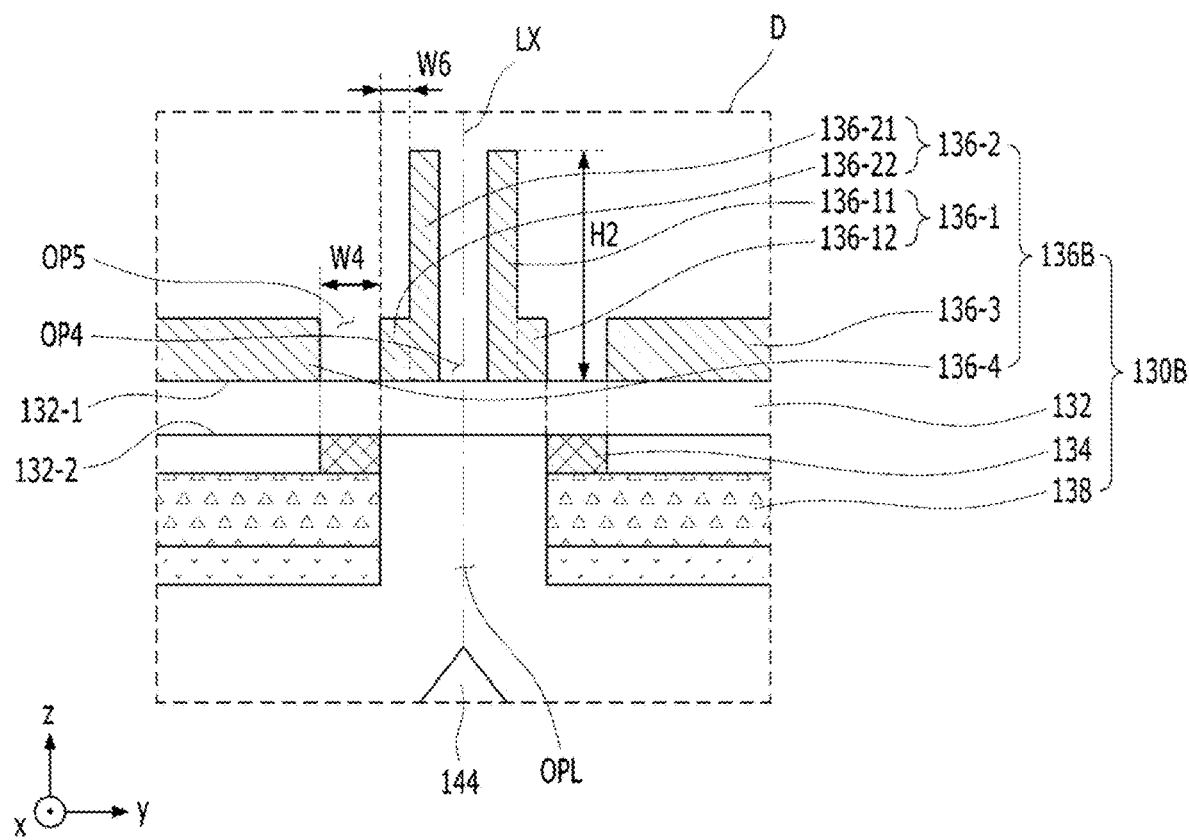
FIG. 33 is an enlarged sectional view corresponding to a portion D of FIG. 29.

FIG. 33 is an enlarged sectional view corresponding to a portion D of FIG. 29.

The light sensor 134 and the light guide 136B shown in FIG. 33 may be disposed around an optical axis of the light-transmissive member 132. The light sensor 134 and the light guide 136B may be disposed at opposite surfaces of the light-transmissive member 132, respectively. For example, as shown in FIG. 33, the light sensor 134 may be disposed at a second surface 132-2 of the light-transmissive member 132, and the light guide 136B may be disposed at a first surface 132-1 of the light-transmissive member 132. Alternatively, differently from FIG. 25, the light sensor 134 may be disposed at the first surface 132-1 of the light-transmissive member 132, and the light guide 136B may be disposed at the second surface 132-2 of the light-transmissive member 132. Here, definition of the first surface 132-1 and the second surface 132-2 is identical to the definition in the description given in conjunction with FIG. 25. Although the following description will be given in conjunction with the case in which the light sensor 134 is disposed at the second surface 132-2 of the light-transmissive member 132, and the light guide 136B is disposed at the first surface 132-1 of the light-transmissive member 132, the following description may also be applied to the case reverse to the above-described case.

The cross-section shown in FIG. 33 is identical to the cross-section shown in FIG. 15, except for the structures of the inner barrier walls 136-1 and 136-2. Accordingly, portions identical to those of the cross-section shown in FIG. 25 are designated by the same reference numerals, and are briefly described. The following description will be given mainly in conjunction with different portions.

The inner barrier walls 136-1 and 136-2 may have a height H2 allowing scattered light emerging from the third opening portion OP3 to advance to the fifth opening portion OP5 while allowing main light emerging from the sixth opening portion OP6 to advance to the fourth opening portion OP4. For example, the height H2 may be 3.3 mm, but embodiments are not limited thereto.

The inner barrier walls 136-1 and 136-2 may include respective inner portions 136-11 and 136-21 defining the fourth opening portion OP4, and respective outer portions 136-12 and 136-22 defining the fifth opening portion OP5, together with the outer barrier walls 136-3 and 136-4, while extending from respective inner portions 136-11 and 136-21. The diameter of the fourth opening portion OP4 having a circular planar shape should be greater than the focusing size of a main beam. If the diameter of the fourth opening portion OP4 is smaller than 2 mm, the main beam incompletely passes through the fourth opening portion OP4 and, as such, may be incident upon the photodiode 134-2 or the photodiodes 134-21 to 134-24. As a result, the photodiode 134-2 or the photodiodes 134-21 to 134-24 may not sense scattered light. In addition, when the diameter of the fourth opening portion OP4 is greater than 6 mm, a slit cannot be embodied. Therefore, the diameter of the fourth opening portion OP4 may be 2 to 6 mm, but embodiments are not limited thereto.

The width W4 of the fifth opening portion OP5 may be 1 to 6 mm, but embodiments are not limited thereto.

In addition, the width W4 of the fifth opening portion OP5 may be greater than a width W6 of the outer portions 136-12 and 136-22. For example, the width W4 of the fifth opening portion OP5 may be 1.1 mm, and the width W6 of the outer portions 136-12 and 136-22 may be 0.8 mm, but embodiments are not limited thereto.

Furthermore, the outer portions 136-12 and 136-22 of the inner barrier wall 136-1 and 136-2 may be integrated with the inner portions 136-11 and 136-21 of the inner barrier wall 136-1 and 136-2, respectively.

In addition, at least one of each outer portion 136-12 or 136-22 or each inner portion 136-11 or 136-21 may have a cross-sectional width gradually reduced as the at least one portion extends from the first surface 132-1 of the light-transmissive member 132 to the third opening portion OP3. That is, the reason why the inner barrier walls 136-1 and 136-2 are divided into respective inner portions 136-11 and 136-21 and respective outer portions 136-12 and 136-22 is to enable scattered light to be effectively incident upon the photodiode 134 at a predetermined angle. As such, the at least one portion may have a triangular cross-sectional shape.

In addition, the area (for example, the area in x and y-axis directions) of the fourth opening portion OP4 shown in FIG. 33 may be smaller than the area (for example, the area in x and y-axis directions) of the sixth opening portion OP6 shown in FIG. 32, but embodiments are not limited thereto. When the area of the sixth opening portion OP6 is greater than the area of the fourth opening portion OP4, it may be possible to more effectively prevent advance of a main beam to the photodiode 134-2.

The scattering portion SS may contact a plurality of opening portions. That is, the scattering portion SS may communicate with the light emitting unit 110A through the first opening portion OP1, may communicate with the first intermediate channel portion FiII (or the second intermediate channel portion FII2) through the second opening portion OP2, and may communicate with the light receiving unit 130A or 130B through the third opening portion OP3 or the sixth opening portion OP6.

Hereinafter, a particle sensing device capable of concentrating a flow of air in a specific space in a scattering portion using the above-mentioned nozzle effect described above with reference to FIGS. 17A and 17B in accordance with another embodiment will be described with reference to FIGS. 34A and 34B.

Figure 34A:
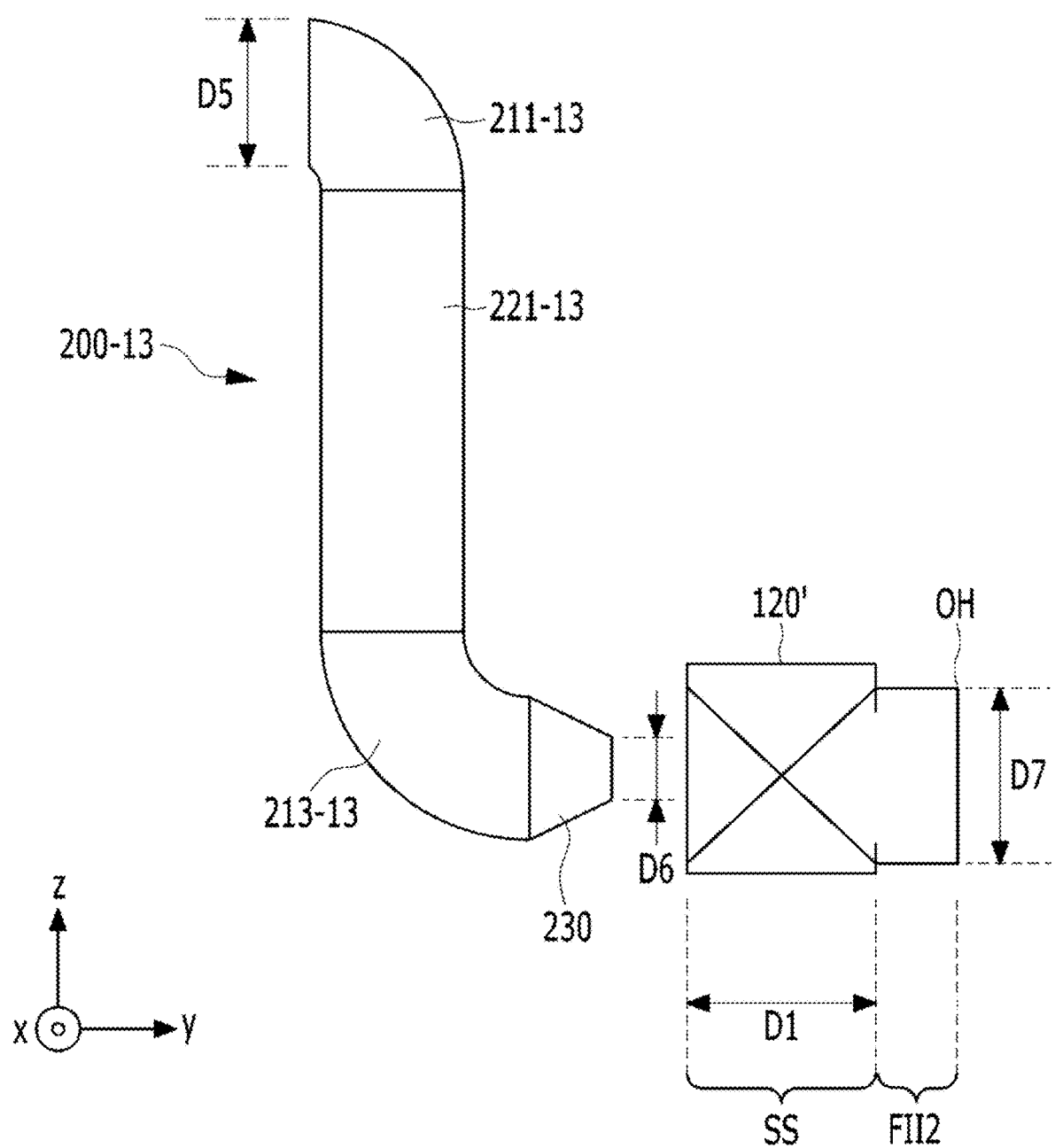
FIG. 34A is a side view illustrating an example of a structure of a flow channel unit structure according to another embodiment.
Figure 34B:
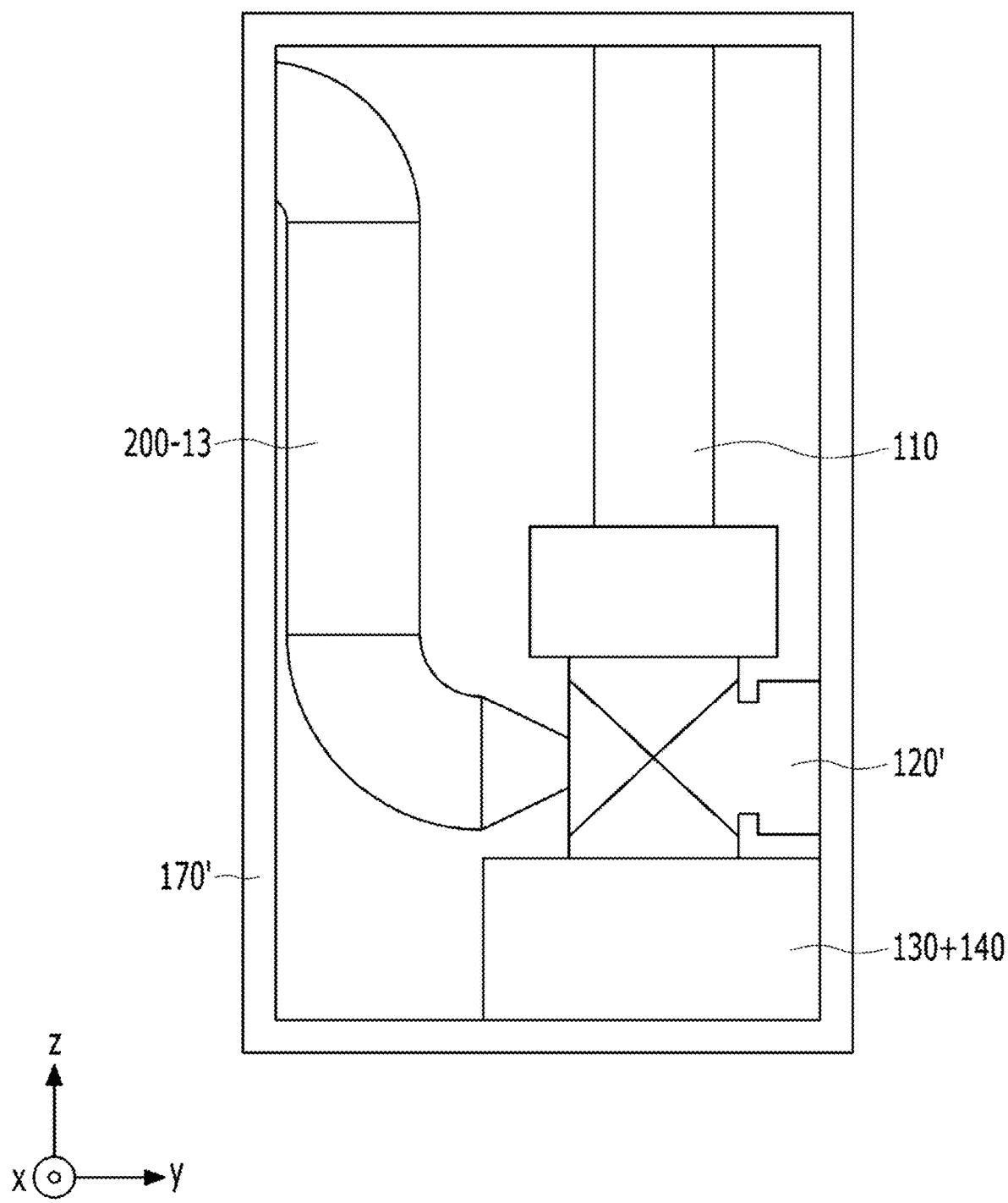
FIG. 34B is a side view illustrating an example of a structure of a particle sensing device including the structure of the flow channel unit shown in FIG. 34A.
Figure 34C:
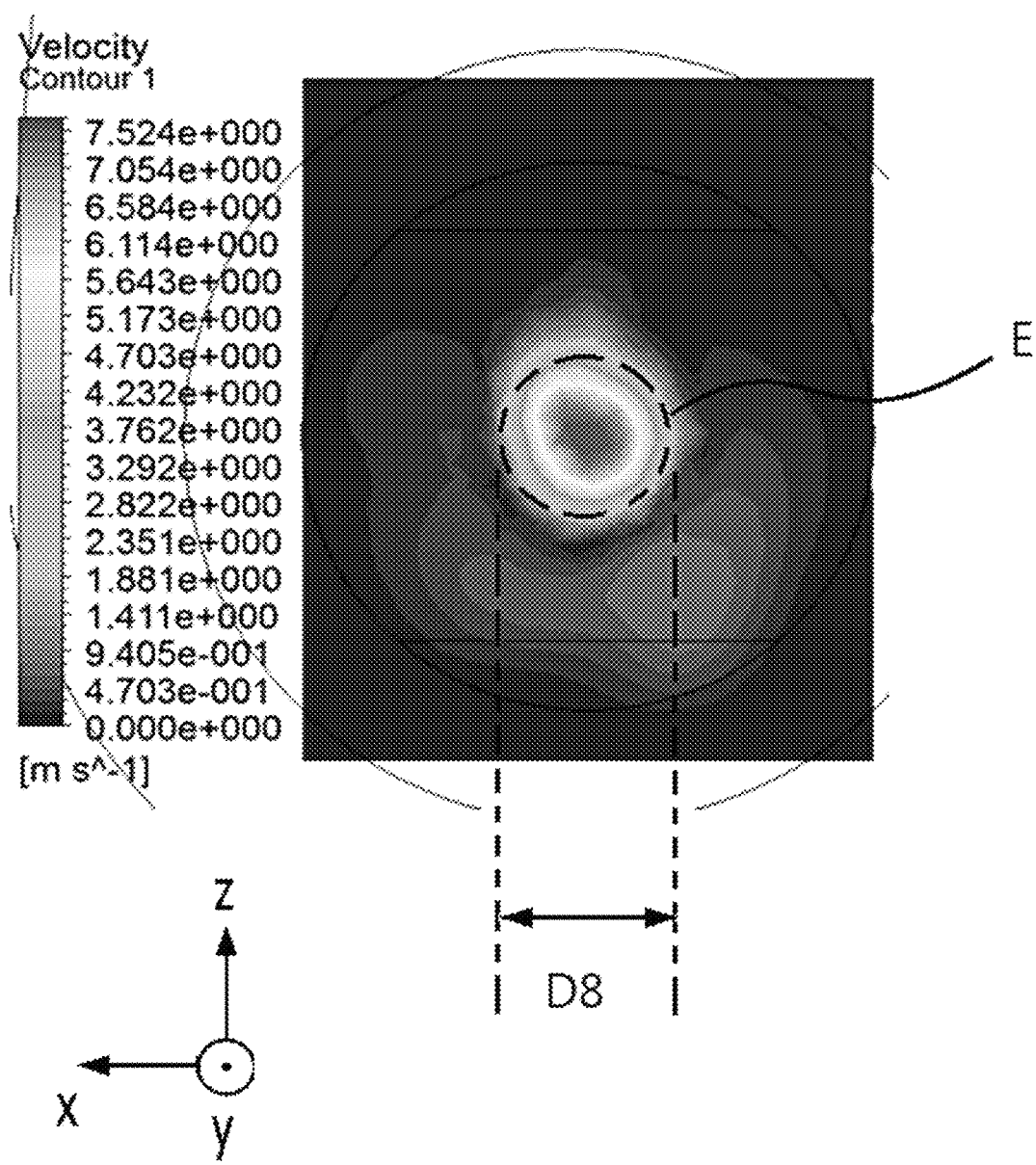
FIGS. 34C and 34D illustrate simulation results for explaining effects of the structure of the flow channel unit including a nozzle portion shown in FIG. 34A.
Figure 34D:
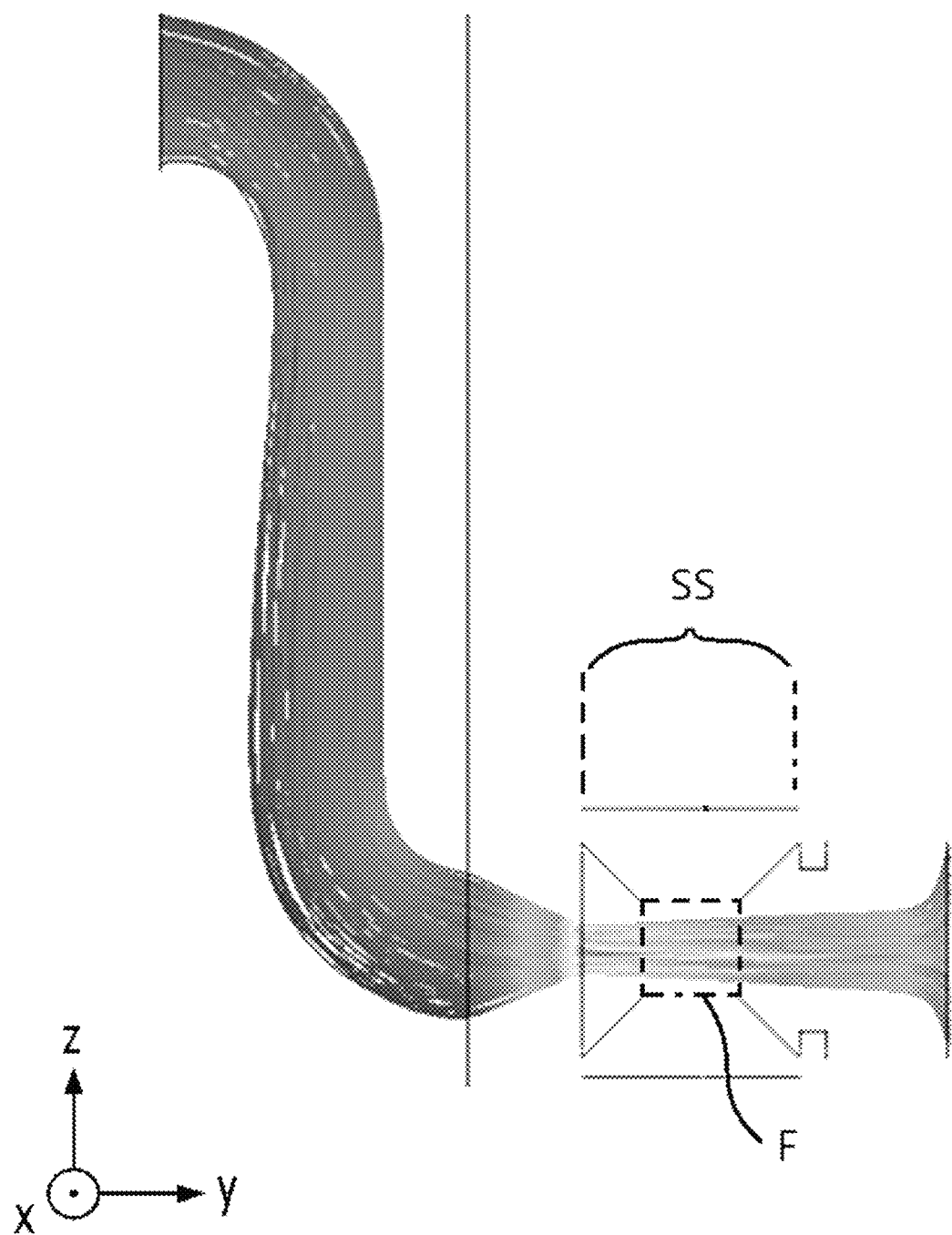

FIG. 34A is a side view illustrating an example of a structure of a flow channel unit structure according to another embodiment. FIG. 34B is a side view illustrating an example of a structure of a particle sensing device including the structure of the flow channel unit shown in FIG. 34A. FIGS. 34C and 34D illustrate simulation results for explaining effects of the structure of the flow channel unit including a nozzle portion shown in FIG. 34A.

Referring to FIG. 34A, a second flow channel unit 200-13 having a nozzle portion 230 and a first flow channel unit 120', from which a first intermediate channel portion is omitted, are illustrated. Here, for convenience of description, in the first flow channel unit 120', from which the first intermediate channel portion is omitted, a portion thereof corresponding to the scattering portion SS may be referred to as a "first flow channel portion SS", and a portion thereof corresponding to the second intermediate channel portion FII2 may be referred to as a "third flow channel portion FII2", only in conjunction with embodiments illustrated in FIGS. 34A to 38B. In this case, it may be considered that the third flow channel portion FII2 performs a function of discharging air in accordance with communication thereof with the first flow channel portion SS.

In more detail, the second flow channel unit 200-13 includes a first curved portion 211-13, into which external air is introduced, a first extension portion 221-13, a second curved portion 2213-13, and the nozzle portion 230, which communicates with the first flow channel portion. The first curved portion 211-13 has an external air inlet in a −Y-axis direction. The first curved portion 211-13 is bent while having a curvature (or a radius of curvature), to change a flow direction of air (for example, from a Y-axis direction to a −Z-axis direction). The first curved portion 211-13 communicates with the first extension portion 221-13.

The first extension portion 221-13 may extend in a direction (for example, a direction parallel to the optical axis of the light emitting unit) different from a direction of air introduced into the external air inlet.

The second curved portion communicates with the first extension portion 221-13 and the nozzle portion 230. The second curved portion is bent while having a curvature, thereby again changing the flow direction of air from the −Z-axis direction to the Y-axis direction. Accordingly, the introduction direction of air at the external air inlet of the first curved portion 211-13 may correspond to a flow direction of air in the first flow channel unit 120', that is, an extension direction from an inlet of the first flow channel unit 120' to an outlet of the first flow channel unit 120'.

In this case, the diameter of the cross-section of the second flow channel unit 200-13 in a cross-sectional direction of a flow channel in the second flow channel unit 200-13, except for the nozzle portion 230, may be uniform. In other words, the difference between the radius of outer curvature and the radius of inner curvature in each of the first curved portion 211-13 and the second curved portion 213-13 may correspond to a diameter D5 of the external air inlet.

For example, assuming that the inlet diameter D5 is 6 mm, each of the first curved portion 211-13 and the second curved portion 213-13 has a central curvature ratio of 1 (that is, the radius of central curvature being R6), the length of the first extension portion 221-13 is 20 mm, and the length of the nozzle portion 230 in an air flow direction (that is, the Y-axis direction) is 4 mm, the total flow channel length is about 43 mm and, as such, satisfies the minimum flow channel length and the curvature ratio of the curved portion as described above. In addition, a diameter D6 of the nozzle portion 230 in an outlet direction may be ½ or less or ⅓ or less of the remaining portion of the second flow channel unit 200-13 (for example, D6 being 2 mm at D5 of 6 mm). In other words, the diameter of the nozzle portion 230 at a position thereof communicating with the second curved portion 213-13 may be greater than the diameter D6 of the nozzle portion 230 at a position thereof communicating with the first flow channel unit. In this case, the nozzle portion 230 may have a (truncated) conical shape.

In addition, the length of the nozzle portion 230 in an air flow direction (that is, the Y-axis direction) may be ⅖ to ⅗ (that is, 40 to 60%) of the length D1 of the scattering portion in an air flow direction.

The first flow channel unit 120' has a structure from which the first intermediate channel portion is omitted, and communicates with the nozzle portion 230. Accordingly, the inlet of the first flow channel unit 120' corresponds to the diameter D6 of the nozzle portion in an outlet direction, and a diameter D7 of an outlet OH in the first flow channel unit 120' may be 1 to 4/3 of the diameter D5 of the second flow channel unit (for example, D7 being 8 mm at D6 of 6 mm). Thus, the outlet diameter D7 of the first flow channel unit 120' may be greater than the minimum diameter D6 of the nozzle portion 230. In addition, the outlet diameter D7 of the first flow channel unit 120' may be greater than the external air inlet diameter D5.

Of course, ratios of diameters and lengths of the constituent elements in each flow channel unit 200-13 or 120' as described above are illustrative without being limited thereto. In addition, the first extension portion 221-13 extends along the Z-axis parallel to the optical axis of the light emitting unit in the case of FIG. 34A and, as such, each of the first curved portion 211-13 and the second curved portion 213-13 is shown as having an angle of the radius thereof with respect to the radius of curvature thereof to be 90°. However, this should be considered as illustrative. For example, the first extension portion 221-13 may extend in a direction in which the first extension portion 221-13 has an acute angle of 60° or less with respect to the optical axis, and the first curved portion 211-13 and the second curved portion 213-13 may different radius angles with respect the radius of curvature. For example, when the first extension portion 221-13 extends in a direction in which the first extension portion 221-13 forms 60° with respect to the optical axis, each of the first curved portion 211-13 and the second curved portion 213-13 may have a radius angle of 30° with respect to a radius of curvature. In another example, the sum of the radius angle with respect to the radius of curvature in the first curved portion 211-13 and the radius angle with respect to the radius of curvature in the second curved portion 213-13 may have a range of 60 to 180°. An example of the structure of the particle sensing device including the second flow channel unit 200-13 and the first flow channel unit 120' as described above is illustrated in FIG. 34B. Referring to FIG. 34B, not only the optical unit 110, the light receiving unit 130, the light absorbing unit 140 and the first flow channel unit 120', but also the second flow channel unit 200-13, may be accommodated in a housing 170'. Of course, similarly to the particle sensing device shown in FIG. 6, the second flow channel unit 200-13, except for the nozzle portion 230, may be disposed outside the housing 170'. A fourth flow channel unit may be additionally included.

Meanwhile, as the nozzle portion 230 is disposed just before the scattering portion SS with respect to a flow direction of air, a flow of air containing particles may be concentrated within a predetermined space range in the scattering portion. This will be described with reference to FIGS. 34C and 34D.

FIG. 34C illustrates simulation results obtained when a flow of air in the scattering portion SS is viewed in a −Y-axis direction at the outlet OH of the first flow channel unit 120'. Referring to FIG. 34C, it can be seen that the air flow in the scattering portion SS is concentrated on a central portion E of an X-Z plane. The portion E has a diameter D8 corresponding to the diameter D6 of the outlet of the nozzle portion 230.

Such air flow concentration in the scattering portion SS is also clearly exhibited in a portion F of FIG. 34D illustrating simulation results obtained at a different viewing direction. Consequently, air flow in the scattering portion SS may be concentrated on a desired area through adjustment of the outlet diameter and position of the nozzle portion 230. Accordingly, more accurate particle sensing may be achieved through design of a structure of the nozzle portion 230 corresponding to the position and size of a light curtain incident from the optical unit 110 upon the scattering portion SS.

A scheme capable of concentrating a flow of air containing particles in a further desired space within the scattering portion SS while preventing accumulation of particles within the scattering portion SS, using the above-described nozzle structure and purified air, may be taken into consideration. This will be described with reference to FIGS. 35A to 35D.

Figure 35A:
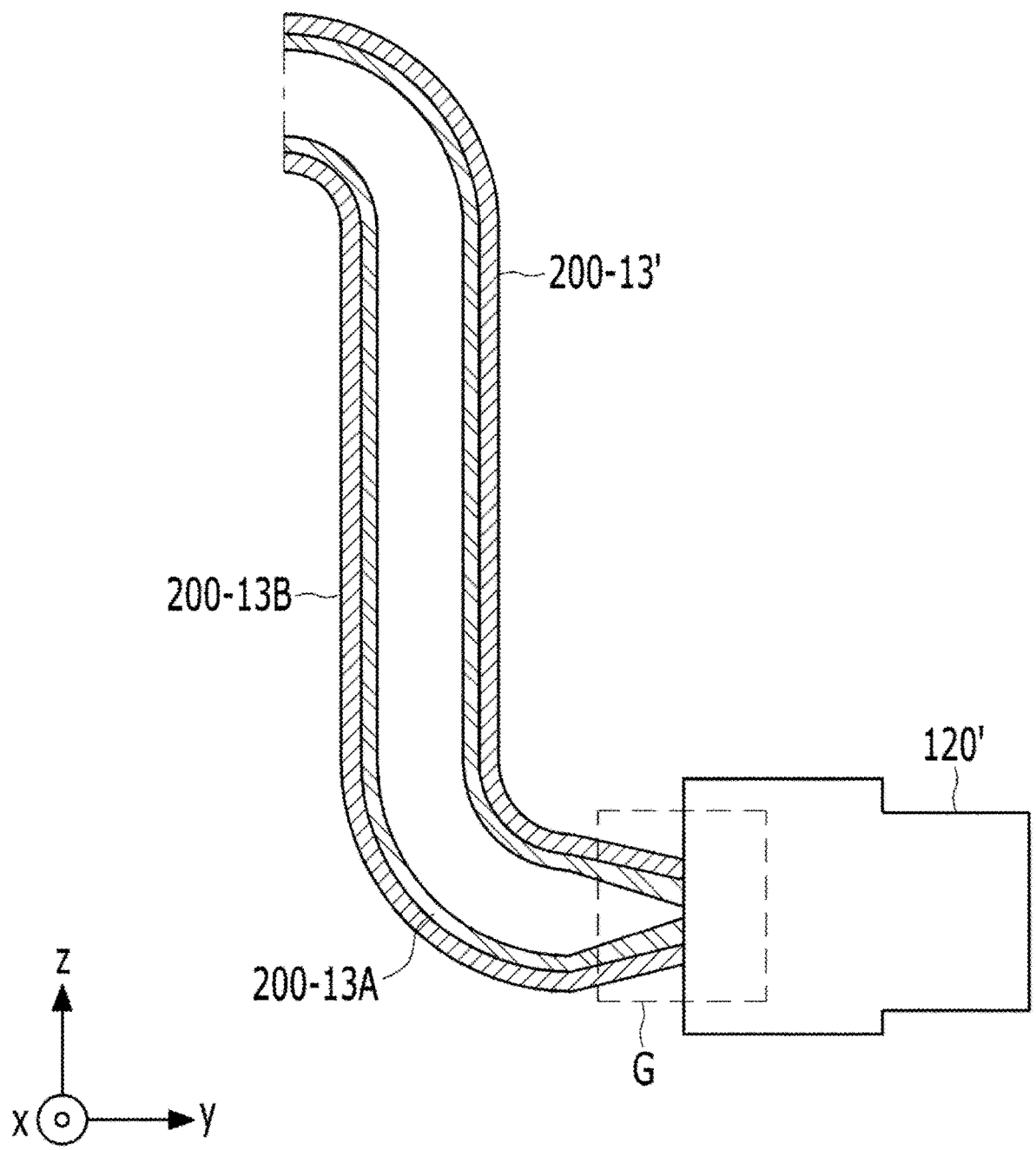
FIG. 35A is a sectional view illustrating an example of a configuration of a flow channel unit having a double flow channel structure according to an embodiment.
Figure 35C:
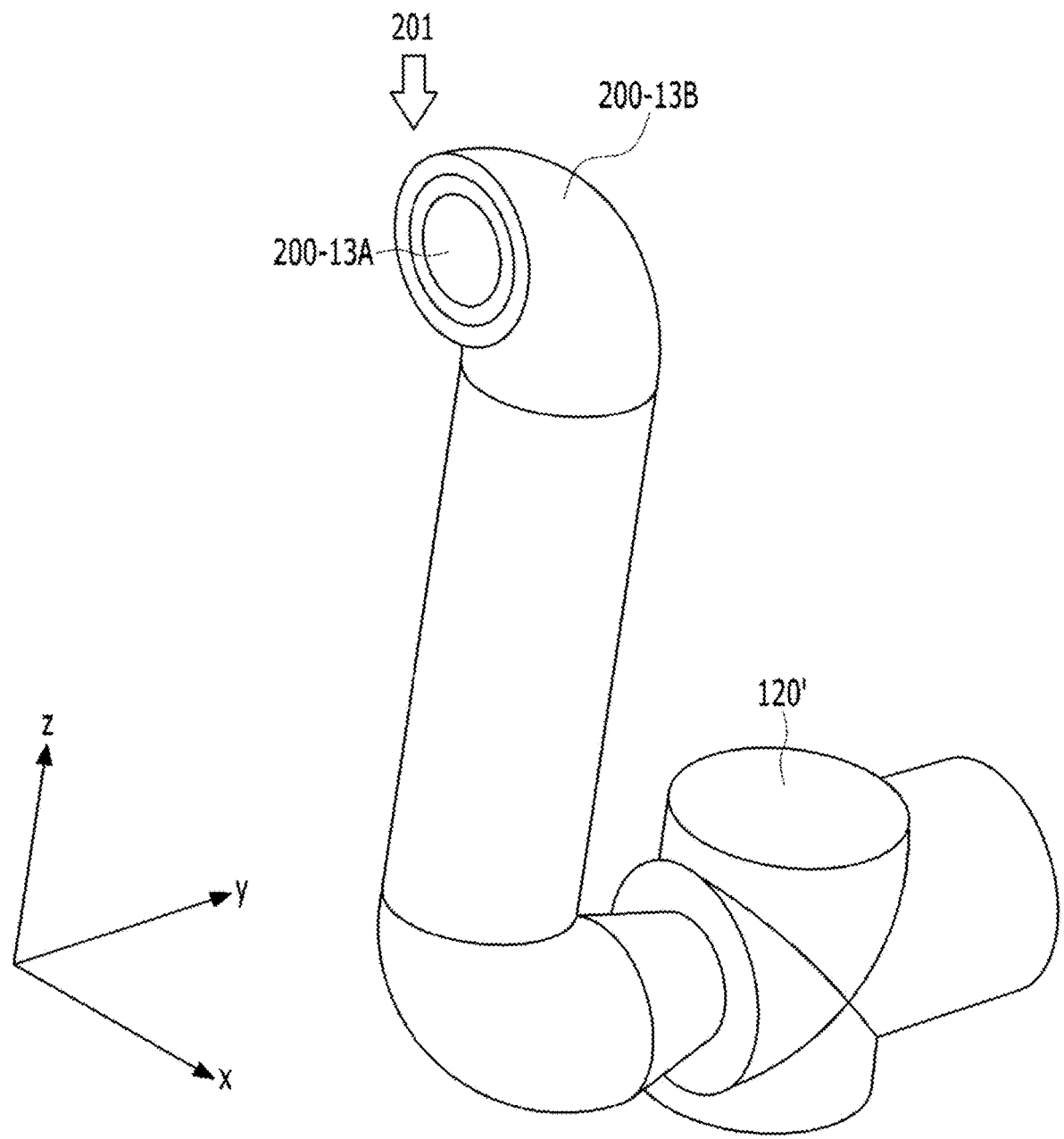
FIG. 35C is a perspective view illustrating the structure of the flow channel unit shown in FIG. 35A.
Figure 35D:
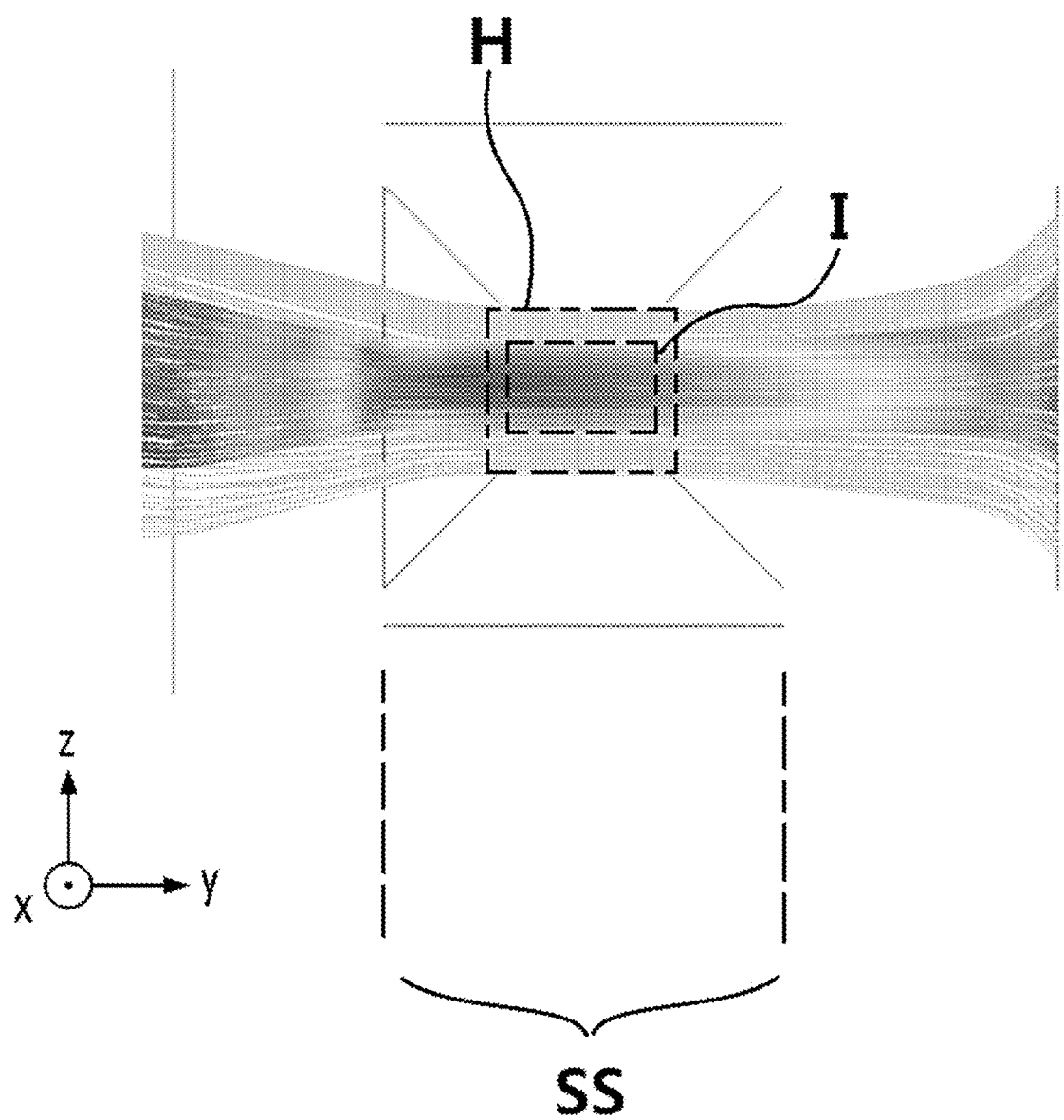
FIG. 35D illustrates simulation results of an air flow around a scattering portion showing effects of a double flow channel structure.

FIG. 35A is a sectional view illustrating an example of a configuration of a flow channel unit having a double flow channel structure according to an embodiment. FIG. 35B is an enlarged view corresponding to a portion G of FIG. 35A. FIG. 35C is a perspective view illustrating the structure of the flow channel unit shown in FIG. 35A. FIG. 35D illustrates simulation results of an air flow around a scattering portion showing effects of a double flow channel structure.

Referring to FIG. 35A, the structure of the illustrated flow channel unit is generally similar to that of FIG. 34A. However, a second flow channel unit 200-13' has a double flow channel structure in which an inner flow channel 200-13B having a relatively small diameter extends within an outer flow channel 200-13A having a relatively great diameter along the same path as the outer flow channel 200-13A. In other words, the second flow channel unit 200-13' includes the inner flow channel 200-13A, and the outer flow channel 200-13B surrounding the inner flow channel 200-13A while being spaced apart from the inner flow channel 200-13A. For example, a circular cross-sectional shape of the inner flow channel 200-13A and a circular cross-sectional shape of the outer flow channel 200-13B may form concentric circles spaced apart from each other when an inlet 201 of the second flow channel unit shown in FIG. 35C is viewed in a Y-axis direction.

In this case, as illustrated in FIG. 35B, external air containing particles, as described above, flows in a path defined by a space 3510 formed inside an inner surface of the inner flow channel 200-13A (hereinafter referred to as an "inner path" for convenience of description). In addition, air containing a relatively small amount of particles or containing no particles may flow in a path defined by a space 3520 formed between an outer surface of the inner flow channel 200-13A and an inner surface of the outer flow channel 200-13B (hereinafter referred to as an "outer path" for convenience of description). To this end, air passing through a particle filter (not shown) disposed in an air cleaner or an air conditioner (hereinafter referred to as "purified air" for convenience of description) may be supplied to the outer path.

Flows of air introduced into respective paths are simultaneously injected into a scattering portion SS due to a nozzle structure of the portion G. Although external air containing particles and purified air are simultaneously injected into the scattering portion SS, air emerging from the nozzle is concentrated in a portion H without being diffused in the scattering portion SS, as can be seen from simulation results shown in FIG. 35D. In particular, the purified air performs the function of an air curtain and, as such, the particle-containing air is advanced to the outlet without escaping a portion I.

Through the above-described double flow channel structure, it may be possible to more surely prevent a phenomenon in which air is diffused in the scattering portion SS. Accordingly, there is also an effect of preventing a phenomenon in which particles are accumulated in the scattering portion SS.

With reference to FIGS. 6 to 20 and FIGS. 34A to 35B, description has been given mainly in conjunction with a structure ranging from a portion, through which external air is introduced into the flow channel unit, to the scattering portion SS. Hereinafter, an optimal structure of a path ranging from the scattering portion SS to a portion, through which air is outwardly discharged, will be described with reference to FIGS. 36 to 38B.

As described above, when air introduced into an inlet of the first flow channel unit passes through the scattering portion SS while flowing toward an outlet by the fan 180 disposed at the side of the outlet, light scattered by particles contained in the air is incident upon the light receiving unit 130. When performance of the fan 180 is insufficient in this case, or the flow velocity of the air at the inlet is great, the air, which contains particles, may whirl in the scattering portion SS without being discharged through the outlet due to the flow channel shape of the second intermediate channel portion between the scattering portion SS and the outlet, or other reasons.

FIG. 36 is a view for explaining a phenomenon possibly occurring in the structure of the first flow channel unit shown in FIG. 34A and a barrier wall structure as a coping scheme. Referring to FIG. 36(A), when there is no structure in the second intermediate channel portion FII2 between the scattering portion SS of the first flow channel unit 120' and the outlet OH (or between the first flow channel portion SS and the third flow channel portion FII2), there may be a phenomenon in which air 3601 prevented from being discharged through the outlet flows backwards in the second intermediate channel portion, thereby returning to the scattering portion, as can be seen from simulation results shown in FIG. 36(B). A greater amount of particles than an actual amount of particles to be measured at the light receiving unit 130 may be sensed at the light receiving unit 130 due to the air returning after backward flow, and particles may be accumulated in the scattering portion SS.

In order to prevent such a phenomenon, formation of a barrier wall 3620 having a predetermined height D9 between the scattering portion SS and the second intermediate channel portion FII2 may be taken into consideration, as shown in FIG. 36(C). The barrier wall 3620 may be seen as a section disposed at the second intermediate channel portion FII2 while having a reduced diameter when viewed at the outside of the flow channel. However, it is considered that the barrier wall 3620 protrudes from an inner wall toward the center of the cross-section of the flow channel by a height corresponding to D9 within the flow channel and, as such, performs a function of preventing backward flow of air occurring along the inner wall of the flow channel in a direction from the outlet OH to the scattering portion SS. Here, the barrier wall 3620 may also be referred to as a "first discharge extension unit 3620" communicating with the first flow channel portion SS and the third flow channel portion FII2 between the first flow channel portion SS and the third flow channel portion FII2, when the air discharge function of the third flow channel portion FII2 is taken into consideration.

Figure 37:
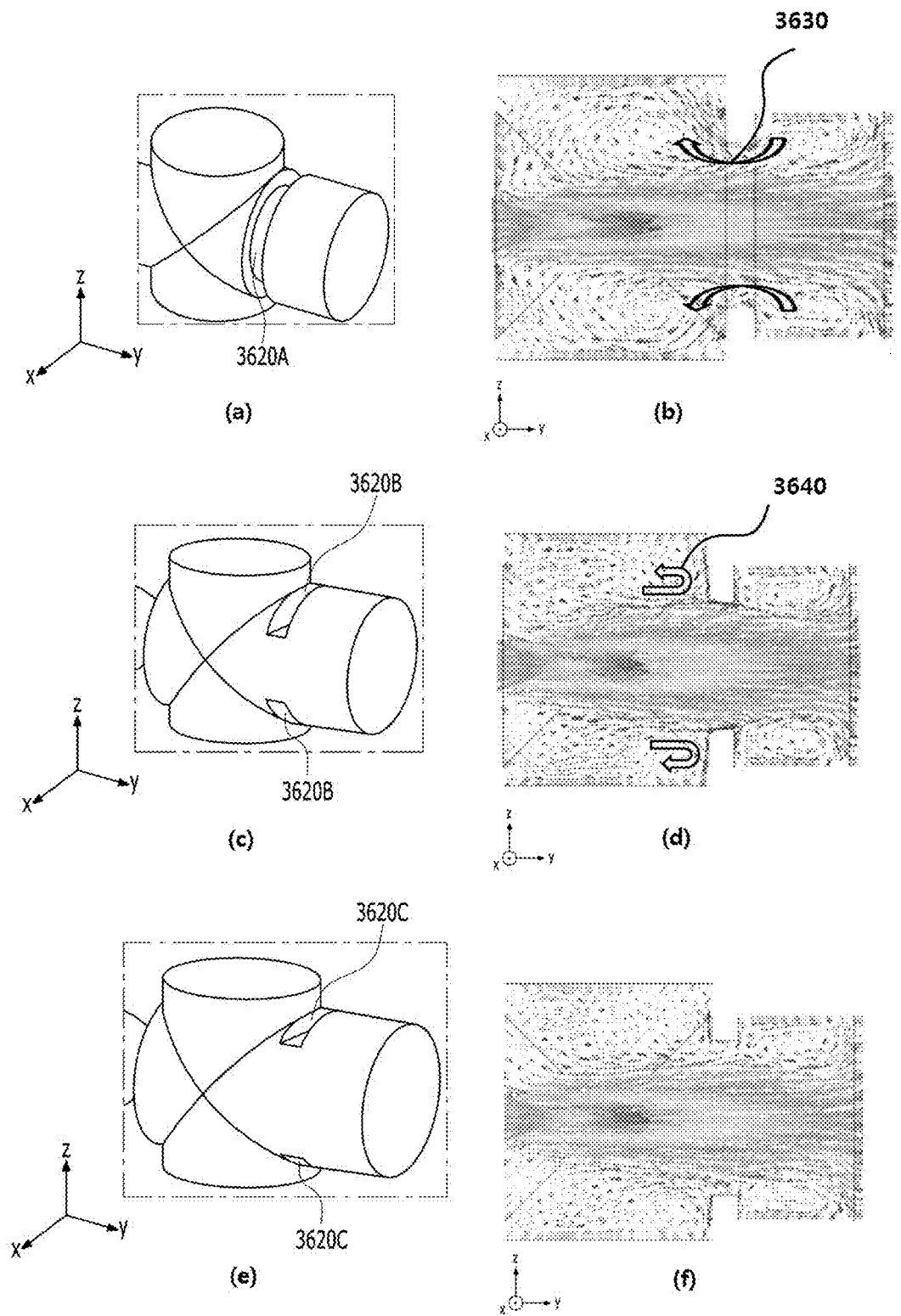
FIG. 37 is a view for explaining various barrier wall structures according to embodiments.

FIG. 37 is a view for explaining various barrier wall structures according to embodiments.

First, as shown in FIG. 37(a), assume that a barrier wall 3620A having an annular cross-sectional shape with a height D9 corresponding to ⅛ of a diameter D7 of the outlet OH is disposed to extend from an inner surface of the flow channel toward the center of the cross-section of the flow channel while extending completely in a circumferential direction. In this case, a flow of air still involves a backward flow 3630 because the height of the barrier wall 3620A is insufficient, as shown in FIG. 37(b).

As shown in FIG. 37(c), barrier walls 3620B may be disposed to extend in parallel in an X-axis direction while having a height corresponding to ¼ of the diameter D7 of the outlet OH toward a diameter center from lowest and highest points with respect to a Z-axis. In this case, as shown in FIG. 37(d), there is a problem in that a portion of air, 3640, directed from the scattering portion SS to the outlet may be blocked by the barrier walls 3620B because the height of the barrier walls 3620B is too great and, as such, may whirl within the scattering portion SS.

When barrier walls 3620C having a similar shape to the barrier walls 3620B in FIG. 37(c) while having a height D9 from lowest and highest points in a Z-axis direction toward the center of the cross-section of the flow channel such that the height D9 is reduced to ½, as compared to that of the barrier walls 3620B, are disposed as shown in FIG. 37(e), it can be seen that, as shown in FIG. 37(f), a phenomenon in which air whirls in the scattering portion SS, and backward flow of air from the outlet toward the scattering portion SS may be solved. Accordingly, the height of the barrier walls 3620C may have a range of 1/16 to ⅛ of the diameter of the flow channel (that is, the outlet). For example, when the diameter D7 of the outlet is 8 mm, the height of the barrier walls 3620C may have a range of 0.5 to 1 mm. This is because it may be difficult to expect an effect of preventing a backward flow when the height of the barrier walls 3620C is less than 0.5 mm, and air may whirl in the scattering portion SS when the height of the barrier walls 3620C exceeds 1 mm.

When barrier walls are formed only at upper and lower sides with respect to the Z-axis direction (that is, the length of the first discharge extension unit 3620 in an optical axis direction (for example, the case in which the Z-axis direction) is smaller than the diameter of the first flow channel portion SS and the diameter of the third flow channel portion FII2.), as described above, in place of the case in which a barrier wall is completely formed in a circumferential direction at the cross-section of the flow channel, there may be effects of preventing a backward flow in an optical axis direction having influence on particle sensing accuracy or accumulation of particles in the scattering portion caused by air whirling in the scattering portion. In addition, a problem of an abrupt reduction in the cross-sectional area of the entire flow channel may be prevented because no barrier wall is formed in directions of side walls (that is, opposite ends with respect to an X-axis direction). Furthermore, even when a backward flow is more or less formed in the side wall directions, influence of particles contained in air of the backward flow on particle sensing accuracy is insignificant, so long as the size and position of a light curtain incident in an optical axis direction correspond to those of an area on which air is concentrated by the nozzle.

Next, optimization of a discharge path, along which air emerging from the outlet of the first flow channel unit is outwardly discharged through a final outlet of the particle sensing device, may be taken into consideration.

Directions of the inlet of the second channel unit or the external air inlet of the fourth flow channel unit and the final outlet may be disposed on the same plane or on different planes. In addition, it is preferred that the air discharge path have a structure capable of preventing introduction of external light. To this end, the structure should generate air flow direction change of once or more and should have a sufficient length. Of course, when the number of air flow direction change times is too great, there may be a possibility of particle accumulation in accordance with performance of the fan 180.

For example, the air discharge path may have a length corresponding to ½ to 10 times or a length corresponding to ⅝ to 5 times at minimum with reference to the outlet diameter of the first flow channel unit. That is, assuming that the outlet diameter of the first flow channel unit is 8 mm, the length of the air discharge path may have a range of 5 mm to 40 mm at maximum. Of course, the air discharge path length is illustrative, and may have a reduced maximum range in accordance with performance of the fan 180 or limitation of the entire size of the particle sensing device. An air discharge path according to an embodiment taking into consideration the above-described condition will be described with reference to FIGS. 38A and 38B.

Figure 38A:
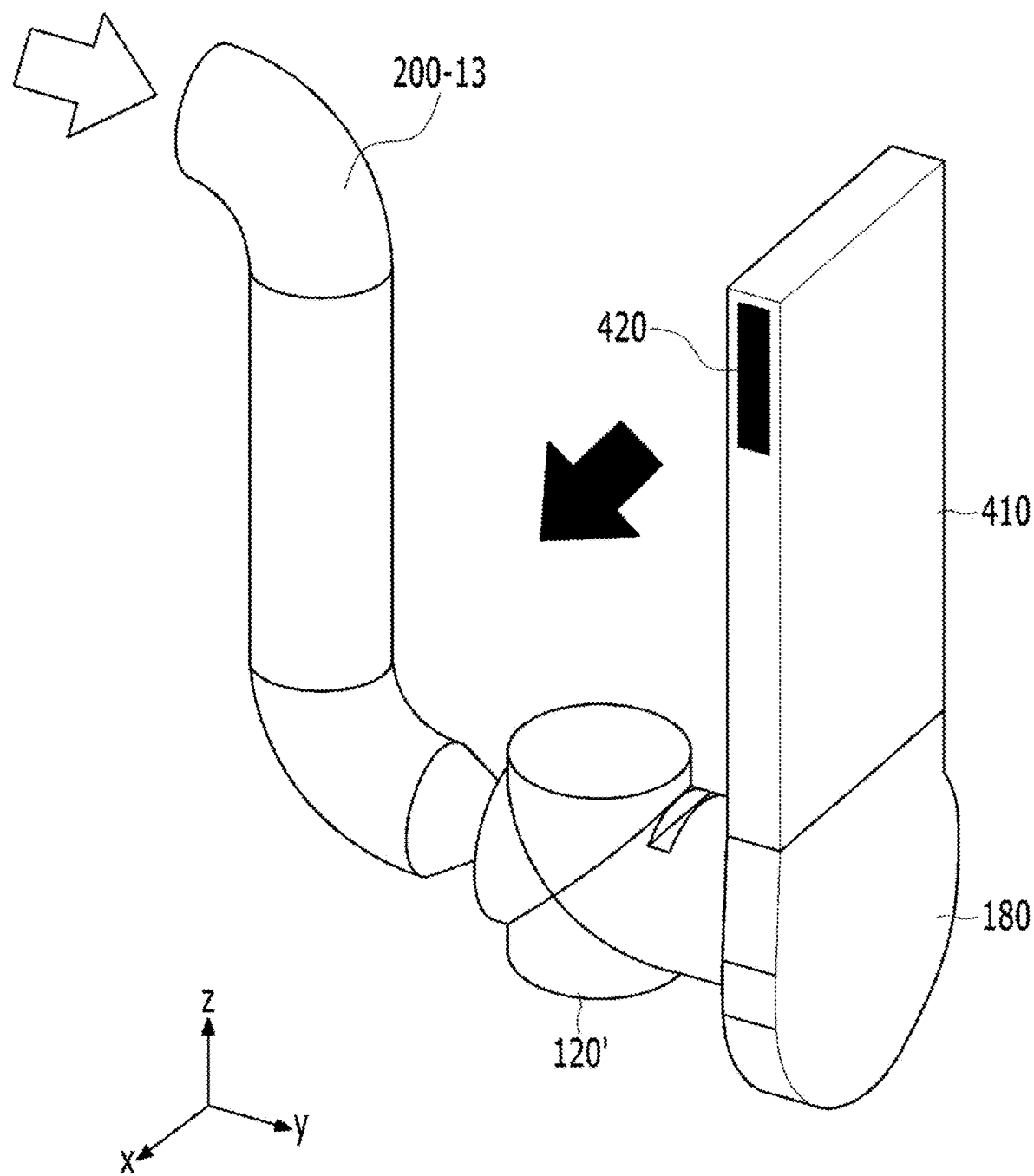
FIGS. 38A and 38B illustrate an example of a fan and a discharge-side flow channel unit according to an embodiment.
Figure 38B:
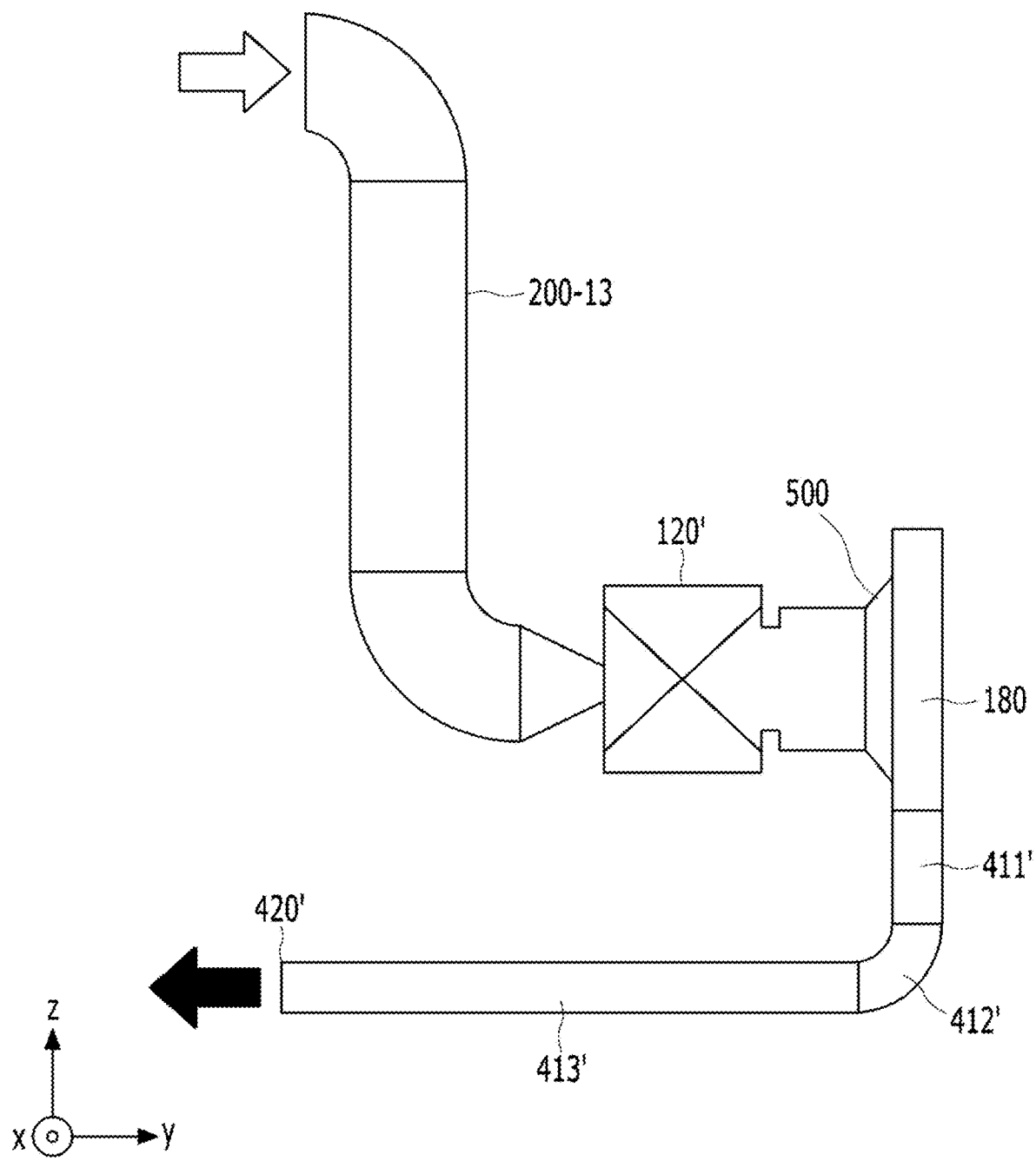

FIGS. 38A and 38B illustrate an example of a fan and a discharge-side flow channel unit according to an embodiment.

Referring to FIG. 38A, a fan 180 is disposed at the outlet of the first flow channel unit 120' on the basis of the flow channel structure shown in FIG. 34A. A discharge-side flow channel unit 410, which forms an air discharge path, extends from the fan 180 in a Z-axis direction. In this case, the discharge-side flow channel unit 410 may have a rectangular cross-sectional shape with reference to an x-y plane, for slimness of the entirety of the particle sensing device. A final outlet 420 may be disposed in an X-axis direction in order to prevent introduction of external light.

Accordingly, due to disposition relation among the fan 180, the discharge-side flow channel unit 410, and the final outlet 420 as described above, air advancing in a Y-axis direction at the outlet of the first flow channel unit 120' is changed in flow direction once, and is again changed in flow direction toward the Z-axis direction, and, as such, involves direction change of a total of twice.

Referring to FIG. 38B, disposition of the fan 180 at the outlet of the first flow channel unit 120' on the basis of the flow channel structure shown in FIG. 34A is similar to that of FIG. 38A. However, a second discharge extension unit 500 may be provided between the third flow channel portion FII2 and the fan 180, and a discharge-side flow channel unit forming a discharge path may extend from the fan 180 in a −Z-axis direction. That is, it may be considered that the second discharge extension unit 500 communicates with the third flow channel portion FII2 and, as such, is connected to the fan 180. In this case, the diameter of the second discharge extension unit 500 in an optical axis (for example, the Z-axis) may increase gradually as the second discharge extension unit 500 extends toward the fan 180.

The discharge-side flow channel unit may include a first discharge-side extension portion 411' extending in the −Z-axis direction, a discharge-side curved portion 412', and a second discharge-side extension portion 413'. Air introduced from the first discharge-side extension portion 411' may be changed in flow direction (for example, from the −Z-axis direction to a −Y-axis direction) at the discharge-side curved portion 412'. Air charged in flow direction at the discharge-side curved portion 412' passes through the second discharge-side extension portion 413' while maintaining a flow direction thereof and, as such, may be outwardly discharged through the final outlet 420' disposed in the −Y-axis direction.

In this case, the first discharge-side extension portion 411', the discharge-side curved portion 412', and the second discharge-side extension portion 413' have rectangular channel cross-sectional shapes, similarly to those of FIG. 38A. When the first discharge-side extension portion 411' contacts a first surface of a housing (not shown), and the second discharge-side extension portion 413' contacts a second surface of the housing disposed adjacent to the first surface, influence of the air discharge path on the overall size of the particle sensing device may be minimized. In addition, in terms of length, assuming that the outlet diameter of the first flow channel unit 120' is 8 mm, the first discharge-side extension portion 411' has a length of 5 mm in the z-axis direction, the second discharge-side extension portion 413' has a length of 30 mm in the Y-axis direction, and the total length of the air discharge path is about 40 mm when the discharge-side curved portion 412' has a radius of central curvature corresponding to 3 mm, and as such, the lengths satisfy the above-described optimal length conditions.

Next, the information analyzing unit will be described in more detail with reference to FIG. 39.

Figure 39:
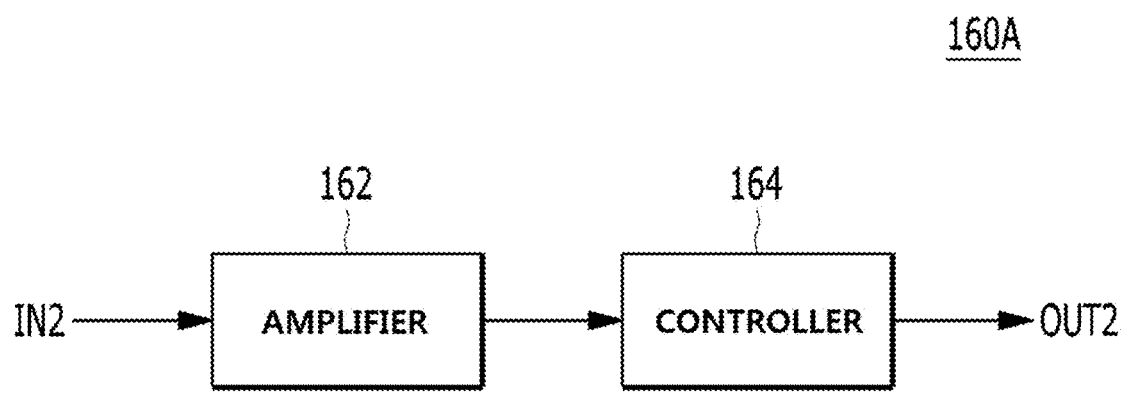
FIG. 39 is a block diagram of an embodiment of a information analyzing unit shown in FIG. 1.

FIG. 39 is a block diagram of an embodiment of the information analyzing unit 160 shown in FIG. 1. The information analyzing unit 160 may include an amplifier 162 and a controller 164.

The amplifier 162 may amplify an electrical signal received from the light receiving unit 130A or 130B (or the signal converting unit 150) through an input terminal IN2, and may output amplified results to the controller 164. The controller 164 may compare an analog signal amplified in the amplifier 162 with a pulse width modulation (PWM) reference signal, may analyze at least one of the number, concentration, size or shape of particles P based on compared results, and may output analyzed results through an output terminal OUT2.

The particle sensing devices 100 and 100A to 100D according to the above-described embodiments have the following effects.

First, in accordance with provision of the fan 180, a flow of air may be guided such that air introduced into the flow channel inlet FI flows to the flow channel outlet FO after passing through the scattering portion SS. Accordingly, a large amount of particles P contained in the air may be sensed after being introduced into the first flow channel unit 120 and, as such, performance of sensing the particles P may be enhanced.

Meanwhile, in conventional cases, light is radiated toward dust in an optical axis direction, and light scattered by the dust is sensed, and, as such, information as to dust is analyzed. Differently from such a conventional lateral type dust sensing device, the particle sensing device according to each embodiment irradiates light in an optical axis direction onto the scattering portion SS disposed on a path, along which air containing particles P flows, and senses light scattered by the particles P in a direction parallel to the optical axis direction, other than a lateral direction with respect to the optical axis direction, and, as such, analyzes information as to the particles P. Thus, the particle sensing device according to each embodiment is a forward type particle sensing device.

In addition, in accordance with embodiments, the photodiode 134-2 is divided into a plurality of sensing segments 134-21, 134-22, 134-23, and 134-24 and, as such, a shape of a particle may be estimated using relative particle sizes sensed by the plurality of divided sensing segments 134-21, 134-22, 134-23, and 134-24.

If the light absorbing unit 140 is disposed over the light receiving unit 130 (130A and 130B), main light dumped by the light absorbing unit 140 may be absorbed in the light receiving unit 130 (130A and 130B), thereby causing light noise. In order to prevent such a phenomenon, very delicate design of the light absorbing unit 140 is required. In addition, it is very difficult to reflect tolerances caused by various factors, for example, assembly tolerance, lens position tolerance, etc.

On the other hand, in embodiments, the light sensing unit 134 including the central portion 134-1 having light transmissivity is used, and the light absorbing unit 140 is disposed beneath the light receiving unit 130 (130A and 130B). Accordingly, design of the light absorbing unit 140 is easier than the case in which the light absorbing unit 140 is disposed over the light receiving unit 130 (103A and 130B), and a problem of scattered light detection degradation caused by a main beam may be eliminated.

In embodiments, as the fan 180 is provided, or through variation in the structure of the first flow channel unit 120, the area of the first opening portion OP1 is increased to be greater than the cross-sectional area of the first flow channel unit 120, or the first flow channel unit 120 has a double nozzle structure, an increased amount of particles P may be measured, and a light curtain may be formed at the scattering portion SS in the embodiments, and, as such, all particles flowing through the first flow channel unit 120 may be sensed. Accordingly, the number of particles P can be counted, differently from conventional cases. As such, particle sensing accuracy is enhanced.

In addition, in embodiments, intensity of sensed scattered light is higher than that of the lateral type, as described above. Accordingly, there is an advantage in that great electric power consumption is not required for an increase in intensity of scattered light.

Furthermore, in the particle sensing device according to each embodiment, no heat source (not shown) for an air flow in the first flow channel unit 120 is required. Accordingly, the overall size of the particle sensing device is reduced to be compact, as compared to the lateral type according to comparative examples, and, as such, the particle sensing device may be suitably used in fields requiring a miniature particle sensing device, for example, for vehicles.

In addition, it may be possible to more effectively sense scattered light by the photodiode 134-2 by disposing the light guides 136A and 136B over the photodiode 134-2. Accordingly, intensity of sensed light may be enhanced.

The particle sensing device according to each of the above-described embodiments may be applied to a domestic or industrial air cleaner, an air purifier, an air washer, an air cooler, and an air conditioner. In addition, the particle sensing device may be applied to an air quality management system for buildings, an indoor/outdoor air conditioning system for vehicles, or an indoor air quality measurement device for vehicles. However, the particle sensing devices 100 and 100A to 100D according to the embodiments are not limited to such examples, and may be applied to various fields.

Although the above description has been given mainly in conjunction with embodiments, these embodiments are only illustrative without limiting the present disclosure. Those skilled in the art to which the present disclosure pertains can appreciate that various modifications and applications may be possible without changing essential characteristics of the embodiments. For example, constituent elements concretely illustrated in embodiments may be implemented in modified states. In addition, differences associated with such modifications and applications should be interpreted as falling within the scope of the present disclosure defined in the accompanying claims.

The invention claimed is:

1. A particle sensing device comprising:
   a light emitting unit for emitting light;
   a first flow channel unit disposed beneath the light emitting unit to intersect an optical axis of the light emitting unit, the first flow channel unit allowing air containing particles to flow therethrough;
   a second flow channel unit communicating with the first flow channel unit and discharging air introduced from an outside into the first flow channel unit;
   a light receiving unit disposed on the optical axis beneath the first flow channel unit, the light receiving unit receiving light emerging from the first flow channel unit;
   a light dumping unit disposed on the optical axis beneath the light receiving unit, the light dumping unit dumping light emerging from the light receiving unit;
   a third flow channel unit communicating with the first flow channel unit, to discharge the air; and
   a first discharge extension unit communicating with the third flow channel unit and the first flow channel unit between the third flow channel unit and the first flow channel unit,
   wherein the second flow channel unit comprises:
   a first curved portion bent to have a curvature while comprising an inlet for receiving air while defining a first diameter,
   an extension portion extending from the first curved portion while communicating with the first curved portion,
   a second curved portion bent to have a curvature while communicating with the fit-4 extension portion, and
   a nozzle portion communicating with the second curved portion and the first flow channel unit,
   wherein a diameter of the nozzle portion communicating with the second curved portion is greater than a diameter of the nozzle portion communicating with the first flow channel unit, and
   wherein a length of the first discharge extension unit in a direction of the optical axis is smaller than a second diameter of the first flow channel unit and a third diameter of the third flow channel unit.

2. The particle sensing device according to claim 1, wherein the inlet receives the air from the first direction, the first curved portion provides a path for changing a flow direction of the air from the first direction to a second direction while having the curvature of the first curved portion, and the first direction corresponds to an extension direction of the first flow channel unit.

3. The particle sensing device according to claim 2, wherein the second direction has an acute angle of 60° with respect to the optical axis, the first curved portion and the second curved portion have a first radius angle and a second radius angle with respect to the curvatures thereof, respectively, and a sum of the first radius angle and the second radius angle is 60 to 180°.

4. The particle sensing device according to claim 1, wherein the extension portion extends in a second direction while having the first diameter, and the second direction corresponds to a direction parallel to a direction of the optical axis.

5. The particle sensing device according to claim 1, wherein a minimum diameter of the nozzle portion is smaller than the second diameter.

6. The particle sensing device according to claim 5, wherein the nozzle portion has a conical shape, and a length of the nozzle portion in the first direction corresponds to 40 to 60% of a length of the second flow channel unit in the first direction.

7. The particle sensing device according to claim 1, further comprising:
   a second discharge extension unit communicating with the third flow channel unit, to be connected to a fan,
   wherein a diameter of the second discharge extension unit in the optical axis direction increases gradually as the second discharge extension unit extends toward the fan.

8. The particle sensing device according to claim 1, further comprising:
   a discharge-side flow channel unit communicating with the third flow channel unit, to discharge air to the outside, wherein the discharge-side flow channel unit comprises
a first discharge-side extension portion extending in a second direction,
a discharge-side curved portion communicating with the discharge-side flow channel unit, the discharge-side curved portion extending in the first direction while having a curvature, and
a second discharge-side extension portion communicating with the discharge-side curved portion, the second discharge-side extension portion extending in the second direction.

9. The particle sensing device according to claim 1, wherein a difference between a radius of outer curvature and a radius of inner curvature in each of the first curved portion and the second curved portion corresponds to the first diameter.

10. A particle sensing device comprising:
a light emitting unit for emitting light;
a first flow channel unit disposed beneath the light emitting unit to intersect an optical axis of the light emitting unit, the first flow channel unit allowing air containing particles to flow therethrough;
a second flow channel unit communicating with the first flow channel unit and discharging air introduced from an outside into the first flow channel unit;
a light receiving unit disposed on the optical axis beneath the first flow channel unit, the light receiving unit receiving light emerging from the first flow channel unit; and
a light dumping unit disposed on the optical axis beneath the light receiving unit, the light dumping unit dumping light emerging from the light receiving unit,
wherein the second flow channel unit comprises
an inlet for receiving the air,
an outlet for discharging the received air,
a first curved portion bent to have a curvature while communicating with the inlet and the outlet,
a first extension portion extending from the first curved portion while communicating with the first curved portion,
a second curved portion bent to have a curvature while communicating with the first extension portion,
a second extension portion extending from the second curved portion while communicating with the second curved portion,
a third curved portion bent to have a curvature while communicating with the second extension portion, and
a nozzle portion communicating with the third curved portion.

11. The particle sensing device according to claim 10, further comprising:
a fourth curved portion bent to have a curvature while communicating with the nozzle portion; and
a third extension portion extending to communicate with the third curved portion and the first flow channel unit.

12. The particle sensing device according to claim 11, wherein:

the first extension portion, the second extension portion and the nozzle portion are disposed on a first plane; and
the nozzle portion and the third extension portion are disposed on a second plane intersecting the first plane.

13. The particle sensing device according to claim 12, further comprising:
a housing for accommodating the light emitting unit, the first flow channel unit, the light receiving unit and the light dumping unit therein, the housing comprising at least the first plane.

14. The particle sensing device according to claim 13, wherein:
a vertical axis of the first plane is parallel to the optical axis; and
a horizontal axis of the first plane intersects the optical axis.

15. The particle sensing device according to claim 12, wherein the third extension portion forms a path for changing a flow direction of the air from a first direction to a second direction opposite to the first direction on the second plane.

16. The particle sensing device according to claim 11, wherein, in each of the first curved portion, the second curved portion, the third curved portion and the fourth curved portion, a central curvature thereof correspond to $3/8$ to 1 of a diameter thereof.

17. The particle sensing device according to claim 10, further comprising:
a third flow channel unit communicating with the first channel unit, to discharge the air; and
a first discharge extension unit communicating with the third flow channel unit and the first flow channel unit between the third flow channel unit and the first flow channel unit,
wherein a length of the first discharge extension unit in a direction of the optical axis is smaller than a first diameter of the first flow channel unit and a second diameter of the third flow channel unit.

18. The particle sensing device according to claim 17, further comprising:
a discharge-side flow channel unit communicating with the third flow channel unit, to discharge air to the outside,
wherein the discharge-side flow channel unit comprises
a first discharge-side extension portion extending in a second direction,
a discharge-side curved portion communicating with the first discharge-side extension portion, the discharge-side curved portion extending in the first direction while having a curvature, and
a second discharge-side extension portion communicating with the discharge-side curved portion, the second discharge-side extension portion extending in the second direction.

* * * * *